(12) United States Patent
Martin et al.

(10) Patent No.: US 12,180,654 B2
(45) Date of Patent: Dec. 31, 2024

(54) WOVEN BASE FABRIC WITH LASER ENERGY ABSORBENT MD AND CD YARNS AND TISSUE PRODUCT MADE USING THE SAME

(71) Applicant: First Quality Tissue Se, LLC, Anderson, SC (US)

(72) Inventors: Chad Martin, Appleton, WI (US); Robbie Edmonds, Island, KY (US); Allan Manninen, Stittsville (CA); Chi Zhang, Kanata (CA); Hongjian Zhou, Kanata (CA); James E. Sealey, II, Belton, SC (US); Byrd Tyler Miller, IV, Easley, SC (US); Marc Paul Begin, Simpsonville, SC (US); Justin S. Pence, Williamston, SC (US)

(73) Assignee: First Quality Tissue Se, LLC, Anderson, SC (US)

( * ) Notice: Subject to any disclaimer, the term of this patent is extended or adjusted under 35 U.S.C. 154(b) by 0 days.

(21) Appl. No.: 16/950,967

(22) Filed: Nov. 18, 2020

(65) Prior Publication Data
US 2021/0071364 A1 Mar. 11, 2021

Related U.S. Application Data

(63) Continuation-in-part of application No. 16/881,219, filed on May 22, 2020, now Pat. No. 11,931,997.
(Continued)

(51) Int. Cl.
*D21F 7/08* (2006.01)
*B32B 5/02* (2006.01)
(Continued)

(52) U.S. Cl.
CPC .............. *D21F 7/083* (2013.01); *B32B 5/024* (2013.01); *B32B 5/028* (2013.01); *B32B 5/26* (2013.01);
(Continued)

(58) Field of Classification Search
CPC .............................. D03D 15/283; D21F 7/083
See application file for complete search history.

(56) References Cited

U.S. PATENT DOCUMENTS 3,143,150 A 8/1964 Buchanan
3,473,576 A 10/1969 Amneus
(Continued)

FOREIGN PATENT DOCUMENTS

EP 1 339 915 A2 9/2003
JP 2001226842 A 8/2001
(Continued)

OTHER PUBLICATIONS

PCT Search Report and Written Opinion dated Sep. 30, 2020 in connection with PCT/US2020/034184.
(Continued)

*Primary Examiner* — Andrew T Piziali
(74) *Attorney, Agent, or Firm* — Amster, Rothstein & Ebenstein LLP

(57) ABSTRACT

A structured tissue belt assembly including a supporting layer, a non-woven web contacting layer, and one or more laser welds that attach the bottom surface of the web contacting layer to the top surface of the supporting layer. The structured tissue belt assembly allows for air flow in x, y and z directions. In exemplary embodiments, the structured tissue belt assembly has an embedment distance between the supporting layer and the web contacting layer of
(Continued)

0.05 mm to 0.60 mm and a peel force between the web contacting layer and the supporting layer of at least 650 gf/inch.

5 Claims, 29 Drawing Sheets

Related U.S. Application Data

(60) Provisional application No. 62/851,415, filed on May 22, 2019.

(51) Int. Cl.
| | | |
|---|---|---|
| *B32B 5/26* | (2006.01) | |
| *B32B 7/12* | (2006.01) | |
| *D03D 1/00* | (2006.01) | |
| *D03D 13/00* | (2006.01) | |
| *D03D 15/43* | (2021.01) | |
| *D21F 7/10* | (2006.01) | |
| *D21H 27/00* | (2006.01) | |

(52) U.S. Cl.
CPC ............ *B32B 5/262* (2021.05); *B32B 7/12* (2013.01); *D03D 1/0094* (2013.01); *D03D 13/004* (2013.01); *D03D 15/43* (2021.01); *D21F 7/10* (2013.01); *D21H 27/002* (2013.01); *B32B 2262/0284* (2013.01); *B32B 2262/0292* (2013.01); *B32B 2262/14* (2013.01); *B32B 2307/412* (2013.01); *B32B 2413/00* (2013.01); *Y10T 442/3179* (2015.04)

(56) References Cited

U.S. PATENT DOCUMENTS

| | | | |
|---|---|---|---|
| 3,573,164 A | | 3/1971 | Friedberg et al. |
| 3,905,863 A | | 9/1975 | Ayers |
| 3,974,025 A | | 8/1976 | Ayers |
| 3,994,771 A | | 11/1976 | Morgan, Jr. et al. |
| 4,102,737 A | | 7/1978 | Morton |
| 4,184,519 A | | 1/1980 | McDonald et al. |
| 4,191,609 A | | 3/1980 | Trokhan |
| 4,333,502 A | * | 6/1982 | Karm .................. D21F 1/0036 162/903 |
| 4,514,345 A | | 4/1985 | Johnson et al. |
| 4,528,239 A | | 7/1985 | Trokhan |
| 4,529,480 A | | 7/1985 | Trokhan |
| 4,637,859 A | | 1/1987 | Trokhan |
| 4,909,284 A | | 3/1990 | Kositzke |
| 5,077,116 A | * | 12/1991 | Lefkowitz ............... D21F 7/083 428/323 |
| 5,334,289 A | | 8/1994 | Trokhan et al. |
| 5,510,002 A | | 4/1996 | Hermans et al. |
| 5,607,551 A | | 3/1997 | Farrington, Jr. et al. |
| 5,679,222 A | | 10/1997 | Rasch et al. |
| 5,806,569 A | | 9/1998 | Gulya et al. |
| 6,120,642 A | | 9/2000 | Lindsay et al. |
| 6,610,173 B1 | | 8/2003 | Lindsay et al. |
| 6,660,362 B1 | | 12/2003 | Lin et al. |
| 6,821,391 B2 | | 11/2004 | Scherb et al. |
| 6,878,238 B2 | | 4/2005 | Bakken et al. |
| 6,998,017 B2 | | 2/2006 | Lindsay et al. |
| 7,339,378 B2 | | 3/2008 | Han et al. |
| 7,387,706 B2 | | 6/2008 | Herman et al. |
| 7,442,278 B2 | | 10/2008 | Murray et al. |
| 7,494,563 B2 | | 2/2009 | Edwards et al. |
| 7,510,631 B2 | | 3/2009 | Scherb et al. |
| 7,582,187 B2 | | 9/2009 | Scherb et al. |
| 7,686,923 B2 | | 3/2010 | Scherb et al. |
| 7,744,726 B2 | | 6/2010 | Scherb et al. |
| 7,811,418 B2 | | 10/2010 | Klerelid et al. |
| 7,905,989 B2 | | 3/2011 | Scherb et al. |
| 7,931,781 B2 | | 4/2011 | Scherb et al. |
| 8,062,480 B2 | | 11/2011 | Eagles |
| 8,075,739 B2 | | 12/2011 | Scherb et al. |
| 8,088,256 B2 | * | 1/2012 | Hansen ............... B29C 65/1683 162/348 |
| 8,092,652 B2 | | 1/2012 | Scherb et al. |
| 8,382,956 B2 | | 2/2013 | Boechat et al. |
| 8,580,083 B2 | | 11/2013 | Boechat et al. |
| 8,968,508 B2 | | 3/2015 | Schindler et al. |
| 8,980,062 B2 | | 3/2015 | Karlsson et al. |
| 10,099,425 B2 | | 10/2018 | Miller, IV et al. |
| 10,208,426 B2 | | 2/2019 | Sealey et al. |
| 2006/0249220 A1 | * | 11/2006 | Barrett ................... D21F 1/0045 139/383 A |
| 2007/0028997 A1 | * | 2/2007 | Best .................... B29C 65/1654 139/383 R |
| 2008/0156450 A1 | | 7/2008 | Klerelid et al. |
| 2009/0139600 A1 | | 6/2009 | Best et al. |
| 2010/0065234 A1 | | 3/2010 | Klerelid et al. |
| 2011/0180223 A1 | | 7/2011 | Klerelid et al. |
| 2012/0135184 A1 | | 5/2012 | Lang |
| 2019/0011276 A1 | | 4/2019 | Sealey et al. |
| 2020/0061959 A1 | | 2/2020 | Roe et al. |
| 2021/0071364 A1 | | 3/2021 | Martin et al. |
| 2021/0078284 A1 | | 3/2021 | Martin et al. |

FOREIGN PATENT DOCUMENTS

| | | |
|---|---|---|
| JP | 3932238 B2 | 6/2007 |
| JP | 2013256720 A | 12/2013 |
| JP | 2015197614 A | 11/2015 |
| WO | 2009067079 A1 | 5/2009 |
| WO | 2019028052 A1 | 2/2019 |

OTHER PUBLICATIONS

International Search Report and Written Opinion issued in PCT/US2022/040051, mailed Feb. 1, 2023.

\* cited by examiner

| Sample Description | Manufacturer | Paper Type | g/m² Basis Wt | microns/3ply Cal. | N/m MD Strength | % MD Stretch | N/m CD Strength | % CD Stretch | N/m GEO Mean | GMT/BW |
|---|---|---|---|---|---|---|---|---|---|---|
| Example #4 | First Quality | Tad | 48.63 | 559.55 | 123.97 | 18.17 | 62.78 | 9.26 | 83.65 | 88.25 |
| Example #5 | First Quality | Tad | 38.57 | 464.28 | 105.35 | 11.38 | 66.14 | 8.54 | 81.66 | 78.57 |
| Georgeasave Example 3 | First Quality | Tad | 40.79 | 690.69 | 163.06 | 20.97 | 79.02 | 10.31 | 18.88 | 113.64 |
| Angel Soft 121319 MAR BF 0015709 | Georgia-Pacific | Conventional | 35.84 | 389.88 | 120.48 | 19.93 | 53.14 | 8.97 | 7.21 | 78.33 |
| BIG HEDGE PREMIUM | Atlas-Recobbit | NT | 41.71 | 432.88 | 232.16 | 30.23 | 96.13 | 6.83 | 8.11 | 142.75 |
| Ultra Soft | Clearwater | Tad | 46.17 | 462.15 | 161.82 | 18.32 | 94.37 | 6.23 | 15.06 | 130.51 |
| COTTONELLE ULTRA COMFORTCARE 2ply | Kimberly-Clark | Ucloud | 42.95 | 586.88 | 187.72 | 13.94 | 89.25 | 13.70 | 12.26 | 122.63 |
| ANGEL LAURA LYNN ULTRA SOFT | Irving | Tad | 38.22 | 515.29 | 131.89 | 8.42 | 67.16 | 6.06 | 12.17 | 86.62 |
| CHARMIN ULTRA STRONG BOSS 2953 | Proctor & Gamble | Tad | 36.57 | 544.43 | 182.12 | 16.29 | 99.99 | 11.94 | 14.43 | 134.39 |
| CHARMIN ULTRA SOFT WAY 2013 FLOWER EMBOSS | Proctor & Gamble | Tad | 45.62 | 549.68 | 130.90 | 19.34 | 56.97 | 8.90 | 14.99 | 87.47 |
| MEMBER'S MARK ULTRA PREMIUM | Georgia-Pacific | Ehud | 42.69 | 523.83 | 140.77 | 26.34 | 61.37 | 8.78 | 11.92 | 92.29 |
| CHARMIN ULTRA STRONG CURRENT 2020 | Proctor & Gamble | Tad | 36.81 | 521.33 | 148.44 | 17.69 | 73.63 | 11.57 | 15.16 | 104.95 |
| QUILTED NORTHERN ULTRA PLUSH OLD EMBOSS | Georgia-Pacific | Conventional 3ply | 65.28 | 469.58 | 138.30 | 14.86 | 52.81 | 9.79 | 18.47 | 89.93 |
| QUILTED NORTHERN ULTRA SOFT & STRONG NEW EMBOSS | Georgia-Pacific | STRD | 41.03 | 487.05 | 159.29 | 26.07 | 68.57 | 18.49 | 13.33 | 103.02 |
| COSTCO ULTRA SOFT BATH DEC. 2014 (Outline Only 25720) | Kruger | Tad | 44.83 | 484.27 | 193.12 | 15.51 | 117.61 | 7.36 | 13.46 | 130.68 |
| ULTRA STRONG BATH TISSUE | Clearwater | NTT | 40.55 | 483.32 | 163.09 | 17.40 | 62.75 | 6.80 | 11.57 | 108.16 |
| HOMELINE ULTRA STRONG FAMILY DOLLAR | Sofidel | OBT | 34.63 | 405.48 | 267.73 | 12.66 | 139.06 | 3.42 | 16.55 | 182.39 |
| ALDI WILLOW ULTRA SOFT | Sofidel | NTT | 42.28 | 437.28 | 209.44 | 16.01 | 78.93 | 6.07 | 9.35 | 128.62 |
| QUILTED NORTHERN ULTRA PLUSH NEW EMBOSS | Georgia-Pacific | Conventional 3PLY | 46.24 | 458.88 | 152.64 | 20.97 | 96.10 | 9.45 | 15.08 | 92.52 |
| HOMELINE ULTRA SOFT FAMILY DOLLAR | Sofidel | OBT | 39.78 | 492.10 | 272.80 | 15.58 | 137.88 | 3.66 | 28.10 | 207.27 |
| BLUFF STRONG CANADA | Cascade | Conventional | 36.04 | 486.13 | 132.63 | 13.94 | 67.13 | 5.12 | 10.77 | 84.28 |
| ALDI WILLOW ULTRA STRONG | Sofidel | NTT | 42.18 | 482.85 | 157.53 | 18.72 | 63.48 | 6.73 | 7.43 | 108.08 |
| SCOTT COMFORTPLUS | Kimberly-Clark | Ucloud | 27.98 | 389.75 | 123.28 | 16.58 | 83.99 | 18.18 | 8.15 | 109.44 |
| ALDI WILLOW STRONG & PLUSH | Sofidel | Conventional 3ply | 30.83 | 573.38 | 167.88 | 17.75 | 109.53 | 9.45 | 10.17 | 59.13 |
| PUFF ENVIRO CANADA | Cascade | Conventional | 38.36 | 458.12 | 155.63 | 14.38 | 66.37 | 5.80 | 7.99 | 100.80 |
| MEMBERS MARK ULTRA PREMIUM | Irving | Tad | 40.66 | 427.78 | 163.23 | 12.94 | 83.90 | 7.41 | 14.38 | 116.99 |
| QUILTED NORTHERN ECO COMFORT | Georgia-Pacific | Ehud | 40.22 | 497.12 | 137.78 | 24.39 | 73.99 | 10.07 | 11.98 | 108.33 |
| FAMILY DOLLAR SOFT BATH | Atlas-Recobbit | NTT | 38.71 | 427.32 | 164.16 | 26.34 | 68.86 | 7.91 | 7.88 | 105.03 |
| ULTRA SOFT CANADA | Cascade | Tad | 45.88 | 470.98 | 163.68 | 15.38 | 108.28 | 3.27 | 15.47 | 127.67 |
| EAGLES LAURA LYNNE ULTRA STRONG | Irving | Tad | 37.93 | 489.60 | 134.67 | 13.12 | 78.99 | 7.75 | 12.48 | 109.89 |
| CHARMIN ESSENTIALS SOFT | Proctor & Gamble | Tad | 35.25 | 465.37 | 187.16 | 18.02 | 89.23 | 13.83 | 14.28 | 122.48 |
| COTTONELLE ULTRA CLEANCARE | Kimberly-Clark | Ucloud | 39.76 | 516.88 | 146.25 | 16.21 | 86.71 | 12.53 | 16.12 | 114.25 |
| GREAT VALUE ULTRA STRONG CURRENT | Kruger | Tad | 38.53 | 489.93 | 256.64 | 17.41 | 130.36 | 8.71 | 11.47 | 182.36 |
| CHARMIN ULTRA SOFT CURRENT 2020 | Proctor & Gamble | Tad | 40.52 | 584.68 | 156.78 | 27.26 | 76.78 | 12.07 | 20.35 | 107.48 |
| PUPP SOFT & STRONG | Irving | Conventional | 32.54 | 442.52 | 138.05 | 5.32 | 54.77 | 4.34 | 13.12 | 94.33 |
| TOTAL HOME ULTRA STRONG | Sofidel | OBT | 48.88 | 423.12 | 173.86 | 18.83 | 71.51 | 6.66 | 8.24 | 110.63 |
| TOTAL HOME ULTRA SOFT | Sofidel | OBT | 41.13 | 516.88 | 161.19 | 15.08 | 48.29 | 7.41 | 7.55 | 88.15 |

TABLE 2

FIG. 25A

| Sample Description | Manufacturer | Paper Type | TSA | dB V^2 rms ST | dB V^2 rms TS750 | mm/M D | gf Ball Burst | gf Crumple | Int Value | Stdev | microns Sb |
|---|---|---|---|---|---|---|---|---|---|---|---|
| Example #4 | First Quality | Tad | 95.38 | 9.10 | 20.62 | 2.95 | 235.97 | 32.28 | 6.13 | 4.70 | 25.93 |
| Example #2 | First Quality | Tad | 96.14 | 8.65 | 26.32 | 2.92 | 197.15 | 23.46 | 7.87 | 3.90 | 17.51 |
| Comparative Example 3 | First Quality | Tad | 93.06 | 9.85 | 20.96 | 2.83 | 222.62 | 36.92 | 4.69 | 1.30 | 37.80 |
| Angel Soft 121219 MAC MF 085 B709 | Georgia-Pacific | Conventional | 88.62 | 12.37 | 21.97 | 3.15 | 229.50 | 18.97 | 4.80 | 2.10 | 20.22 |
| DG HOME PREMIUM | Atlas-Resolute | NTT | 78.68 | 15.96 | 38.66 | 2.80 | 239.00 | 31.82 | 4.14 | 2.00 | 31.20 |
| Ultra Soft | Clearwater | NTT | 97.78 | 7.55 | 31.59 | 2.68 | 252.14 | 36.31 | 9.65 | 1.20 | 19.73 |
| COTTONELLE ULTRA COMFORTCARE 2ply | Kimberly-Clark | Uctad | 85.94 | 12.43 | 32.59 | 2.79 | 409.86 | 50.18 | 5.88 | 3.70 | 45.61 |
| INGLES LAURA LYNN ULTRA SOFT | Irving | Tad | 93.94 | 9.43 | 30.85 | 2.84 | 227.88 | 28.15 | 5.71 | 2.50 | 43.46 |
| CHARMIN ULTRA STRONG MAY 2013 | Procter & Gamble | Tad | 89.92 | 10.83 | 25.36 | 2.75 | 353.65 | 36.11 | 3.50 | 3.90 | 40.90 |
| CHARMIN ULTRA SOFT MAY 2013 FLOWER EMBOSS | Procter & Gamble | Tad | 99.62 | 7.60 | 27.19 | 3.09 | 202.40 | 28.56 | 11.02 | 2.60 | 24.35 |
| MEMBER'S MARK ULTRA PREMIUM | Georgia-Pacific | Etad | 93.06 | 10.24 | 33.15 | 3.01 | 269.28 | 26.11 | 4.84 | 1.40 | 40.14 |
| CHARMIN ULTRA STRONG CURRENT 2020 | Procter & Gamble | Tad | 93.70 | 10.33 | 22.68 | 2.94 | 345.81 | 27.54 | 4.09 | 2.50 | 53.74 |
| QUILTED NORTHERN ULTRA PLUSH OLD EMBOSS | Georgia-Pacific | Conventional 3PLY | 97.00 | 9.24 | 24.64 | 2.98 | 235.56 | 21.83 | 4.80 | 1.80 | 46.04 |
| QUILTED NORTHERN ULTRA SOFT & STRONG NEW EMBOSS | Georgia-Pacific | ETAD | 96.30 | 9.75 | 30.12 | 3.16 | 215.55 | 25.91 | 4.98 | 1.50 | 41.72 |
| COSTCO ULTRA SOFT BATH DISC. 2014 [Online Only 2020] | Kruger | Tad | 90.82 | 10.38 | 28.28 | 2.48 | 325.54 | 39.88 | 5.45 | 2.70 | 19.17 |
| ULTRA STRONG BATH TISSUE | Clearwater | NTT | 91.78 | 11.08 | 26.73 | 2.83 | 219.18 | 24.89 | 4.06 | 1.80 | 17.52 |
| HOMELINE ULTRA STRONG FAMILY DOLLAR | Orchid | QRT | 79.54 | 13.46 | 83.19 | 2.30 | 280.62 | 36.92 | 4.55 | 1.50 | 33.97 |
| ALDI WILLOW ULTRA SOFT | Sofidel | NTT | 90.98 | 9.96 | 48.99 | 2.67 | 211.18 | 27.35 | 7.93 | 1.90 | 15.21 |
| QUILTED NORTHERN ULTRA PLUSH NEW EMBOSS | Georgia-Pacific | Conventional 3PLY | 94.50 | 9.83 | 17.50 | 2.79 | 332.73 | 21.62 | 3.09 | 1.50 | 38.86 |
| HOMELINE ULTRA SOFT FAMILY DOLLAR | Orchid | QRT | 78.74 | 13.18 | 97.04 | 2.25 | 281.06 | 45.49 | 5.14 | 1.60 | 37.47 |
| FLUFF STRONG CANADA | Cascade | Conventional | 90.74 | 11.18 | 25.21 | 2.77 | 181.37 | 17.75 | 4.08 | 2.00 | 34.07 |
| ALDI WILLOW ULTRA STRONG | Sofidel | NTT | 89.44 | 11.23 | 52.30 | 2.88 | 167.02 | 26.11 | 7.86 | 1.90 | 19.27 |
| SCOTT COMFORTPLUS | Kimberly-Clark | Uctad | 83.20 | 13.97 | 67.97 | 3.29 | 293.34 | 38.15 | 4.75 | 6.50 | 71.83 |
| ALDI WILLOW STRONG & PLUSH | Sofidel | Conventional 3ply | 86.10 | 11.69 | 51.68 | 2.37 | 428.66 | 49.37 | 4.47 | 2.00 | 26.26 |
| FLUF ENVIRO CANADA | Cascade | Conventional | 83.98 | 14.99 | 29.31 | 2.77 | 187.24 | 21.62 | 1.97 | 3.80 | 34.63 |
| MEMBERS MARK ULTRA PREMIUM | Irving | Tad | 89.62 | 10.71 | 36.19 | 2.64 | 268.52 | 35.29 | 4.97 | 1.60 | 27.20 |
| QUILTED NORTHERN ULTRA PLUSH ECO COMFORT | Georgia-Pacific | Etad | 93.50 | 9.34 | 48.72 | 3.12 | 222.62 | 25.09 | 6.20 | 1.70 | 31.93 |
| FAMILY DOLLAR SOFT BATH | Atlas-Resolute | NTT | 87.18 | 13.04 | 31.56 | 2.57 | 210.09 | 26.32 | 5.56 | 3.40 | 33.72 |
| ULTRA SOFT CANADA | Cascade | Tad | 86.78 | 11.38 | 51.31 | 2.50 | 154.28 | 43.25 | 4.70 | 1.20 | 22.42 |
| INGLES LAURA LYNNE ULTRA STRONG | Irving | Tad | 89.48 | 11.24 | 35.37 | 2.79 | 231.72 | 30.66 | 4.11 | 1.70 | 44.39 |
| CHARMIN ESSENTIALS SOFT | Procter & Gamble | Tad | 93.08 | 10.30 | 13.87 | 2.96 | 341.31 | 25.30 | 4.19 | 3.30 | 34.72 |
| COTTONELLE ULTRA CLEANCARE | Kimberly-Clark | Uctad | 86.62 | 12.38 | 65.90 | 3.19 | 257.26 | 44.77 | 7.50 | 7.60 | 56.40 |
| GREAT VALUE ULTRA STRONG CURRENT | Kruger | Tad | 84.98 | 12.73 | 35.31 | 2.39 | 354.86 | 41.62 | 3.17 | 2.50 | 28.42 |
| CHARMIN ULTRA SOFT CURRENT 2020 | Procter & Gamble | Tad | 99.02 | 8.35 | 13.87 | 3.19 | 335.97 | 30.40 | 5.80 | 2.90 | 27.97 |
| UPUP SOFT & STRONG | Irving | Conventional | 81.92 | 14.62 | 27.23 | 2.53 | 157.51 | 21.01 | 2.20 | 1.20 | 28.19 |
| TOTAL HOME ULTRA STRONG | Sofidel | QRT | 91.22 | 10.44 | 46.22 | 2.85 | 150.23 | 23.46 | 7.73 | 2.50 | 14.78 |
| TOTAL HOME ULTRA SOFT | Sofidel | QRT | 95.04 | 9.47 | 47.15 | 3.13 | 139.52 | 23.26 | 10.36 | 2.00 | 16.90 |

TABLE 3

FIG. 25B

WOVEN BASE FABRIC WITH LASER ENERGY ABSORBENT MD AND CD YARNS AND TISSUE PRODUCT MADE USING THE SAME

RELATED APPLICATIONS

This patent application is a continuation-in-part of U.S. patent application Ser. No. 16/881,219, filed May 22, 2020 and entitled WOVEN BASE FABRIC WITH LASER ENERGY ABSORBENT MD AND CD YARNS AND TISSUE PRODUCT MADE USING THE SAME, which in turn claims priority to and the benefit of U.S. Provisional Patent Application No. 62/851,415, filed May 22, 2019, the contents of which are incorporated herein by reference in their entirety.

FIELD OF THE INVENTION

This disclosure relates to machines or apparatus for the production of paper making fabrics, and in particular to tissue paper making fabrics that are multilayered or composite fabrics and methods of manufacturing these fabrics.

BACKGROUND

Tissue manufacturers that can deliver the highest quality product at the lowest cost have a competitive advantage in the marketplace. A key component in determining the cost and quality of a tissue product is the manufacturing process utilized to create the product. For tissue products, there are several manufacturing processes available including conventional dry crepe, through air drying (TAD), or "hybrid" technologies such as Valmet's NTT and QRT processes, Georgia Pacific's ETAD, and Voith's ATMOS process. Each has differences as to installed capital cost, raw material utilization, energy cost, production rates, and the ability to generate desired tissue attributes such as softness, strength, and absorbency.

Conventional manufacturing processes include a forming section designed to retain a fiber, chemical, and filler recipe while allowing water to drain from a web. Many types of forming sections, such as inclined suction breast roll, twin wire C-wrap, twin wire S-wrap, suction forming roll, and Crescent formers, include the use of forming fabrics.

Forming fabrics are woven structures that utilize monofilaments (such as yarns or threads) composed of synthetic polymers (usually polyethylene terephthalate, or nylon). A forming fabric has two surfaces, a sheet side and a machine or wear side. The wear side is in contact with the elements that support and move the fabric and are thus prone to wear. To increase wear resistance and improve drainage, the wear side of the fabric has larger diameter monofilaments compared to the sheet side. The sheet side has finer yarns to promote fiber and filler retention on the fabric surface.

Different weave patterns are utilized to control other properties such as: fabric stability, life potential, drainage, fiber support, and clean-ability. There are three basic types of forming fabrics: single layer, double layer, and triple layer. A single layer fabric is composed of one yarn system made up of cross direction (CD) yarns (also known as shute yarns or weft yarns) and machine direction (MD) yarns (also known as warp yarns). The main issue for single layer fabrics is a lack of dimensional stability. A double layer forming fabric has one layer of warp yarns and two layers of shute yarns or weft yarns. This multilayer fabric is generally more stable and resistant to stretching. Triple layer fabrics have two separate single layer fabrics bound together by separated yarns called binders. Usually the binder fibers are placed in the cross direction but can also be oriented in the machine direction. Triple layer fabrics have further increased dimensional stability, wear potential, drainage, and fiber support than single or double layer fabrics.

The manufacturing of forming fabrics includes the following operations: weaving, initial heat setting, seaming, final heat setting, and finishing. The fabric is made in a loom using two interlacing sets of monofilaments (or threads or yarns). The longitudinal or machine direction threads are called warp threads and the transverse or cross machine direction threads are called shute threads. After weaving, the forming fabric is heated to relieve internal stresses to enhance dimensional stability of the fabric. The next step in manufacturing is seaming. This step converts the flat woven fabric into an endless forming fabric by joining the two MD ends of the fabric. After seaming, a final heat setting is applied to stabilize and relieve the stresses in the seam area. The final step in the manufacturing process is finishing, whereby the fabric is cut to width and sealed.

There are several parameters and tools used to characterize the properties of the forming fabric: mesh (warp count) and knock (weft count), caliper, frames, plane difference, percent open area, air permeability, tensile strength and modulus, stiffness, shear resistance, void volume and distribution, running attitude, fiber support index, drainage index, and stacking. None of these parameters can be used individually to precisely predict the performance of a forming fabric on a paper machine, but together the expected performance and sheet properties can be estimated. Examples of forming fabric designs can be viewed in U.S. Pat. Nos. 3,143,150, 4,184,519, 4,909,284, and 5,806,569.

In a conventional dry crepe process, after web formation and drainage (to around 35% solids) in the forming section (assisted by centripetal force around the forming roll and, in some cases, vacuum boxes), a web is transferred from the forming fabric to a press fabric upon which the web is pressed between a rubber or polyurethane covered suction pressure roll and a Yankee dryer. The press fabric is a permeable fabric designed to uptake water from the web as it is pressed in the press section. It is composed of large monofilaments or multi-filamentous yarns, needled with fine synthetic batt fibers to form a smooth surface for even web pressing against the Yankee dryer. Removing water via pressing reduces energy consumption compared to using heat.

In a conventional TAD process, rather than pressing and compacting the web, as is performed in conventional dry crepe, the web undergoes the steps of imprinting and thermal pre-drying. Imprinting is a step in the process where the web is transferred from a forming fabric to a structured fabric (or imprinting fabric) and subsequently pulled into the structured fabric using vacuum (referred to as imprinting or molding). This step imprints the weave pattern (or knuckle pattern) of the structured fabric into the web. This imprinting step increases softness of the web, and affects smoothness and the bulk structure. The monofilaments of the fabric are typically round in shape but can also be square or rectangular. The web contacting side of the fabric is sometimes sanded to provide higher contact area when pressing against the Yankee dryer to facilitate web transfer. The manufacturing method of an imprinting fabric is similar to a forming fabric (see U.S. Pat. Nos. 3,473,576, 3,573,164, 3,905,863, 3,974,025, and 4,191,609 for examples) except for an additional step of overlaying a polymer.

Imprinting fabrics with an overlaid polymer are disclosed in U.S. Pat. Nos. 6,120,642, 5,679,222, 4,514,345, 5,334,289, 4,528,239 and 4,637,859. Specifically, these patents disclose a method of forming a fabric in which a patterned resin is applied over a woven substrate. The patterned resin completely penetrates the woven substrate. The top surface of the patterned resin is flat and openings in the resin have sides that follow a linear path as the sides approach and then penetrate the woven structure.

U.S. Pat. Nos. 6,610,173, 6,660,362, 6,878,238 and 6,998,017, and European Patent No. EP 1 339 915 disclose another technique for applying an overlaid resin to a woven imprinting fabric. According to this technique, the overlaid polymer has an asymmetrical cross sectional profile in at least one of the machine direction and a cross direction and at least one nonlinear side relative to the vertical axis. The top portion of the overlaid resin can be a variety of shapes and not simply a flat structure. The sides of the overlaid resin, as the resin approaches and then penetrates the woven structure, can also take different forms, not a simple linear path 90 degrees relative to the vertical axis of the fabric. Both methods result in a patterned resin applied over a woven substrate. The benefit is that resulting patterns are not limited by a woven structure and can be created in any desired shape to enable a higher level of control of the web structure and topography that dictate web quality properties.

After imprinting, the web is thermally pre-dried by moving hot air through the web while it is conveyed on the structured fabric. Thermal pre-drying can be used to dry the web to over 90% solids before the web is transferred to a steam heated cylinder. The web is then transferred from the structured fabric to the steam heated cylinder through a very low intensity nip (up to 10 times less than a conventional press nip) between a solid pressure roll and the steam heated cylinder. The portions of the web that are pressed between the pressure roll and steam cylinder rest on knuckles of the structured fabric; thereby protecting most of the web from the light compaction that occurs in this nip. The steam cylinder and an optional air cap system, for impinging hot air, then dry the sheet to up to 99% solids during the drying stage before creping occurs. The creping step of the process again only affects the knuckle sections of the web that are in contact with the steam cylinder surface. Due to only the knuckles of the web being creped, along with the dominant surface topography being generated by the structured fabric, and the higher thickness of the TAD web, the creping process has a much smaller effect on overall softness as compared to conventional dry crepe. After creping, the web is optionally calendared and reeled into a parent roll and ready for a converting process. Some TAD machines utilize fabrics (similar to dryer fabrics) to support the sheet from the crepe blade to the reel drum to aid in sheet stability and productivity. Patents which describe creped through air dried products include U.S. Pat. Nos. 3,994,771, 4,102,737, 4,529,480, and 5,510,002.

The TAD process generally has higher capital costs as compared to a conventional tissue machine due to the amount of air handling equipment needed for the TAD section. Also, the TAD process has a higher energy consumption rate due to the need to burn natural gas or other fuels for thermal pre-drying. However, the bulk softness and absorbency of a paper product made from the TAD process is superior to conventional paper due to the superior bulk generation via structured fabrics, which creates a low density, high void volume web that retains its bulk when wetted. The surface smoothness of a TAD web can approach that of a conventional tissue web. The productivity of a TAD machine is less than that of a conventional tissue machine due to the complexity of the process and the difficulty of providing a robust and stable coating package on the Yankee dryer needed for transfer and creping of a delicate pre-dried web.

UCTAD (un-creped through air drying) is a variation of the TAD process in which the sheet is not creped, but rather dried up to 99% solids using thermal drying, blown off the structured fabric (using air), and then optionally calendared and reeled. U.S. Pat. No. 5,607,551 describes an uncreped through air dried product.

A process/method and paper machine system for producing tissue has been developed by the Voith company and is marketed under the name ATMOS. The process/method and paper machine system have several variations, but all involve the use of a structured fabric in conjunction with a belt press. The major steps of the ATMOS process and its variations are stock preparation, forming, imprinting, pressing (using a belt press), creping, calendaring (optional), and reeling the web.

The stock preparation step of the ATMOS process is the same as that of a conventional or TAD machine. The forming process can utilize a twin wire former (as described in U.S. Pat. No. 7,744,726), a Crescent Former with a suction Forming Roll (as described in U.S. Pat. No. 6,821,391), or a Crescent Former (as described in U.S. Pat. No. 7,387,706). The former is provided with a slurry from the headbox to a nip formed by a structured fabric (inner position/in contact with the forming roll) and forming fabric (outer position). The fibers from the slurry are predominately collected in the valleys (or pockets, pillows) of the structured fabric and the web is dewatered through the forming fabric. This method for forming the web results in a bulk structure and surface topography as described in U.S. Pat. No. 7,387,706 (FIGS. 1-11). After the forming roll, the structured and forming fabrics separate, with the web remaining in contact with the structured fabric.

The web is then transported on the structured fabric to a belt press. The belt press can have multiple configurations. The press dewaters the web while protecting the areas of the sheet within the structured fabric valleys from compaction. Moisture is pressed out of the web, through the dewatering fabric, and into the vacuum roll. The press belt is permeable and allows for air to pass through the belt, web, and dewatering fabric, and into the vacuum roll, thereby enhancing the moisture removal. Since both the belt and dewatering fabric are permeable, a hot air hood can be placed inside of the belt press to further enhance moisture removal. Alternately, the belt press can have a pressing device which includes several press shoes, with individual actuators to control cross direction moisture profile, or a press roll. A common arrangement of the belt press has the web pressed against a permeable dewatering fabric across a vacuum roll by a permeable extended nip belt press. Inside the belt press is a hot air hood that includes a steam shower to enhance moisture removal. The hot air hood apparatus over the belt press can be made more energy efficient by reusing a portion of heated exhaust air from the Yankee air cap or recirculating a portion of the exhaust air from the hot air apparatus itself.

After the belt press, a second press is used to nip the web between the structured fabric and dewatering felt by one hard and one soft roll. The press roll under the dewatering fabric can be supplied with vacuum to further assist water removal. This belt press arrangement is described in U.S. Pat. Nos. 8,382,956 and 8,580,083, with FIG. 1 showing the arrangement. Rather than sending the web through a second press after the belt press, the web can travel through a boost dryer, a high pressure through air dryer, a two pass high pressure through air dryer or a vacuum box with hot air supply hood. U.S. Pat. Nos. 7,510,631, 7,686,923, 7,931,781, 8,075,739, and 8,092,652 further describe methods and systems for using a belt press and structured fabric to make tissue products each having variations in fabric designs, nip pressures, dwell times, etc. A wire turning roll can be also be utilized with vacuum before the sheet is transferred to a steam heated cylinder via a pressure roll nip.

The sheet is now transferred to a steam heated cylinder via a press element. The press element can be a through drilled (bored) pressure roll, a through drilled (bored) and blind drilled (blind bored) pressure roll, or a shoe press. After the web leaves this press element and before it contacts the steam heated cylinder, the % solids are in the range of 40-50%. The steam heated cylinder is coated with chemistry to aid in sticking the sheet to the cylinder at the press element nip and also to aid in removal of the sheet at the doctor blade. The sheet is dried to up to 99% solids by the steam heated cylinder and an installed hot air impingement hood over the cylinder. This drying process, the coating of the cylinder with chemistry, and the removal of the web with doctoring is explained in U.S. Pat. Nos. 7,582,187 and 7,905,989. The doctoring of the sheet off the Yankee, i.e., creping, is similar to that of TAD with only the knuckle sections of the web being creped. Thus, the dominant surface topography is generated by the structured fabric, with the creping process having a much smaller effect on overall softness as compared to conventional dry crepe. The web is now calendared (optional), slit, reeled and ready for the converting process.

The ATMOS process has capital costs between that of a conventional tissue machine and a TAD machine. It uses more fabrics and a more complex drying system compared to a conventional machine, but uses less equipment than a TAD machine. The energy costs are also between that of a conventional and a TAD machine due to the energy efficient hot air hood and belt press. The productivity of the ATMOS machine has been limited due to the inability of the novel belt press and hood to fully dewater the web and poor web transfer to the Yankee dryer, likely driven by poor supported coating packages, the inability of the process to utilize structured fabric release chemistry, and the inability to utilize overlaid fabrics to increase web contact area to the dryer. Poor adhesion of the web to the Yankee dryer has resulted in poor creping and stretch development which contributes to sheet handling issues in the reel section. The result is that the output of an ATMOS machine is currently below that of conventional and TAD machines. The bulk softness and absorbency is superior to conventional, but lower than a TAD web since some compaction of the sheet occurs within the belt press, especially areas of the web not protected within the pockets of the fabric. Also, bulk is limited since there is no speed differential to help drive the web into the structured fabric as exists on a TAD machine. The surface smoothness of an ATMOS web is between that of a TAD web and a conventional web primarily due to the current limitation on use of overlaid structured fabrics.

The ATMOS manufacturing technique is often described as a hybrid technology because it utilizes a structured fabric like the TAD process, but also utilizes energy efficient means to dewater the sheet like the conventional dry crepe process. Other manufacturing techniques which employ the use of a structured fabric along with an energy efficient dewatering process are the ETAD process and NTT process. The ETAD process and products are described in U.S. Pat. Nos. 7,339,378, 7,442,278, and 7,494,563. The NTT process and products are described in WO 2009/061079 A1, United States Patent Application Publication No. 2011/0180223 A1, and United States Patent Application Publication No. 2010/0065234 A1. The QRT process is described in United States Patent Application Publication No. 2008/0156450 A1 and U.S. Pat. No. 7,811,418. A structuring belt manufacturing process used for the NTT, QRT, and ETAD imprinting process is described in U.S. Pat. No. 8,980,062 and United States Patent Application Publication No. US 2010/0236034.

The NTT fabric forming process involves spirally winding strips of polymeric material, such as industrial strapping or ribbon material, and adjoining the sides of the strips of material using ultrasonic, infrared, or laser welding techniques to produce an endless belt. Optionally, a filler or gap material can be placed between the strips of material and melted using the aforementioned welding techniques to join the strips of materials. The strips of polymeric material are produced by an extrusion process from any polymeric resin such as polyester, polyamide, polyurethane, polypropylene, or polyether ether ketone resins. The strip material can also be reinforced by incorporating monofilaments of polymeric material into the strips during the extrusion process or by laminating a layer of woven polymer monofilaments to the non-sheet contacting surface of a finished endless belt composed of welded strip material. The endless belt can have a textured surface produced using processes such as sanding, graving, embossing, or etching. The belt can be impermeable to air and water, or made permeable by processes such as punching, drilling, or laser drilling. Examples of structuring belts used in the NTT process can be viewed in International Publication Number WO 2009/067079 A1 and United States Patent Application Publication No. 2010/0065234 A1.

As shown in the aforementioned discussion of tissue papermaking technologies, the fabrics or belts utilized are critical in the development of the tissue web structure and topography which, in turn, are instrumental in determining the quality characteristics of the web such as softness (bulk softness and surfaces smoothness) and absorbency. The manufacturing process for making these fabrics has been limited to weaving a fabric (primarily forming fabrics and structured fabrics) or a base structure and needling synthetic fibers (press fabrics) or overlaying a polymeric resin (overlaid structured fabrics) to the fabric/base structure, or welding strips of polymeric material together to form an endless belt.

Conventional overlaid structures require application of an uncured polymer resin over a woven substrate where the resin completely penetrates through the thickness of the woven structure. Certain areas of the resin are cured and other areas are uncured and washed away from the woven structure. This results in a fabric where airflow through the fabric is only possible in the Z-direction. Thus, in order for the web to dry efficiently, only highly permeable fabrics can be utilized, meaning the amount of overlaid resin applied needs to be limited. If a fabric of low permeability is produced in this manner, then drying efficiency is significantly reduced, resulting in poor energy efficiency and/or low production rates as the web must be transported slowly across the TAD drums or ATMOS drum for sufficient drying. Similarly, a welded polymer structuring layer is extremely planar and provides an even surface when laminating to a woven support layer, which results in no air channels in the X-Y plane.

As described in U.S. Pat. No. 10,208,426 B2, fabrics comprised of extruded polymer netting laminated to a woven structure utilize less energy to dry the sheet compared to prior designs. Both the extruded polymer netting layer and woven layer have non-planar, irregularly shaped surfaces that when laminated together only weld together where the two layers come into direct contact. This creates air channels in the X-Y plane of the fabric through which air can travel when the sheet is being dried with hot air in the TAD, UCTAD, or ATMOS processes. Without being bound by theory, it is likely that the airflow path and dwell time is longer through this type of fabric, allowing the air to remove higher amounts of water compared to prior designs. Prior woven and overlaid designs create channels where airflow is channeled in the Z-direction by the physical restrictions imposed by the monofilaments or polymers of the belt that create the pocket boundaries of the belt. The polymer netting/woven structure design allows for less restricted airflow in the X-Y plane such that airflow can move parallel through the belt and web across multiple pocket boundaries and thereby increase contact time of the airflow within the web to remove additional water. This allows for the use of lower permeable belts compared to prior fabrics without increasing the energy demand per ton of paper dried. The air flow in the X-Y plane also reduces high velocity air flow in the Z-direction as the sheet and fabric pass across the molding box, reducing the occurrence of pin holes in the sheet.

Additionally, a process for manufacturing a structuring fabric or the web contacting layer of a laminated structuring fabric by laying down polymers of specific material properties in an additive manner under computer control (3-D printing) has been described in U.S. Pat. No. 10,099,425 and U.S. Provisional Patent Application No. 62/897,596.

U.S. patent application Ser. No. 16/881,219 describes a structuring belt and method for making a structuring tissue belt assembly comprising: a supporting layer comprising a top surface and a bottom surface, the supporting layer being formed of one or more layers of warp monofilaments interwoven with one or more layers of weft monofilaments in a repeating pattern, at least one of: a) at least some of the warp monofilaments; or b) at least some of the weft monofilaments, comprising laser energy absorbent material; a non-woven web contacting layer comprising a bottom surface; one or more first laser welds that attach the bottom surface of the web contacting layer to the top surface of the supporting layer at points where the web contacting layer contacts the at least one of: a) the at least some of the warp monofilaments; or b) the at least some of the weft monofilaments that comprise laser energy absorbent material, wherein the structured tissue belt assembly allows for air flow in x, y and z directions. There is a continuing need for improved structuring belts that provide different properties in paper tissue or paper towel made on the structuring belt.

All patents and patent applications mentioned herein are hereby incorporated by reference in their entirety.

SUMMARY OF THE INVENTION

An object of the present invention is to provide for a composite structuring fabric comprised of a woven supporting layer laser laminated with a web contacting layer, where the web contacting layer is comprised of extruded monofilaments spaced apart in approximately the machine direction.

In an exemplary embodiment, the woven supporting layer is a single layer fabric comprised of a 5-shed design with a 1, 2, 3, 4, 5 warp pick sequence. This means the pattern for the cross direction monofilament (weft) weave are one weft monofilament over four machine direction monofilaments (warps), then under one machine direction monofilament, then repeat. This pattern provides for a nearly level and repeatable plane in which to create contact points with the web contacting layer monofilaments resulting in an even embedment distance of the web contacting monofilaments into the supporting layer monofilaments during laser lamination. The cross direction monofilaments of the supporting layer may be triangular, square, round, oval, rectangular, or star in shape with a circumference of between about 0.75 mm to about 1.5 mm or preferably 0.8 mm to 1.4 mm or most preferably 0.9 mm to 1.25 mm. The machine direction monofilaments of the supporting layer may be triangular, round, square, oval, star, or rectangular in shape with a circumference of about 0.75 mm to about 1.5 mm or preferably 0.8 mm to 1.4 mm or most preferably 0.9 mm to 1.25 mm.

In an exemplary embodiment, the warp monofilaments and the weft monofilaments are formed at least in part of a thermoplastic polymer, a thermoset polymer, or a combination thereof. In an exemplary embodiment, the polymer type is polybutylene terephthalate, polyester, polyamide, polyurethane, polypropylene, polyethylene, polyethylene terephthalate, polyether ether ketone resins or combinations thereof. The monofilaments may be made by melting and blending the polymers, such as polyethylene terephthalate and polyurethane, then extruding the blend into filaments and cooling the filaments ("PET/PU filaments"), as described in U.S. Pat. Nos. 5,502,120 and 5,169,711, the contents of which are incorporated herein by reference in their entirety. The monofilaments can be bicomponent with a sheath and core structure, meaning the inner core of the monofilament is made of a different material than the outer sheath material. This may be preferred as the inner core material could have higher strength and flexibility properties while the outer material has higher temperature and abrasion resistance properties.

The monofilaments may comprise laser energy absorbing material such as pigments, dyes, carbon black, rubber, graphite, ceramic and combinations thereof. The laser energy absorbent material may be mixed with the thermoplastic material used to form the web contacting layer or at least some of the warp monofilaments or the weft monofilaments, and/or coated onto the web contacting layer or monofilaments of the supporting layer. The amount of laser absorbent material in or on the web contacting layer or the monofilaments of the supporting layer depends on the optical characteristics of the additive and properties of the polymer such as heat capacity and latent heat of fusion, but typically may range from about 0.05 percent to about 5 percent or from about 0.1 percent to about 5 percent by weight of the web contacting layer or monofilaments of the supporting layer. The monofilaments may be any shape, for example round, rectangular, square, multilobal, Y, star, pyramid or other shapes. Other laser energy absorbent materials may also be used. In an exemplary embodiment, carbon black is present in at least one of the at least some of the warp monofilaments or the at least some of the weft monofilaments by an amount of between 0.05% to 5% by weight.

In an exemplary embodiment, the at least some of the weft monofilaments that are formed at least in part of the laser energy absorbent material is 25% to 75% of all weft monofilaments in the fabric assembly.

In an exemplary embodiment, the woven supporting layer is comprised of a double layer fabric comprised of a first layer 5-shed design with a 1, 2, 3, 4, 5 warp pick sequence with the second cross direction monofilament layer having a larger circumference than the first cross direction monofilament layer. The first cross direction monofilaments of the supporting layer may be triangular, square, round, oval, rectangular, or star in shape with a circumference of between about 0.75 mm to 1.5 mm or preferably 0.8 mm to 1.4 mm or most preferably 0.9 mm to 1.25 mm. The second cross direction monofilaments of the supporting layer may be square, rectangular, oval, star, or round in shape with a circumference between about 0.75 mm to about 2.0 mm or preferably 1.0 mm to 1.75 mm or most preferably 1.25 mm to 1.5 mm. The second cross direction monofilaments are placed between every three to ten weft monofilaments of the first layer. The machine direction monofilaments of the supporting layer may be triangular, round, square, oval, star, or rectangular in shape with a circumference of between about 0.75 mm to about 1.5 mm or preferably 0.8 mm to 1.4 mm or most preferably 0.9 mm to 1.25 mm. Some of the filaments of the supporting layer may be PET/PU filaments. The PET/PU filaments may be woven as part of the supporting layer.

In an exemplary embodiment, the monofilaments of the web contacting layer are triangular, round, oval, square, rectangular, or star in shape with a circumference of between about 0.5 mm to 3.0 mm or preferably 1.0 mm to 2.5 mm or most preferably 1.5 mm to 2.5 mm, spaced apart by 0.25 mm to 5.0 mm, or preferably 0.5 mm to 3.0 mm, or most preferably 0.5 mm to 1.5 mm. The filaments of the web contacting layer are preferably PET/PU filaments. The inclusion of PET/PU filaments in both the supporting layer and the web contacting layer provides a structured fabric having thermal resistance, which means the fabric will have a longer useful life under papermaking machine conditions of heat and water. The fabrics also provide soft nip transfer, which leads to improved properties in paper tissue and paper towel made using the structured fabrics.

A structured tissue belt assembly according to an exemplary embodiment of the present invention comprises: a supporting layer comprising atop surface and a bottom surface, the supporting layer being formed of one or more layers of warp monofilaments interwoven with one or more layers of weft monofilaments in a repeating pattern, at least one of: a) at least some of the warp monofilaments; or b) at least some of the weft monofilaments, comprising laser energy absorbent material; a web contacting layer of approximately machine direction oriented monofilaments comprising a bottom surface; one or more first laser welds that attach the bottom surface of the web contacting layer to the top surface of the supporting layer at points where the web contacting layer contacts the at least one of: a) the at least some of the warp monofilaments; or b) the at least some of the weft monofilaments that comprise laser energy absorbent material.

An object of the present invention is to provide improved papermaking fabrics and processes for making paper. For instance, current methods to laminate a web contacting layer to a supporting layer of a composite fabric using a laser can also create connections or welds between the warp yarns and the weft yarns of the supporting layer, making the fabric too rigid and wrinkle prone on the machine. Exemplary embodiments of the present invention provide an improved lamination technique to overcome this issue.

Another object of this invention is to provide an improved bath tissue product. The bath tissue according to exemplary embodiments of the present invention may be produced using a laminated structuring belt of the type described herein, and has unique surface topography attributes of high "texture directionality in the machine direction" (Sstgy) and low "surface roughness" (Sq). The improved bath tissue product preferably has a Sstgy of greater than 3.5 and an Sq of less than 30 microns. Without being bound by theory, it is believed that a tissue sheet with high texture directionality in the machine direction provides for improved creping as the machine direction oriented surface provides for more uninterrupted areas of creping. Creping is an important component of producing a soft tissue product. High Sstgy can also provide for improved production of the tissue web as the web is under constant tension in the machine direction and high Sstgy allows for strength to be more easily generated in the machine direction to resist breaking of the tissue web under this high machine direction tension. The high Sstgy may also be responsible for the low surface roughness through improved creping. Low surface roughness gives the tissue a softer and smoother feel when used by the consumer.

A structured tissue belt assembly according to an exemplary embodiment of the present invention comprises: a supporting layer comprising atop surface and a bottom surface, the supporting layer being formed of one or more layers of warp yarns interwoven with weft yarns in a repeating pattern, at least one of: a) at least some of the warp yarns; or b) at least some of the weft yarns, comprising laser energy absorbent material; a non-woven web contacting layer comprising a bottom surface; one or more first laser welds that attach the bottom surface of the web contacting layer to the top surface of the supporting layer at points where the web contacting layer contacts the at least one of: a) the at least some of the warp yarns; or b) the at least some of the weft yarns that comprise laser energy absorbent material, wherein the structured tissue belt assembly allows for air flow in x, y and z directions, wherein an embedment distance between the supporting layer and the web contacting layer is 0.05 mm to 0.60 mm, and wherein a peel force between the web contacting layer and the supporting layer is at least 650 gf/inch.

In an exemplary embodiment, at least some of the weft yarns are formed at least in part of the laser energy absorbent material.

In an exemplary embodiment, the warp yarns are devoid of the laser energy absorbent material.

In an exemplary embodiment, at least some warp yarns are formed of a laser energy transparent material and the at least some warp yarns are connected to the at least some of the weft yarns formed at least in part of the laser energy absorbent material at one or more second laser welds formed at points where the warp yarns pass over the weft yarns formed at least in part of the laser energy absorbent material.

In an exemplary embodiment, the web contacting layer is attached to the top surface of the supporting layer by the one or more first laser welds formed between the bottom surface of the web contacting layer and the at least some of the weft yarns formed at least in part of the laser energy absorbent material at points where the at least some of the weft yarns form at least part of the top surface.

In an exemplary embodiment, at least some of the warp yarns are formed at least in part of the laser energy absorbent material.

In an exemplary embodiment, the weft yarns are devoid of laser energy absorbent material, In an exemplary embodiment, at least some weft yarns are formed of a laser energy transparent material and the at least some of weft yarns are connected to the at least some of the warp yarns formed at least in part of the laser energy absorbent material at one or more second laser welds forms at points where the weft yarns pass over the warp yarns formed at least in part of the laser energy absorbent material.

In an exemplary embodiment, the web contacting layer is attached to the top surface of the supporting layer by the one or more first laser welds formed between the bottom surface of the web contacting layer and the at least some of the warp yarns formed at least in part of the laser energy absorbent material at points where the at least some of the warp yarns form at least part of the top surface.

In an exemplary embodiment, the warp yarns and the weft yarns are formed at least in part of a thermoplastic polymer, a thermoset polymer, or a combination thereof.

In an exemplary embodiment, the polymer type is polybutylene terephthalate, polyester, polyamide, polyurethane, polypropylene, polyethylene, polyethylene terephthalate, polyether ether ketone resins or combinations thereof.

In an exemplary embodiment, the warp yarns and the weft yarns are bicomponent yarns.

In an exemplary embodiment, the warp yarns and the weft yarns have a consistent shape.

In an exemplary embodiment, the warp yarns and the weft yarns have a varying shape.

In an exemplary embodiment, the warp and the weft yarns have a shape selected from the group consisting of: circular, rectangular, star shaped, and oval shaped.

In an exemplary embodiment, the web contacting layer is formed of an extruded polymer netting or a 3-D printed polymer.

In an exemplary embodiment, the polymer is a thermoplastic polymer, a thermoset polymer, or a combination thereof.

In an exemplary embodiment, the polymer is polybutylene terephthalate, polyester, polyamide, polyurethane, polypropylene, polyethylene, polyethylene terephthalate, polyether ether ketone resins or combinations thereof.

In an exemplary embodiment, the laser energy absorbent material comprises carbon black.

In an exemplary embodiment, the carbon black is present in at least one of the at least some of the warp yarns or the at least some of the weft yarns by an amount of between about 0.05% to about 5% by weight.

In an exemplary embodiment, the at least some of the weft yarns that are formed at least in part of the laser energy absorbent material is about 25% to about 75% of all weft yarns in the fabric assembly.

In an exemplary embodiment, the at least some of the warp yarns that are formed at least in part of the laser energy absorbent material is about 25% to about 75% of all warp yarns in the fabric assembly.

In an exemplary embodiment, a peel force between the web contacting layer and the supporting layer is 650 gf/inch to 6000 gf/in.

In an exemplary embodiment, the peel force is 2000 gf/in to 4500 gf/in.

In an exemplary embodiment, a shear number of the structured tissue fabric belt assembly is 35 to 250.

In an exemplary embodiment, the shear number is 150 to 225.

In an exemplary embodiment, the embedment distance is 0.10 mm to 0.36 mm.

A method of making a structured tissue belt assembly according to an exemplary embodiment of the present invention comprises: providing a supporting layer comprising warp monofilaments and weft monofilaments interwoven in a repeating pattern, at least one of: a) at least some of the warp monofilaments or b) at least some of the weft monofilaments being formed at least in part of a laser energy absorbent material, the supporting layer having a top surface; spirally winding and stretching only a single web contacting layer monofilament formed of laser energy transparent material onto the top surface of the supporting layer; impinging the web contacting layer monofilament onto the top surface of the supporting layer with a minimum of 0.1 PLI downward force; radiating the web contacting layer with a laser to form one or more first laser welds between a bottom surface of the web contacting layer and the top surface of the supporting layer at points where the web contacting layer contacts the at least one of: a) the at least some of the warp monofilaments or; b) the at least some of the weft monofilaments formed at least in part of the laser energy absorbent material, wherein an embedment distance between the supporting layer and the web contacting layer is 0.05 mm to 0.60 mm, and wherein a peel force between the web contacting layer and the supporting layer is at least 650 gf/inch.

In an exemplary embodiment of the method, at least some of the warp monofilaments of the supporting layer are formed at least in part of a laser energy absorbent material.

In an exemplary embodiment of the method, the weft monofilaments of the supporting layer are devoid of the laser energy absorbent material.

In an exemplary embodiment of the method, the at least some weft monofilaments of the supporting layer are formed of a laser energy transparent material and the at least some weft monofilaments of the supporting layer are connected to the at least some of the warp monofilaments formed at least in part of the laser energy absorbent material by one or more second laser welds formed at points where the weft monofilaments pass over the warp monofilaments formed at least in part of the laser energy absorbent material.

In an exemplary embodiment of the method, at least some of the weft monofilaments of the supporting layer are formed at least in part of a laser energy absorbent material.

In an exemplary embodiment of the method, the warp monofilaments of the supporting layer are devoid of the laser energy absorbent material.

In an exemplary embodiment of the method, the at least some warp monofilaments of the supporting layer are formed of a laser energy transparent material and the at least some warp monofilaments of the supporting layer are connected to the at least some of the weft monofilaments formed at least in part of the laser energy absorbent material by one or more second laser welds formed at points where the warp monofilaments pass over the weft monofilaments formed at least in part of the laser energy absorbent material.

In an exemplary embodiment of the method, the downward force is about 0.25 to about 1.0 PLI.

In an exemplary embodiment of the method, the laser has a power level of about 120 to about 200 watts.

A structured tissue belt assembly according to an exemplary embodiment of the present invention comprises: a supporting layer comprising atop surface and a bottom surface, the supporting layer being formed of one or more layers of warp monofilaments interwoven with one or more layers of weft monofilaments in a repeating pattern, at least one of: a) at least some of the warp monofilaments; or b) at least some of the weft monofilaments, comprising laser energy absorbent material, the supporting layer being needled with fine synthetic batting; and a web contacting layer of approximately machine direction oriented monofilaments formed of a laser energy transparent material; and one or more first laser welds that attach a bottom surface of the web contacting layer to the top surface of the supporting layer at points where the web contacting layer contacts the at least one of: a) the at least some of the warp monofilaments; or b) the at least some of the weft monofilaments that comprise laser energy absorbent material, wherein the structured tissue belt assembly allows for air flow in the x, y and z directions, wherein an embedment distance between the supporting layer and the web contacting layer is 0.05 mm to 0.60 mm, and wherein a peel force between the web contacting layer and the supporting layer is at least 650 gf/inch.

A structured tissue belt assembly according to an exemplary embodiment of the present invention comprises: a supporting layer comprising a top surface and a bottom surface, the supporting layer being formed of one or more layers of warp monofilaments interwoven with one or more layers of weft monofilaments in a repeating pattern, the warp monofilaments and the weft monofilaments being formed of a laser energy transparent material; a non-woven web contacting layer of approximately machine direction oriented monofilaments at least a portion of which comprises a laser energy absorbent material; and one or more laser welds that attach the top surface of the supporting layer to a bottom surface of the web contacting layer at points where the at least a portion of the web contacting layer contacts at least one of: a) at least some of the warp monofilaments; or b) at least some of the weft monofilaments, wherein the structured tissue belt assembly allows for air flow in x, y and z directions, wherein an embedment distance between the supporting layer and the web contacting layer is 0.05 mm to 0.60 mm, and wherein a peel force between the web contacting layer and the supporting layer is at least 650 gf/inch.

A method of making a structured tissue belt assembly according to an exemplary embodiment of the present invention comprises: spirally winding and stretching approximately machine direction oriented monofilament of a web contacting layer comprising laser energy absorbent material; stretching the non-woven web contacting layer; providing a supporting layer comprising warp monofilaments and weft monofilaments interwoven in a repeating pattern and comprising laser energy transparent material, the supporting layer having a top surface; impinging the top surface of the supporting layer to a bottom surface of the web contacting layer with a minimum of 0.1 PLI downward force; and radiating the supporting layer with a laser to form one or more laser welds that attach the bottom surface of the web contacting layer to the top surface of the supporting layer at points where the laser energy absorbent material of the web contacting layer contacts at least one of the warp monofilaments or the weft monofilaments of the supporting layer, wherein an embedment distance between the supporting layer and the web contacting layer is 0.05 mm to 0.60 mm, and wherein a peel force between the web contacting layer and the supporting layer is at least 650 gf/inch.

A structured tissue belt assembly according to an exemplary embodiment of the present invention comprises: a supporting layer comprising a top surface and a bottom surface, the supporting layer being formed of one or more layers of warp monofilaments interwoven with weft monofilaments in a repeating pattern, the warp monofilaments and the weft monofilaments being formed of laser energy transparent material, the supporting layer being needled with fine synthetic batting; a web contacting layer of approximately machine direction oriented monofilaments comprising a laser energy absorbent material; and one or more laser welds that attach a bottom surface of the web contacting layer to the top surface of the supporting layer at points where the laser energy absorbent material of the web contacting layer contacts at least one of the warp monofilaments or the weft monofilaments, wherein the structured tissue belt assembly allows for air flow in x, y and z directions, wherein an embedment distance between the supporting layer and the web contacting layer is 0.05 mm to 0.60 mm, and wherein a peel force between the web contacting layer and the supporting layer is at least 650 gf/inch.

A bath tissue product according to an exemplary embodiment of the present invention comprises: a laminate of at least two plies of a multi-layer tissue web, the tissue product having a Sstgy of greater than 3.5 and an Sq of less than 30 microns, wherein the bath tissue product is a roll good bath tissue product.

In an exemplary embodiment, the multi-layer tissue web comprises: a first exterior layer; an interior layer; and a second exterior layer.

In an exemplary embodiment, the first exterior layer comprises at least 50% virgin hardwood fibers.

In an exemplary embodiment, the first exterior layer comprises at least 75% virgin hardwood fibers.

In an exemplary embodiment, the virgin hardwood fibers is virgin eucalyptus fibers.

In an exemplary embodiment, the interior layer contains a first wet end additive comprising an ionic surfactant and a second wet end additive comprising a non-ionic surfactant.

In an exemplary embodiment, the first exterior layer comprises a wet end dry strength additive.

In an exemplary embodiment, the wet end dry strength additive comprises a graft copolymer composition of a vinyl monomer and a functionalized vinyl amine-containing base polymer.

In an exemplary embodiment, the second exterior layer comprises a wet end dry strength additive.

In an exemplary embodiment, the wet end dry strength additive comprises a graft copolymer composition of a vinyl monomer and a functionalized vinyl amine-containing base polymer.

In an exemplary embodiment, the second wet end additive comprises an ethoxylated vegetable oil.

In an exemplary embodiment, the second wet end additive comprises a combination of ethoxylated vegetable oils.

In an exemplary embodiment, the ratio by weight of the second wet end additive to the first wet end additive in the tissue is at least eight to one.

In an exemplary embodiment, the ratio by weight of the second wet end additive to the first wet end additive in the tissue is at most ninety to one.

In an exemplary embodiment, the ionic surfactant comprises a debonder.

In an exemplary embodiment, the first and second exterior layers are substantially free of surface deposited softener agents or lotions.

In an exemplary embodiment, the first exterior layer comprises a surface deposited softener agent or lotion.

In an exemplary embodiment, the non-ionic surfactant has a hydrophilic-lipophilic balance of less than 8.

In an exemplary embodiment, the bath tissue product has an MD tensile strength and CD tensile strength of at least 50 N/m and a basis weight of less than 40 gsm.

In an exemplary embodiment, each of the at least two plies comprises embossed areas, wherein the embossed area occupy between 3% to 15% of the total surface area of a surface of the ply.

In an exemplary embodiment, the bath tissue product comprises one or more portions oriented in a common direction containing fibers at a higher concentration as compared to other portions of the tissue product.

In an exemplary embodiment, the one or more portions are oriented in the cross-direction.

In an exemplary embodiment, the one or more portions are oriented in the machine-direction.

In an exemplary embodiment, the one or more portions comprise portions oriented in the machine-direction and portions oriented in the cross-direction.

A detailed description of the fabrics of the invention and the lamination process follows.

BRIEF DESCRIPTION OF THE DRAWINGS

The features and advantages of exemplary embodiments of the present invention will be more fully understood with reference to the following, detailed description when taken in conjunction with the accompanying figures, wherein:

FIG. 25A is a table showing test results of various attributes of bath tissue product according to exemplary embodiments of the present invention and comparative examples;

FIG. 25B is a table showing test results of various attributes of bath tissue product according to an exemplary embodiments of the present invention and comparative examples;

DETAILED DESCRIPTION

Certain terminology is used in the following description for convenience only and is not limiting. Fabrics according to the present invention are industrial textiles, which can have many industrial applications, such as conveyor belts, structuring fabrics, etc. The words "support side" and "machine side" designate surfaces of the fabric with reference to their use in one application as a structuring fabric application; however, these terms merely represent first and second or upper and lower surfaces of the planar fabric. "Yarn" is used to generically identify a monofilament or multifilament fiber. "Warp" and "weft" are used to designate yarns or monofilaments based on their position in the loom that extend in perpendicular directions in the fabric and either could be a machine direction (MD) or cross-machine direction (CD) yarn in the fabric once it is installed on a piece of equipment, depending on whether the fabric is flat woven or continuously woven. As used herein, "laser energy transparent" means that the fiber or yarn or portions thereof do not absorb laser energy and do not generate heat upon application of laser energy. Also, as used herein, "bath tissue" refers to sanitary absorbent paper, in a roll form, for use in drying or cleaning oneself after defecation and/or urination, and may also be referred to as "toilet paper."

The present invention provides structured fabrics with selective adhesion or connection of a web contacting layer to the supporting layer as well as between warp yarns and weft yarns within the supporting layer in order to provide a desired flexibility and/or shear resistance of the composite fabric.

Figure 14:
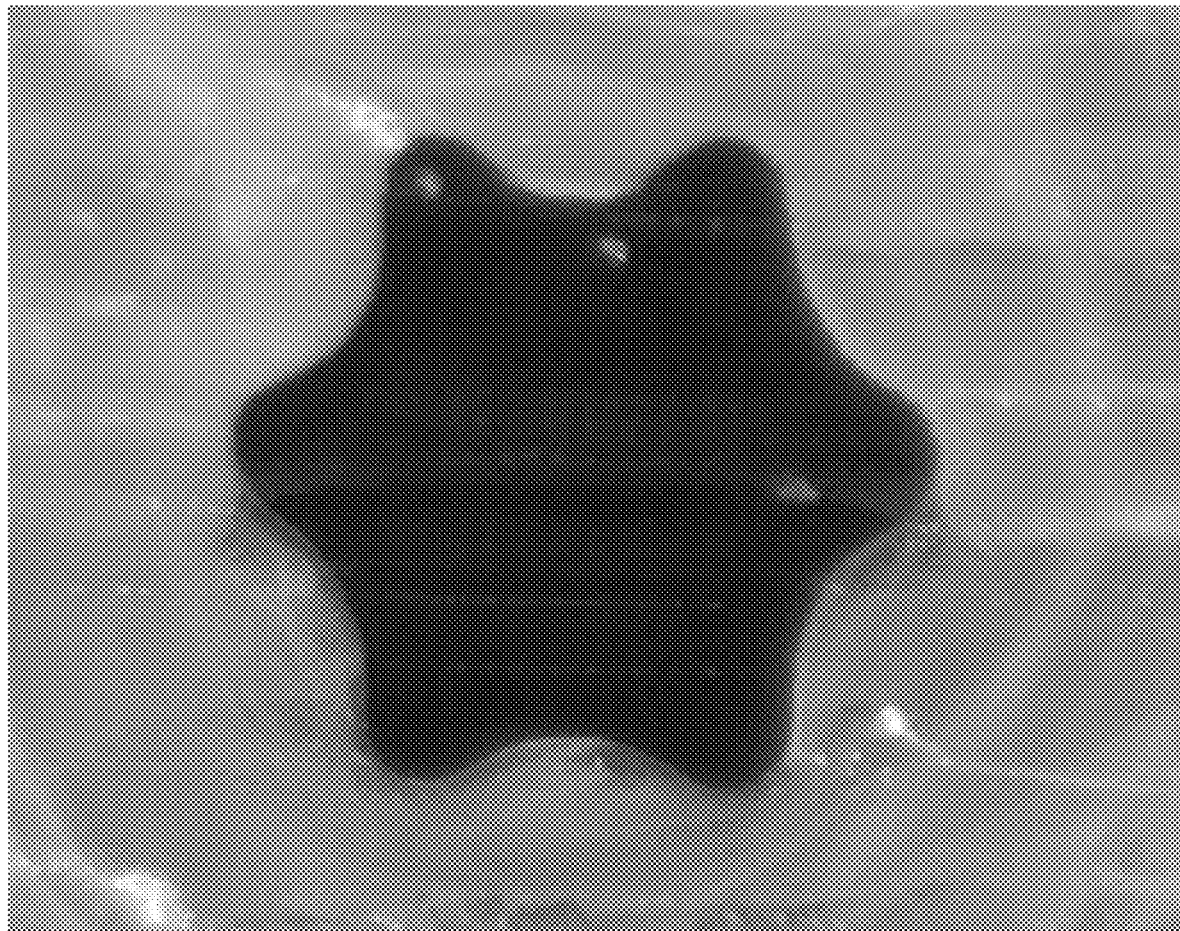
FIG. 14 is a micrograph showing a cross section of a star shaped fiber.

The selective adhesion is at least partially provided by the use of laser energy absorbent material in the yarns that make up the fabric. Alternatively, the laser energy absorbent material may be in the web contacting layer of the fabric and not in the yarns that makeup the supporting layer of the fabric. In other words, the web contacting layer or portions thereof may be laser energy absorbent and/or the yarns that make up the supporting layer of the fabric or portions thereof may be laser energy transparent. Suitable laser energy absorbent materials include, but are not limited to pigments, dyes, carbon black, rubber, graphite, ceramic and combinations thereof. The laser energy absorbent material may be mixed with the thermoplastic material used to form the web contacting layer or at least some of the warp yarns or the weft yarns, and/or coated onto the web contacting layer or fibers or yarns of the supporting layer. The amount of laser absorbent material in or on the web contacting layer or the fiber or yarn depends on the optical characteristics of the additive and properties of the polymer such as heat capacity and latent heat of fusion, but typically may range from about 0.05 percent to about 5 percent or from about 0.1 percent to about 5 percent by weight of the web contacting layer or fiber or yarn of the supporting layer. The yarns may be any shape, for example round, rectangular, square, multilobal, Y, star or other shapes. Other laser energy absorbent materials may also be used. A star shaped fiber is shown in FIG. 14.

In an exemplary embodiment, the percentage of the warp yarns or the weft yarns that contain laser energy absorbent material may range from about 25% to about 75%. In some embodiments, only some of the weft yarns are formed at least in part of the laser energy absorbent material or some of the warp yarns are formed at least in part of the laser energy absorbent material. In other embodiments, some of the weft yarns and some of the warp yarns are formed at least in part of the laser energy absorbent material. In an exemplary embodiment, the yarns of the supporting layer are laser energy transparent and the nonwoven web contacting layer or the interface between the web contacting layer and the supporting layer contains laser energy absorbent material. By adjusting how many of the weft and/or warp yarns that contain the laser energy absorbent material, as well as the specific weave pattern and degree of fabric sanding, more or less connection points with the web contacting layer can be designed into the fabric assembly. Further, the specific number of the warp and/or weft yarns formed at least in part of the laser energy absorbent material and weave pattern can also be used to define a number of welds between the crossing warp and weft yarns, which can be used to affect the flexibility and/or shear resistance of the fabric assembly.

In an arrangement in accordance with an exemplary embodiment, the woven supporting layer is flat woven and seamed at the warp ends in order to form a continuous belt, so that the warp yarns are MD yarns and the weft yarns are CD yarns. The supporting layer may be continuously woven, in which case, the weft yarns would extend in the MD and the warp yarns would extend in the CD. The supporting layer may also be a multiaxial fabric assembled from a strip of fabric having a narrower width that is wound around two spaced-apart rolls at an angle to the MD, with the longitudinal edges being joined together to form a wider fabric belt. The supporting layer may also be a dewatering fabric such as a press felt that contains one or several woven monofilament layers needled with fine synthetic batt. The monofilaments of the structuring layer can be made from thermoset or thermoplastic materials such as nylon, polybutylene terephthalate, polyester, polyamide, polyurethane, polypropylene, polyethylene, polyethylene terephthalate (PET), polyether ether ketone resins and combinations thereof, or any other suitable material having the desired characteristics. One particularly suitable monofilament is Monalloy® monofilament (Asten Johnson, North Charleston, South Carolina, USA), made from polyurethane and polyethylene terephthalate, as described in U.S. Pat. Nos. 5,502,120 and 5,169,711, the contents of which are incorporated herein by reference in their entirety. The monofilaments can be bicomponent with a sheath and core structure, meaning the inner core of the monofilament is made of a different material than the outer sheath material. This may be preferred as the inner core material could have higher strength and flexibility properties while the outer material has higher temperature and abrasion resistance properties. Regardless of how the supporting layer is made, the designations of warp, weft and/or MD and CD as used in the description that follows can be interchanged.

The warp yarns and the weft yarns may be formed of a thermoplastic material but alternatively can be formed of a thermoset material or combination thereof. The web contacting layer may also be formed of a thermoplastic material but alternatively can be formed of a thermoset material or combination thereof. Bicomponent (two different polymers) or multicomponent (more than two different polymers) monofilaments can be utilized. For example, a bicomponent fiber with a sheath and core structure can be utilized, with a more specific example being a star shaped monofilament having a core polymer comprised of nylon or another high temperature resistant polymer and the sheath polymer comprised of thermoplastic polyurethane or polyethylene terephthalate.

Figure 13:
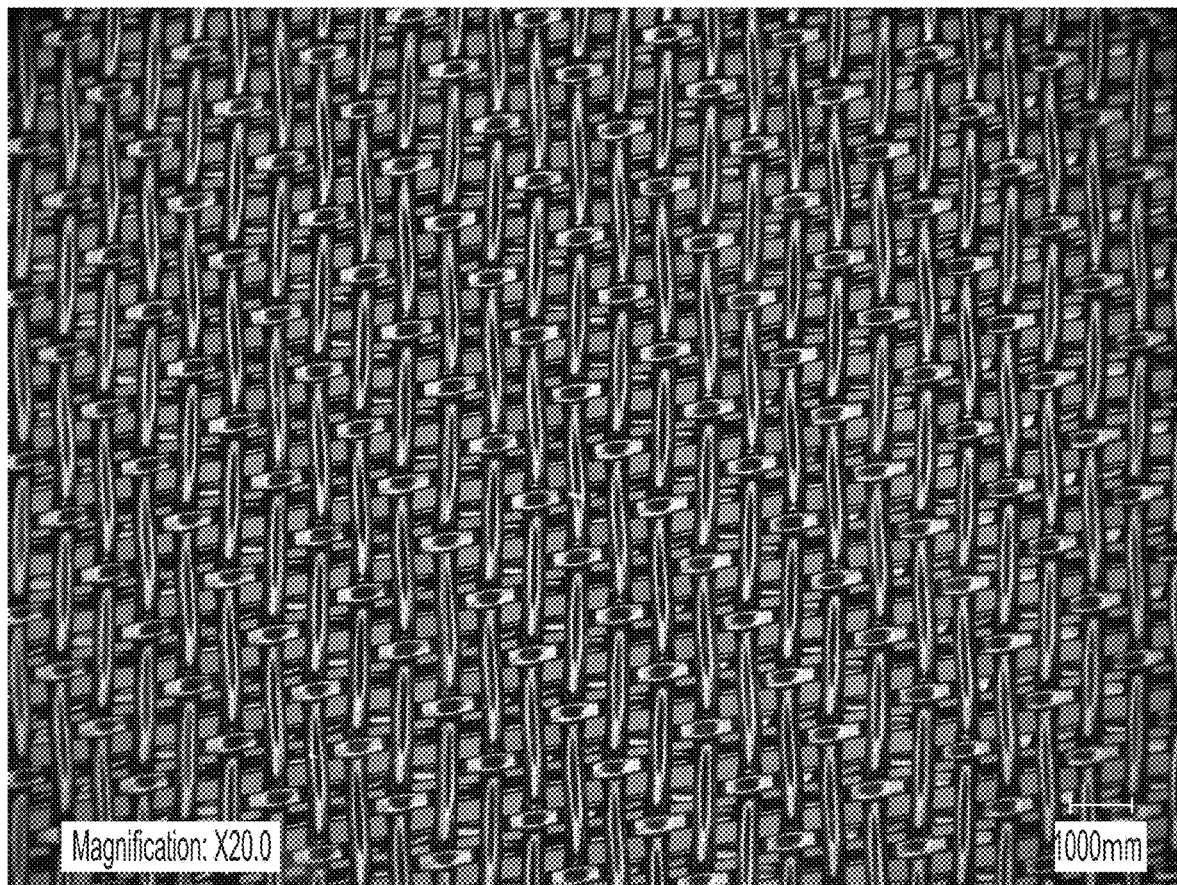
FIG. 13 is a top plan view of a woven supporting layer according to an exemplary embodiment of the present invention.

Star shaped monofilaments can be defined as polymer extruded filaments that contain ridges and valleys in the longitudinal direction of the filaments around the entire circumference of the filament. FIG. 13 shows a fabric with star shaped monofilaments. When taking a cross-section picture of the filament, the shape resembles a multi-pointed star as shown in black in FIG. 14.

Exemplary embodiments of the present invention may include incorporation of star shaped monofilaments into the woven layer or layers of a structuring fabric. The structuring belt may be one of the following: a woven fabric, a woven fabric with an overlaid polymer, a woven fabric laminated with a 3-D printed web contacting or structuring layer, a laminated structuring fabric with a web-contacting layer made from extruded polymer netting laminated to a dewatering fabric, and a fabric comprising a web-contacting layer made from extruded polymer netting or 3-D printed material laminated to a triple layer woven fabric which is then laminated to a dewatering fabric where the fine synthetic batt fibers of the dewatering fabric are needled into the dewatering fabric and through the bottom layer of the triple layer woven fabric of the web contacting layer after the web contacting layer has been laminated to the dewatering fabric. The star shaped monofilaments can comprise a portion of, or the entirety of the cross direction wefts, the machine direction warps, or both in the woven layer or layers of the structuring fabric. It should be appreciated that the various exemplary embodiments of the present invention are not limited to the use of start shaped monofilaments.

Inclusion of star shaped monofilaments in the supporting layer of structuring fabrics provides multiple advantages. One advantage is improved drying of the paper web when using hot air, as in the Through Air Drying (TAD) process. Hot air impinges upon the paper web and can travel along the channels primarily in the X-Y plane to remove additional water from the web before completely passing through the web in the Z plane and into the TAD drum or TAD hood if the air flow is in the opposite direction. An advantage of additional drying is reduced fuel consumption in the burner used in the TAD system, which in turn results in monetary savings and less burden on the environment.

Another advantage of using star shaped monofilaments is the increased surface area for laser welding and connection of the supporting layer to the web contacting layer when manufacturing a composite or laminated fabric using the attachment method in accordance with exemplary embodiments of the present invention. This method involves use of a supporting woven layer including a top surface and a bottom surface, with the supporting woven layer being formed of warp yarns interwoven with weft yarns in a repeating pattern, and at least some of the warp yarns or the weft yarns being formed at least in part of a laser energy absorbent material. A web contacting layer such as extruded polymer netting or 3-D printed material is comprised of a laser energy transparent material. The web contacting layer is attached to the top surface of the woven supporting layer via laser welds formed between a lower surface of the web contacting layer and the top surface of the woven supporting layer at points where the web contacting layer contacts the at least some of the warp yarns or the weft yarns that are formed or extruded at least in part of the laser energy absorbent material. With increased connected area between the supporting layer and web contacting layer, the connection strength between the two layers is greatly enhanced as measured by peel force strength. It is also important to recognize that in some embodiments, only the woven supporting layer yarns may contain laser energy absorbent material and thus the connection to the web contacting layer occurs as the web contacting layer is embedded into the softened polymers of the supporting layer areas that contain the laser energy absorbent material. The web contacting layer is preferably stretched and impinged into the top surface of the supporting layer, embedding into the softened material of these areas of the supporting layer. The impingement force can affect the depth of embedment of the web contacting layer into the web supporting layer, which in turn affects the peel force strength between the two layers. The amount the web contacting layer is stretched during lamination can also affect the peel force strength between the two layers as a stretched polymer diameter shrinks during stretching but attempts to enlarge to the pre-stretch diameter once the stretch force is removed. This attempt of the diameter of the web contacting layer to enlarge to the pre-stretch levels provides additional connection strength as measured by peel force strength. Without being bound by theory, it is also important to note that material differences between the web contacting layer and woven support layer may prevent actual chemical bonding between the two layers and thus the only connection forces holding the layers together could be the frictional forces between the two layers due to embedment depth and the frictional forces as the web supporting layer attempts to regain diameter after the stretching force is removed.

The layers of the fabric are laminated using the Through Transmission Laser Welding (TTLW) method where laser radiation is passed through a transmissive first polymer and into a second absorbing polymer to create a weld. The lamination of the two layers together results in embedment of the materials of one layer with the materials of the other. The term "embedment" in this context may be defined as a connection between fabric polymers resulting from one or more of the following mechanisms: frictional forces generated by protrusion of the transmissive polymer into the absorbing polymer; frictional or compressive forces generated between the absorbing polymer and the stretched transmissive polymer as the transmissive polymer is relaxed and attempts to enlarge to its original shape; chemical bonds at the interface between the absorbing and transmissive polymer; and/or polymer intermixing in the molten state at the interface and then solidifying post cooling with the potential of dissimilar polymers forming interlocking orientations.

The selection of laser source for the welding of the polymers depends primarily on the emission wavelength and available output power of the source (the necessary power depends on wavelength, beam profile and polymers to be joined), beam characteristics of the source, and optical characteristics of the polymers at the joining interface (considers reflection, transmission and absorption). The types of laser best suited for the TTLW method include but are not limited to dye lasers, metal vapor lasers, gas lasers, solid state lasers (such as Nd:YAG or fiber lasers), and semiconductor lasers (also referred to as diode lasers). Each laser type emits a particular wavelength range which can range from 100 nm up to 1 mm. With each laser one can adjust laser power level, laser beam area, laser beam spot width, laser scanning speed, weld width, weld spacing, and weld pattern. A fiber laser with a Gaussian or Top Hat beam profile is preferred with a wavelength from about 500 to about 2200 nm, more preferably from about 800 to about 2000 nm, a circular shaped beam spot width range from about 0.2 mm to about 8 mm, a laser dot area from about 0.1 to about 220 mm$^2$, a laser power range from about 10 watts to about 1200 watts, more preferably about 100 watts to about 800 watts, a roller optic speed range from about 0.1 to about 3 m/minute and a scanning speed range from about 0.1 to about 700 meters per minute. In general, the laser energy may be selected for a given spot or line beam size, welding speed, and absorption. In exemplary embodiments, a line energy may be selected, where line energy (LE)=Power/Velocity (e.g., LE=161 W/50 mm/s=3.2 J/mm=3200 J/m; LE=120 W/50 mm/s=2.4 J/mm=2400 J/m).

In an exemplary embodiment, star shaped monofilaments formed at least in part of the laser energy absorbent material are used in the woven supporting layer and the contact time of the laser to the monofilaments is controlled so that only the tops of the ridge portions of the monofilaments will plasticize and embed or connect to the web contacting layer. This leaves the air flow channels open in the X-Y plane for improved drying and flow of air when transporting a paper web through a hot air drying apparatus such as a Through Air Dryer. Not only does embedding of the web contacting layer into the woven web supporting layer hold the laminate fabric together, but an additional frictional or compressive force holds the two layers together as the stretched web contacting layer attempts to enlarge back to its original shape after the laser welding or lamination process. The embedding distance and frictional forces together provide a strong connection between the two layers between about 650 gf/inch to about 6000 gf/in or from about 650 gf/in to about 4500 gf/in of peel strength, more preferably about 2000 gf/inch to about 4000 gf/inch.

Figure 1:
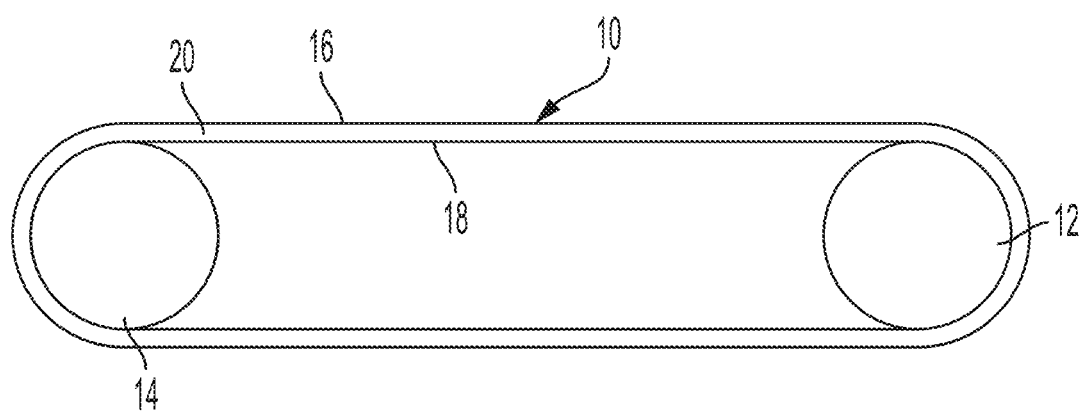
FIG. 1 shows a structured tissue belt assembly according to an exemplary embodiment of the present invention.

FIG. 1 shows a belt, generally designated by reference number 10, made up of a fabric assembly 20 according to an exemplary embodiment of the present invention. The belt 10 has a support side surface 16 and a machine side surface 18 that extends between at least two conveyor rolls 12, 14. The belt 10 may be a papermaking fabric, such as, for example, structuring fabric, forming fabric, press fabric, and dryer fabric, that are used in papermaking machines. Further applications may include filter fabrics as well as other industrial applications.

In describing different embodiments of the fabric assemblies like element numbers are used for elements having the same function, even if there are minor differences in shape, such as yarns having different cross-sections.

Figure 2A:
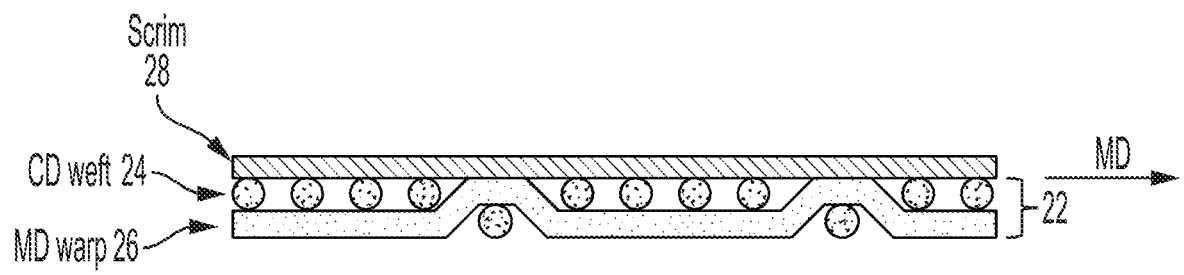
FIG. 2A-2C are cross-sectional views of a structured tissue belt assembly according to an exemplary embodiment of the present invention.

Referring to FIGS. 2A-2C and 3, an exemplary embodiment of a fabric assembly 20 according to the invention will be described in further detail. The fabric assembly 20 is formed from a supporting layer 22 having CD weft yarns 24 interwoven with MD warp yarns 26. As shown in FIG. 2A, in an initial step of a fabric manufacturing process according to an exemplary embodiment of the present invention, a web contacting layer 28 is placed on the top surface of the supporting layer 22.

The web contacting layer 28 may be a non-woven, non-fibrous web, such as an extruded netting, formed of a thermoplastic material, or 3-D printed material. The material for the web contacting layer may be, for example, polybutylene terephthalate (PBT), polyester, polyamide, polyurethane, polypropylene, polyethylene, polyethylene terephthalate (PET), polyether ether ketone resins and combinations thereof, or any other suitable material having desired characteristics. Other woven or non-woven materials may also be used. The web contacting layer may be laser energy transparent. In some embodiments, the web contacting layer is laser energy absorbing.

Figure 12:
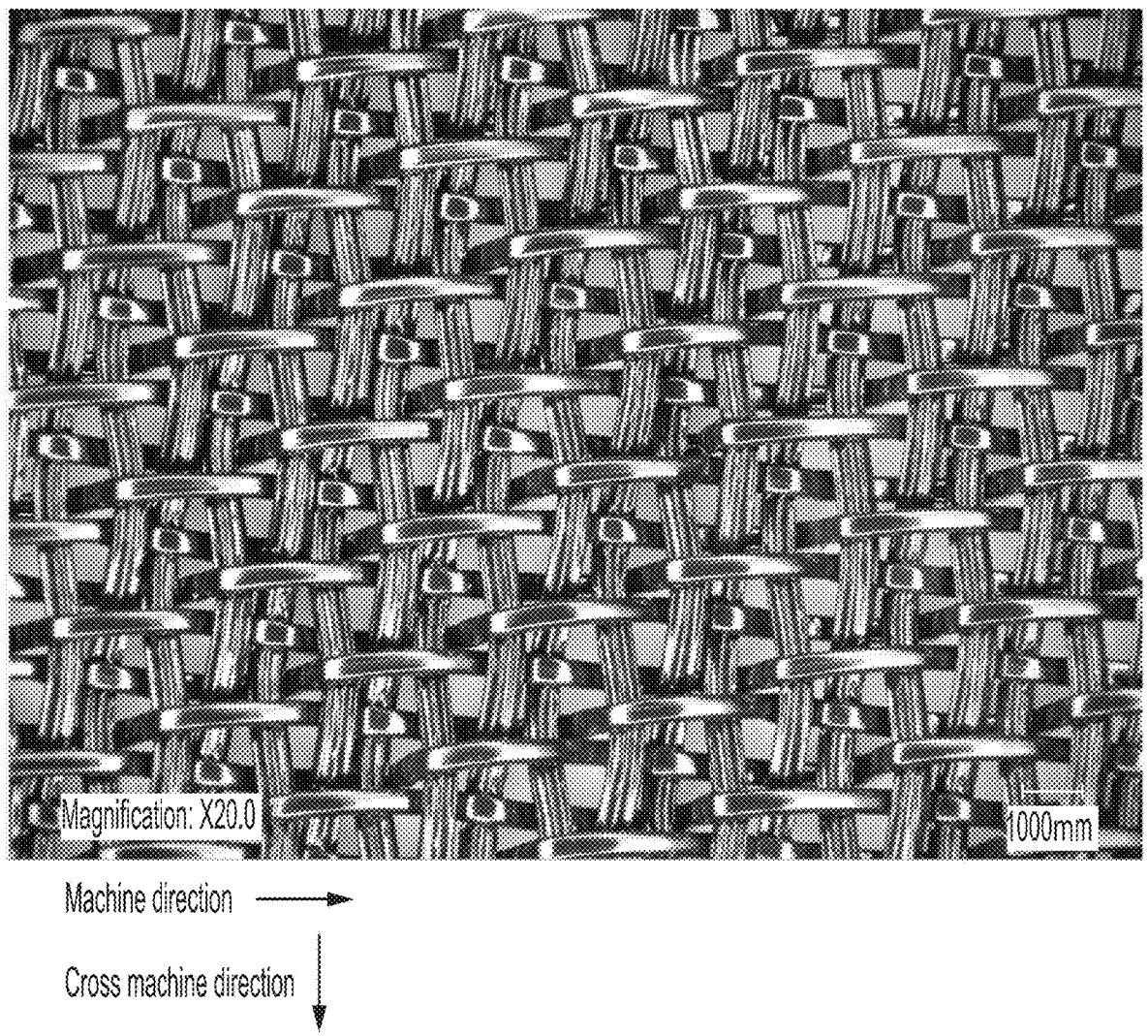
FIG. 12 is a top plan view of woven supporting layer according to an exemplary embodiment of the present invention.

The CD weft yarns 24 and the MD warp yarns 26 may be formed of a thermoplastic material, such as a polyester, and at least some of the weft yarns 24 or the warp yarns 26, and in the case of the first embodiment, only the weft yarns 24 are formed at least in part of laser energy absorbent material. In this case the laser energy absorbent material is carbon black which is mixed into the molten material used to form the weft yarns 24. However, as described in further detail below, the weft yarns 24, the warp yarns 26, some of the weft yarns and some of the warp yarns 24, 26, or all of the weft yarns 24 and all of the warp yarns 26 may be formed at least in part with the laser energy absorbent material. A 20× magnification image of a fabric according to exemplary embodiments of the present invention are shown in FIGS. 12 and 13.

In the present exemplary embodiment, the material of the web contacting layer 28, as described above, does not include any of the laser energy absorbent material and accordingly is laser energy transparent.

Figure 2B:
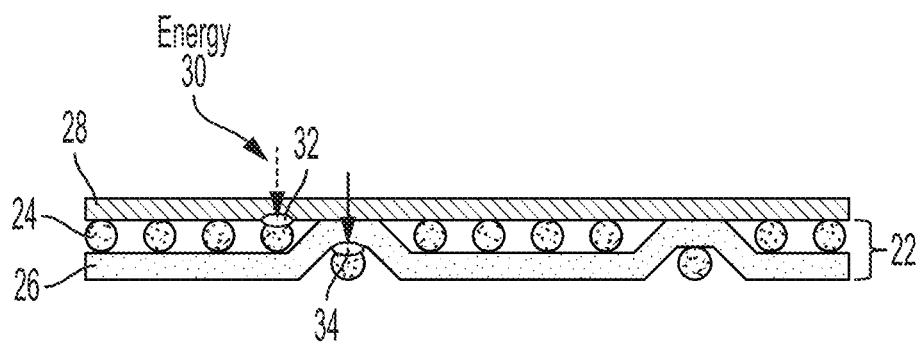
Figure 2C:
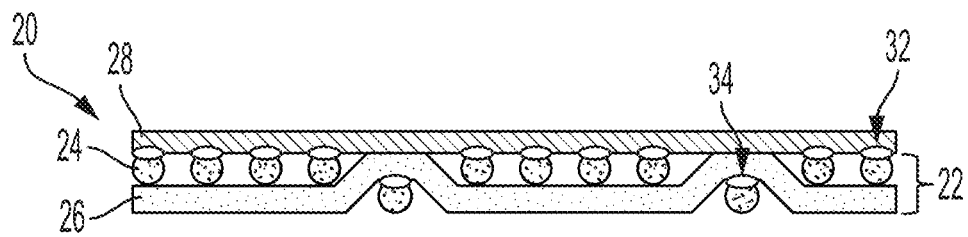

As shown in FIG. 2B, laser energy 30 is applied to the assembled components in order to form laser welds 32 between a lower surface of the web contacting layer 28 and a top surface of the supporting layer 22 at points where the web contacting layer 28 contacts the weft yarns 24 that are formed at least in part of the laser energy absorbent material. The laser welds 32 are formed between the laser energy transparent material of the web contacting layer 28 and the laser energy absorbent material in the weft yarns 24 at the points of contact, as shown in FIG. 2C. Additionally, welds 34 are formed in the supporting layer 22 at points where the warp yarns 26 which in this embodiment are formed of a laser energy transparent material and do not include any of the laser energy absorbent material, cross over the weft yarns 24 which are formed at least in part of the laser energy absorbent material.

Figure 3:
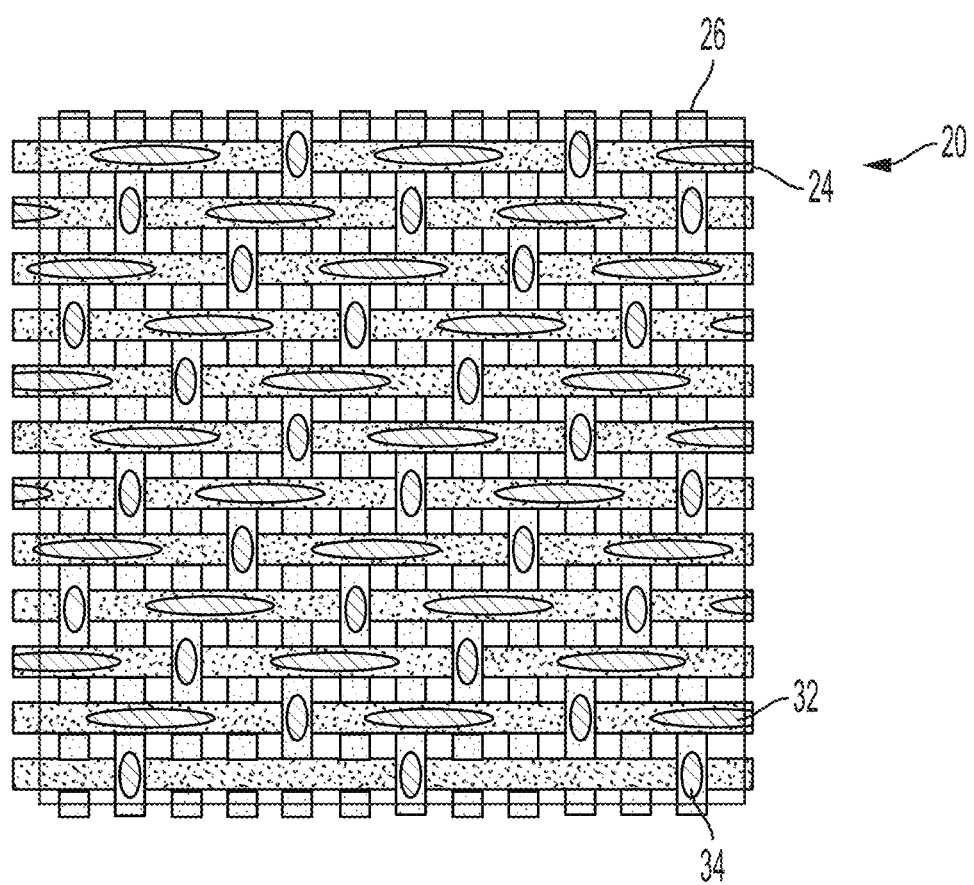
FIG. 3 is a top plan view of a woven supporting layer used in the structured tissue belt assembly of FIGS. 2A-2C.

FIG. 3 shows a plan view of the top surface of the fabric of FIGS. 2A-2C where the horizontal ovals (in FIG. 3) indicate the welds 32 between the weft yarns 24 that form the surface of the supporting layer 22 and the web contacting layer 28, and the smaller vertical ovals indicate the welds formed between various ones of the warp yarns 26 in the supporting layer 22 and the weft yarns 24 which are formed at least in part of the laser energy absorbent material.

This arrangement provides for a controlled increase in the rigidity of the base fabric through the laser welding welds 34 formed between some of the warp yarns 26 and some of the weft yarns 24, which is a function of the weave pattern and the number of points where the laser energy transparent warp yarns 26 pass over the weft yarns 24 which are formed at least in part of the laser energy absorbent material, and also provides for firm attachment of the web contacting layer 28 to the supporting layer 22.

Figure 4A:
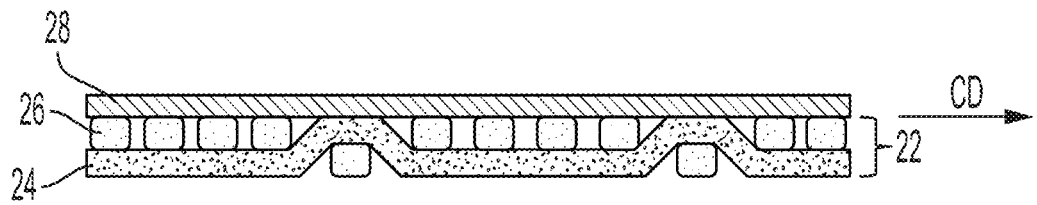
FIGS. 4A-4C are cross-sectional views of a structured tissue belt assembly according to an exemplary embodiment of the present invention.
Figure 4B:
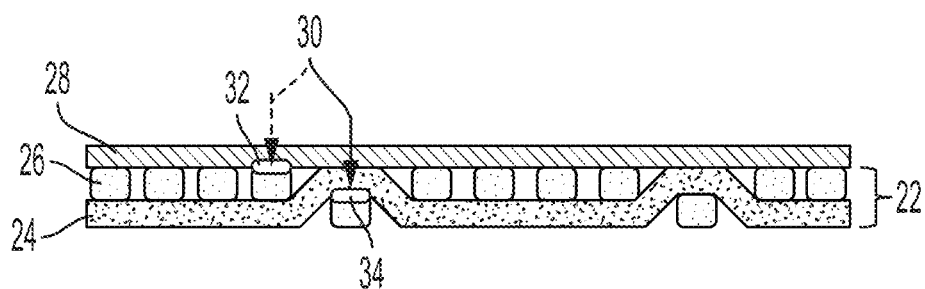

Referring to FIGS. 4A-4C and 5, another exemplary embodiment of a fabric assembly 20' according to the invention is shown. The fabric may be long warp up as is shown in the Figures, but may also be long weft up. The fabric assembly 20' is formed in the same manner as the fabric 20 with the difference being that in this case the MD warp yarns 26 have a rectangular cross section and are formed at least in part of the laser energy absorbent material, whereas the weft yarns 24 in the previous embodiment of the fabric assembly 20 had a circular cross-section and were formed at least in part of the laser energy transparent material. In a similar manner to the previous embodiment of the fabric assembly 20, FIG. 4A shows the supporting layer 22 with the web contacting layer 28 placed on the top surface of the supporting layer 22. FIG. 4B shows the application of laser energy 30 in order to form the welds 32 between the web contacting layer 28 and the warp yarns 26 which are formed at least in part of the laser energy absorbent material. Welds 34 are also formed between some of the laser energy transparent weft yarns 24 where they cross over the warp yarns 26 that are formed at least in part of the laser energy absorbed material, with the laser welds 34 imparting some additional strength to the supporting layer 22.

Figure 4C:
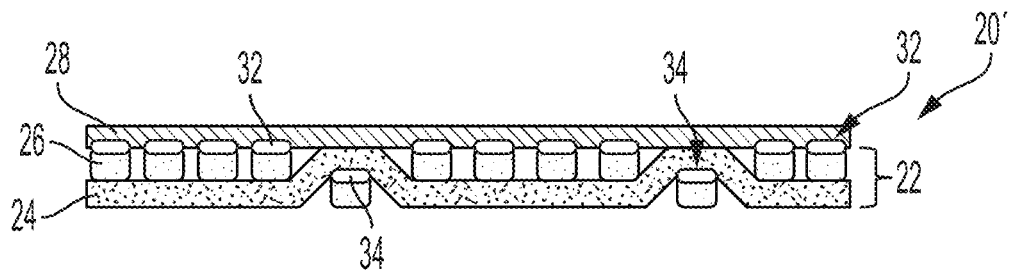
Figure 5:
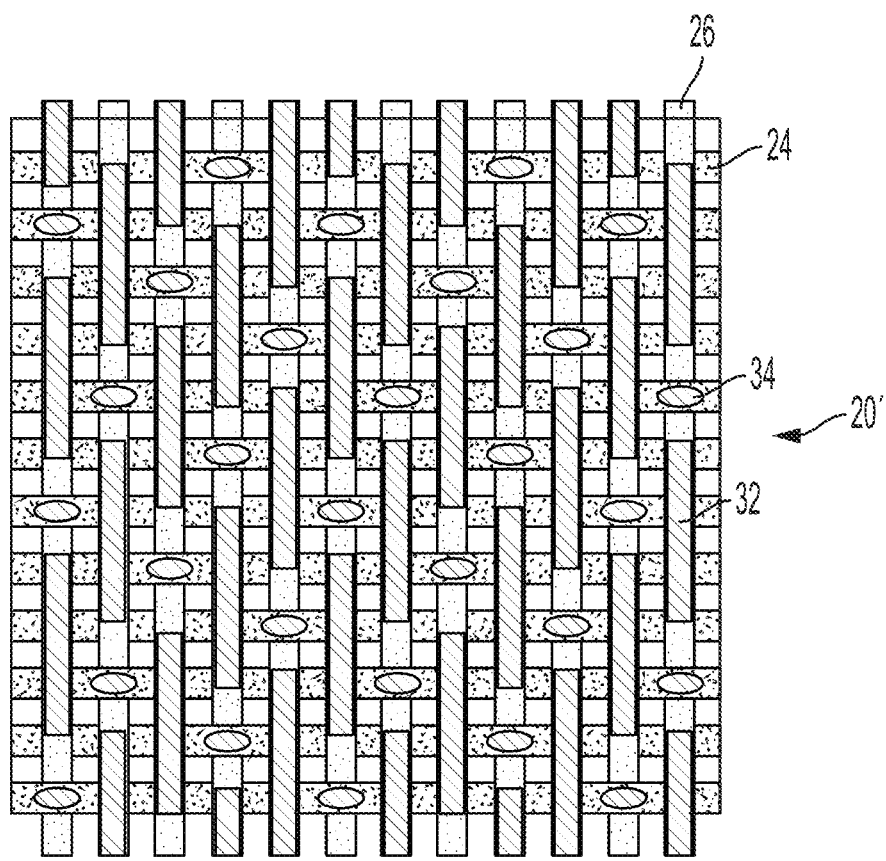
FIG. 5 is a top plan view of a woven supporting layer used in the structured tissue belt assembly of FIGS. 4A-4C.
Figure 6A:
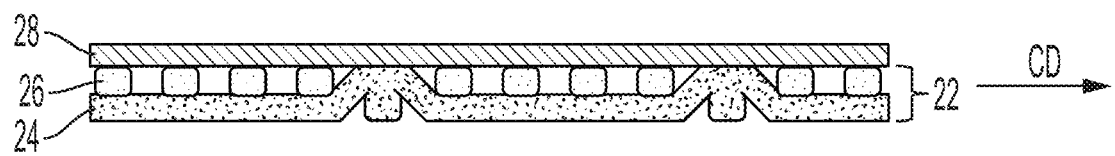
FIGS. 6A-6C are cross-sectional views of a structured tissue belt assembly according to an exemplary embodiment of the present invention.
Figure 6B:
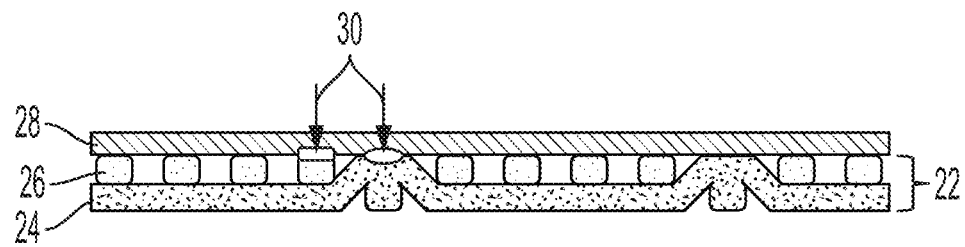
Figure 6C:
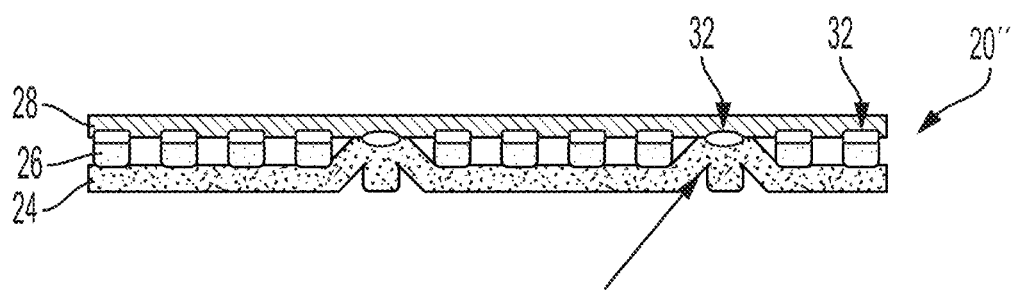

FIG. 4C shows the finished fabric assembly 20' with the laser welds 32 between the web contacting layer 28 and the supporting layer 22 as well as the laser welds 34 between certain weft yarns 24 where they cross over warp yarns 26 that are formed at least in part of the laser energy absorbent material. FIG. 5 shows a plan view of the top surface of the fabric 20' with the welds 32 between the web contacting layer and the warp yarns 26 that are formed at least in part of the laser energy absorbent material being indicated, and the welds 34 between the weft yarns 24 and the warp yarns 26 also being indicated. FIGS. 6A-6C and 7 show another exemplary embodiment of a fabric assembly 20" formed of a supporting layer 22 with a web contacting layer 28 located thereon. The fabric may be long warp up as is shown in the Figures, but may also be long weft up. In this embodiment, the supporting layer 22 is formed by warp yarns 26 and weft yarns 24 that are all formed at least in part of a laser energy absorbent material. The web contacting layer 28 is formed of a laser energy transparent material and, as shown in FIG. 6B, when the laser energy 30 is applied, laser welds 32 are formed between the web contacting layer 28 and the top surface of the supporting layer 22 at points where the web contacting layer 28 contacts the floats of the warp yarns 26 and knuckles of the weft yarns 24. The completed fabric assembly 20" is shown in FIG. 6C with the laser welds 32 indicated. In this case, the web contacting layer 28" is welded to both the warp yarns 26" and the weft yarns 24. However, since the laser energy does not pass through the warp yarns or the weft yarns of the supporting layer 22 since they are formed at least in part of a laser energy absorbent material and absorb the laser energy, no welds take place between the warp yarns and weft yarns of the base fabric 22.

Figure 7:
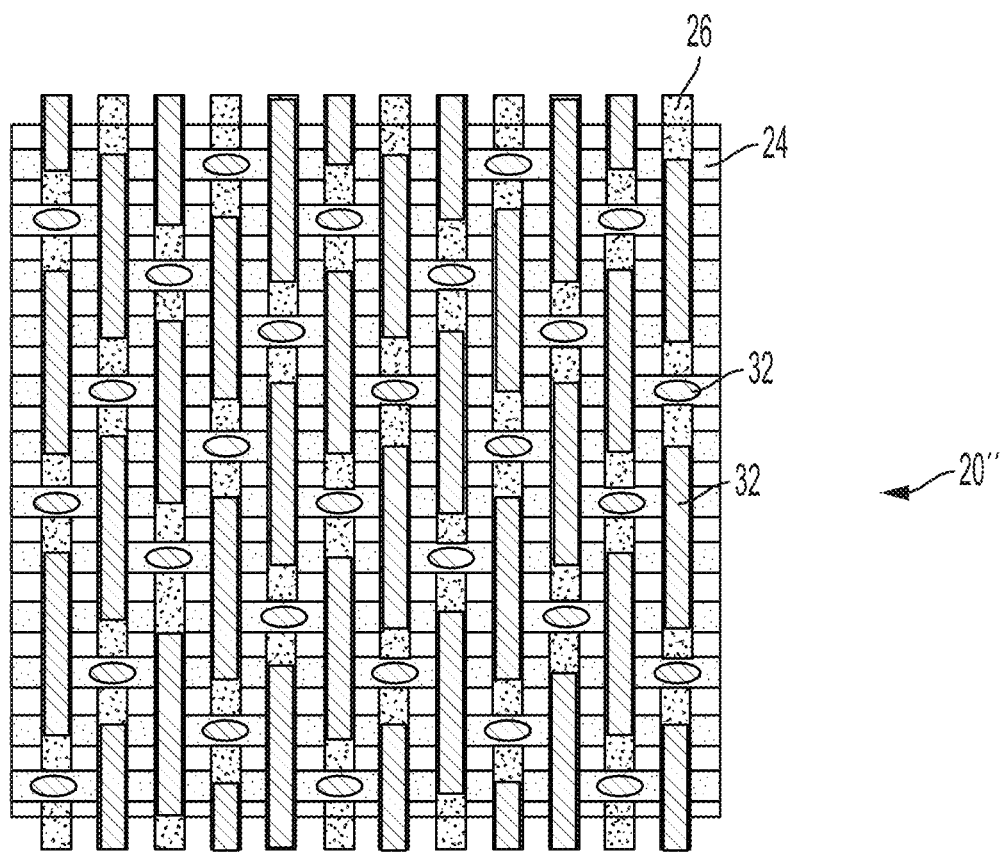
FIG. 7 is a top plan view of a woven supporting layer used in the structured tissue belt assembly of FIGS. 6A-6C.

FIG. 7 shows a plan view of the top surface of the fabric assembly 20" with the welds 32 being indicated between the supporting layer 22 and the web contacting layer 28. This provides for maximum welding between the web contacting layer 28 and the supporting layer 22, while maintaining the flexibility and/or shear resistance of the supporting layer 22 so that wrinkling of the fabric assembly 20" when it is installed on a machine is prevented.

Figure 8A:
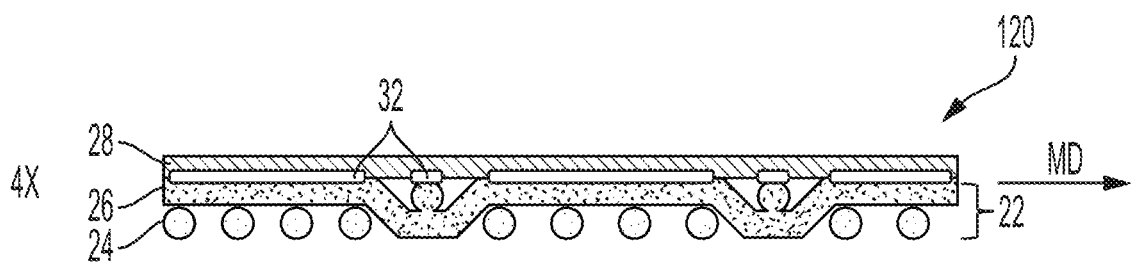
FIGS. 8A-8C are cross-sectional views of a structured tissue belt assembly according to an exemplary embodiment of the present invention.
Figure 8B:
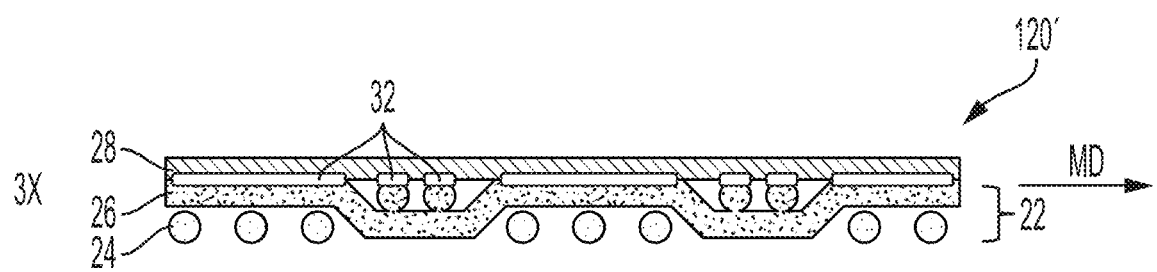
Figure 8C:
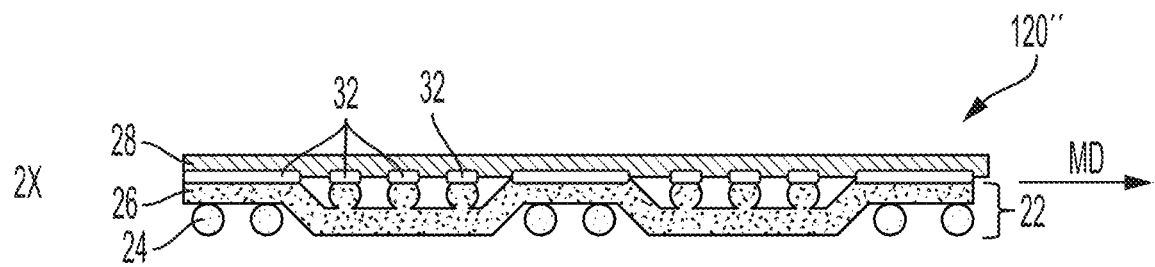

FIGS. 8A-8C show further exemplary embodiments of the fabric assembly 120, 120', 120" according to the invention. These exemplary embodiments are similar to the exemplary embodiment shown in FIGS. 6A-6C and 7 in that both the warp yarns 26 and the weft yarns 24 are formed at least in part of the laser energy absorbent material such that the web contacting layer 28 only welds with the warp floats and weft knuckles/floats located on the top surface of the supporting layer 22. In this case, the supporting layers 22 are formed with different float lengths for the warp yarns 26 which extend in the MD. The exemplary embodiment of the fabric assembly 120 shown in FIG. 8A includes a supporting layer 22 in which the warp yarns 26 float over four of the weft yarns 24. The exemplary embodiment of the fabric assembly 120' shown in FIG. 8B is formed with a supporting layer 22 in which the warp yarns 26 float over three of the weft yarns 24. Finally, the exemplary embodiment of the fabric assembly 120" shown in FIG. 8C includes a supporting layer 22 in which the warp yarns 26 form floats over two of the weft yarns 24. Various other weave patterns could also be used. Here, the orientation and length of the floats can be selected to achieve a desired welded area as well as certain directional stiffness in the fabric assemblies 120, 120', 120".

Figure 9:
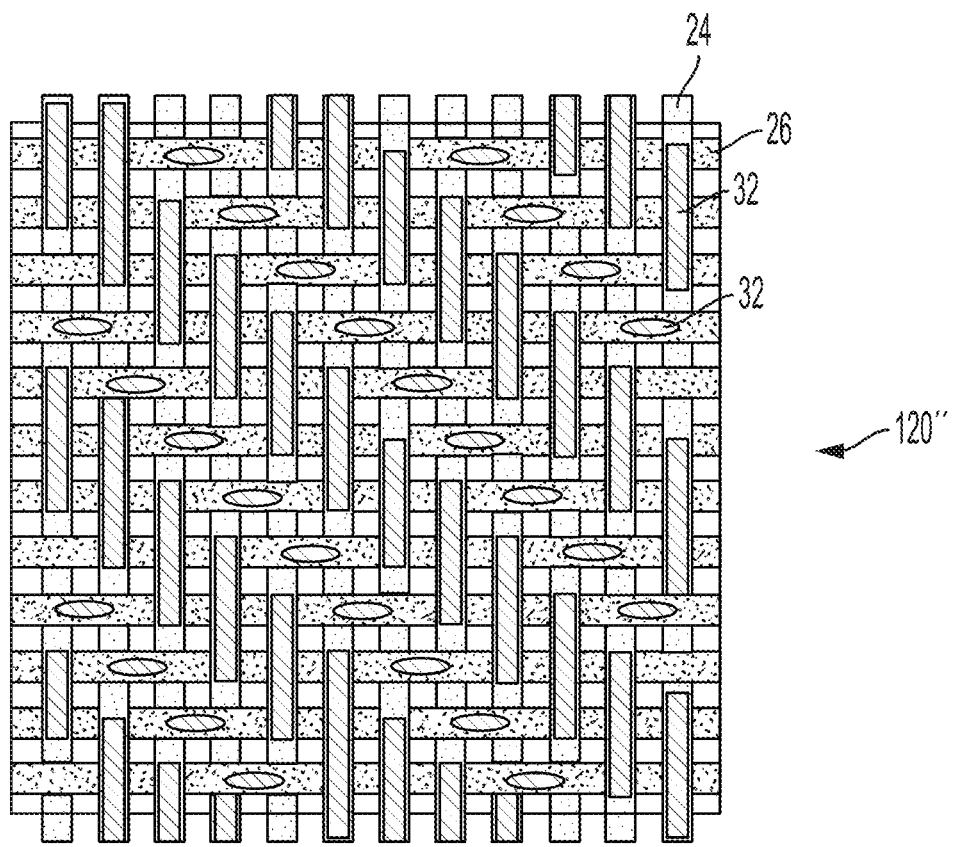
FIG. 9 is a top plan view of a woven support layer used in the structured tissue belt assembly of FIGS. 8A-8C.

FIG. 9 shows the arrangement of the laser welds 32 corresponding to the arrangement of FIG. 8C between the web contacting layer 28 and the supporting layer 22. In each of the exemplary embodiments 120, 120', 120", since the warp yarns 26 and the weft yarns 24 are formed at least in part of the laser energy absorbent material, no welds are formed between the warp yarns 26 and the weft yarns 24 in the supporting layer 22.

Figure 10A:
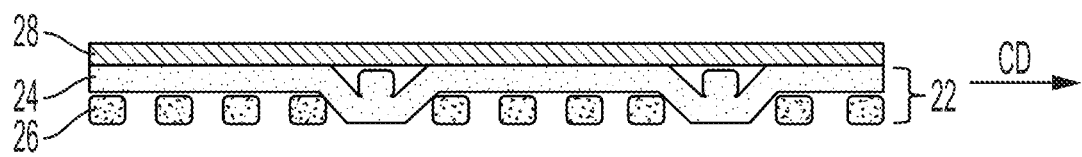
FIGS. 10A-10C are cross-sectional views of a structured tissue belt assembly according to an exemplary embodiment of the present invention.
Figure 10B:
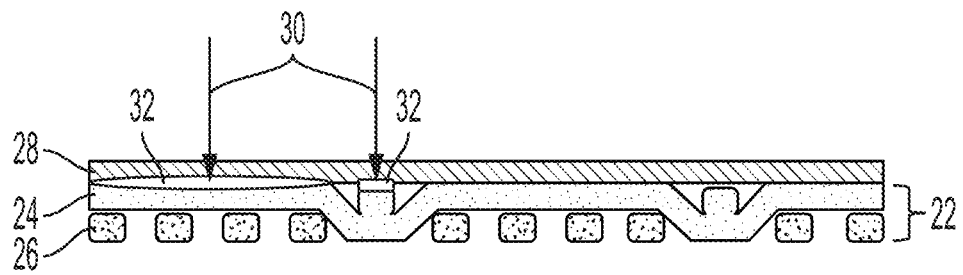
Figure 10C:
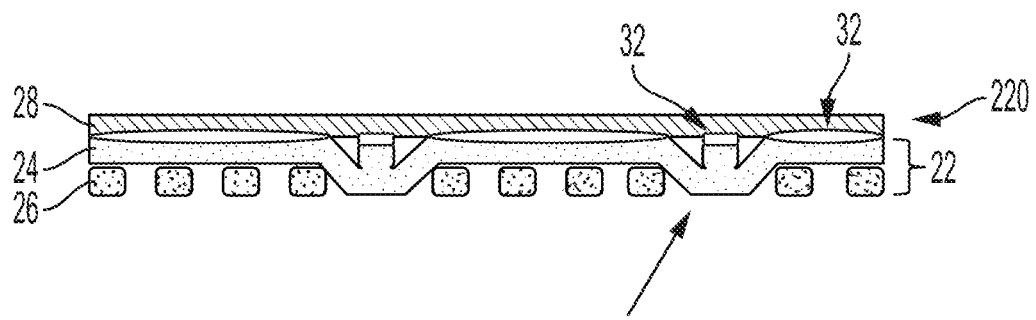

Referring to FIGS. 10A-10C, the construction of another exemplary embodiment of a fabric assembly is shown, generally designated by reference number 220. FIG. 10A shows the web contacting layer 28 located on top of the supporting layer 22 which in this case is formed from weft yarns 24 which have a rectangular cross-section as well as warp yarns 26 which have a rectangular cross-section, all of which are formed at least in part of a laser energy absorbent material. The web contacting layer 28 is located on the supporting layer 22. Laser energy 30 is applied as shown in FIG. 10B and in this case forms laser welds 32 to weld the web contacting layer 28 to the upper surface of the supporting layer 22. Welding takes place where there is contact between the web contacting layer which is formed of the laser energy transparent material and the warp yarns 26 and weft yarns 24 at the upper surface of the supporting layer 22 which are formed of the laser energy absorbent material. Since the laser energy does not pass through the weft yarns 24 or the warp yarns 26 as they are formed at least in part of the laser energy absorbent material, no welds are formed in the base cloth in order to maintain the flexibility and/or shear resistance of the supporting layer 22. This arrangement also maximizes welding between the web contacting layer 28 and the supporting layer 22 while maintaining the flexibility of the supporting layer 22.

Figure 11A:
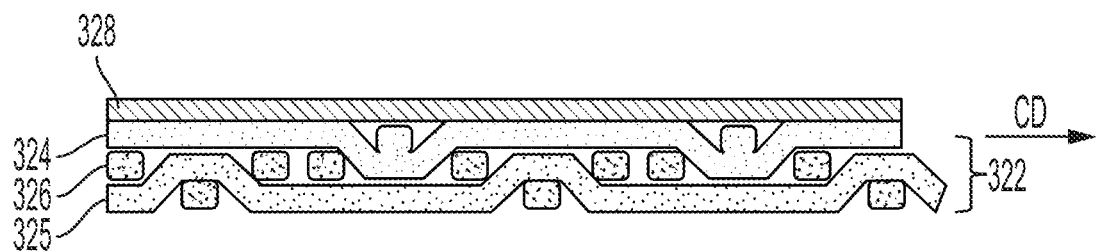
FIGS. 11A-11C are cross-sectional views of a structured tissue belt assembly according to an exemplary embodiment of the present invention.
Figure 11B:
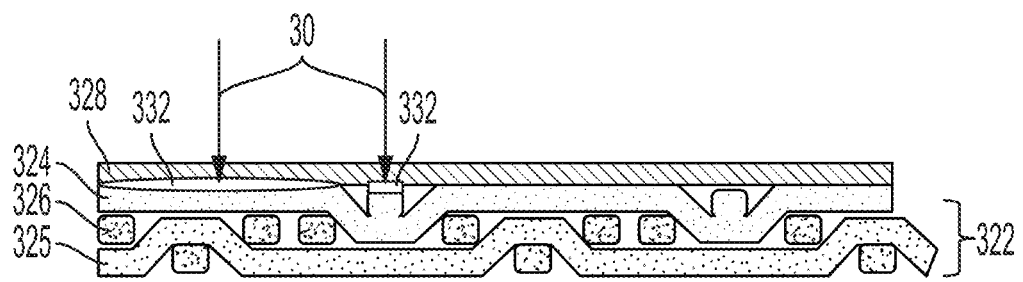
Figure 11C:
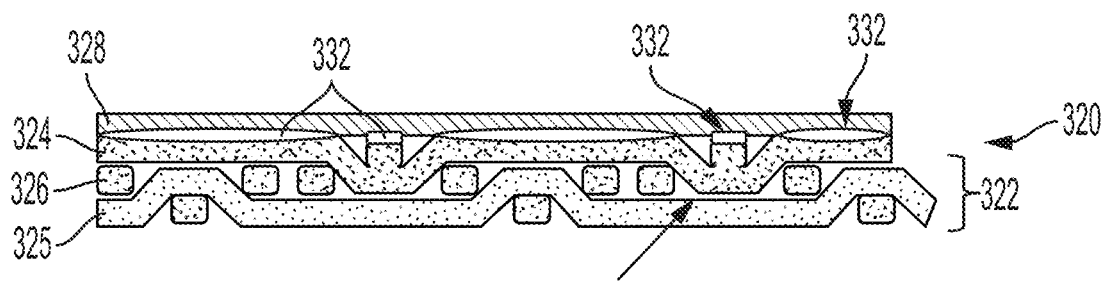

Referring to FIGS. 11A-11C, the construction of another exemplary embodiment of the fabric assembly is shown, generally designated by reference number 320. In this case, the supporting layer 322 is formed with a top layer of weft yarns 324, a bottom layer of weft yarns 325 as well as a single layer of warp yarns 326 that interweaves with the two layers of weft yarns 324, 325. In this case, the top layer of weft yarns 324 is formed at least in part of the laser energy absorbent material and the warp yarns 326 are also formed at least in part of the laser energy absorbent material. The lower layer of weft yarns 325 which are stacked under the upper layer of weft yarns 324 are not formed of laser energy absorbent material. As discussed above, the web contacting layer 328 is formed of a laser energy transparent material. Laser energy is applied as shown in FIG. 11B in order to form laser welds between the web contacting layer and the upper surface of the supporting layer 322. The laser welds 332 are formed where the web contacting layer 328 contacts the weft yarns 324 as well as the warp yarns 326 that are formed at least in part of the laser energy absorbent material. No welds are formed between the upper layer of weft yarns 324 and the warp yarns 326 since both are formed at least in part of the laser energy absorbent material and accordingly, laser energy is not transmitted through the weft yarns 324 at positions where they overlap the warp yarns 326. Further, since the energy does not pass through the weft yarns 324 or the warp yarns 326, no welds are formed in the supporting layer 322 to the lower system of weft yarns 325 as no laser energy would pass through the stacked arrangement of the upper weft yarns 324 and the lower weft yarns 325 in order to allow any welding to occur. This arrangement also provides for maximum welding between the web contacting layer 328 and the supporting layer 322 without any welding in the supporting layer 322 itself in order to maintain the flexibility and/or shear resistance of the fabric assembly 320.

The above embodiments of the fabric assembly are considered to be exemplary and both the weave patterns of the supporting layers as well as the number of warp and/or weft yarns which are formed at least in part of the laser energy absorbent material can be varied in order to achieve a desired flexibility and/or shear resistance of the fabric assembly without compromising the welding of the web contacting layer 28 to the fabric assembly. This prevents the fabric assembly from becoming too rigid due to unwanted welding of the warp yarns and weft yarns in the supporting layer.

A method of making a fabric assembly 20, 20', 20", 120, 120', 120", 220, 320 according to an exemplary embodiment of the present invention includes the steps of: weaving or providing a supporting layer 22, 322 from warp yarns 26, 326 and weft yarns 24, 324 interwoven in a repeating pattern, at least some of the warp yarns 26, 326 and/or the weft yarns 24, 324 being formed at least in part of a laser energy absorbent material, the supporting layer 22, 322 having a top surface; stretching a web contacting layer 28, 328 formed of a laser energy transparent material onto the top surface; impinging the web contacting layer 28, 328 into the top surface of the supporting layer and radiating the web contacting layer 28, 328 with energy, preferably laser radiation 30, to weld the web contacting layer 28, 328 to the top surface by laser welding a lower surface of the web contacting layer 28, 328 and the top surface of the supporting layer 22, 322 at points where the web contacting layer 28, 328 contacts the at least some of the warp yarns 26, 326 or the weft yarns 24, 324 formed at least in part of the laser energy absorbent material.

The method can further include the steps of: during the weaving of the supporting layer 22, 322, providing at least some of the warp yarns 26, 326 and/or the weft yarns 24, 324 formed of a laser energy transparent material; and connecting the at least some of the warp yarns 26, 326 and/or the weft yarns 24, 324 formed of the laser energy transparent material to the at least some of the warp yarns 26, 326 or the weft yarns 24, 324 formed at least in part of the laser energy absorbent material at points where the warp yarns 26, 326 or the weft yarns 24, 324 formed of the laser energy transparent material pass over the warp yarns 26, 326 or the weft yarns 24, 324 formed at least in part of the laser energy absorbent material.

While the embodiments are described in terms of laser welding and laser energy being applied, those skilled in the art will recognize that the weld can be formed using other types of energy applied to the components in order to attach the web contacting layer to the supporting layer using these principles, where at least the web contacting layer is formed of an energy transparent material and the supporting layer is formed at least in part of warp and/or weft yarns that are formed at least in part of an energy absorbent material such that welding takes place when energy is applied where there is energy transparent material between the point of application of the energy and the portion of the supporting layer that includes the energy absorbent material. Conversely, the web contacting layer may be formed at least in part of laser energy absorbing material and the supporting layer may be formed at least in part of laser energy transparent material and the welding takes place where energy is applied where there is energy absorbing material in the web contacting layer and the portion of the supporting layer that excludes energy absorbing material.

Figure 27:
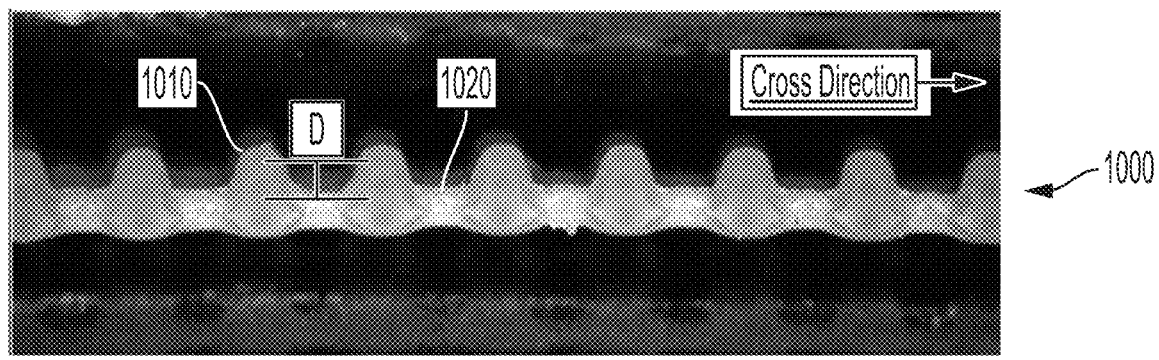
FIG. 27 is a micrograph showing a cross section of a web contacting layer used in a structured tissue belt assembly according to an exemplary embodiment of the present invention.

FIG. 27 is a micrograph showing a cross-section of a web contacting layer, generally designated by reference number 1000, according to an exemplary embodiment of the present invention. The web contacting layer 1000 is preferably made of an extruded polymer netting having first elements 1010 extending in the machine direction and second elements 1020 extending the cross direction so as to form openings within the web contacting layer 1000. As shown in FIG. 25, the first elements 1010 extend above the second elements 1020 so as to form ridges extending in the machine direction. The second elements 1020 extending in the cross direction may be referred to herein as "mid-rib" elements.

In exemplary embodiments, the distance (D) between the top plane of the ridges of the first elements 1010 and the top plane of the second elements 1020 is greater than 200 microns. During the papermaking process, the paper web being conveyed on the composite structuring fabric is transferred to the Yankee dryer at a nip formed between the Yankee dryer and a pressure roll. During this transfer (referred to herein as "soft nip transfer"), the extruded polymer netting of the composite structuring fabric is compressed in the nip between the pressure roll and Yankee dryer such that the top plane of the first element 1010 is in the same plane as the top plane of the second element 1020. A composite or laminated structuring fabric according to an exemplary embodiment of the present invention includes a web contacting layer with a top plane that has a contact area with the Yankee dryer between 15% to 45% in the uncompressed state but increases to 30 to 60% contact area in the compressed state when under 200 to 300 PLI load, which is the typical load range that exists in the nip between the pressure roll and Yankee dryer. The contact area increases as the first elements 1010 are compressed into the same plane as the second elements 1020.

Test Methods

Softness Testing

Softness of a 2-ply tissue web was determined using a Tissue Softness Analyzer (TSA), available from EMTEC Electronic GmbH of Leipzig, Germany. The TSA comprises a rotor with vertical blades which rotate on the test piece applying a defined contact pressure. Contact between the vertical blades and the test piece creates vibrations which are sensed by a vibration sensor. The sensor then transmits a signal to a PC for processing and display. The frequency analysis in the range of approximately 200 to 1000 Hz represents the surface smoothness or texture of the test piece and is referred to as the TS750 value. A further peak in the frequency range between 6 and 7 kHz represents the bulk softness of the test piece and is referred to as the TS7 value. Both TS7 and TS750 values are expressed as dB $V^2$ rms. The stiffness of the sample is also calculated as the device measures deformation of the sample under a defined load. The stiffness value (D) is expressed as mm/N. The device also calculates a Hand Feel (HF) number with the higher the number corresponding to a higher softness as perceived when someone touches a tissue sample by hand. The HF number is a combination of the TS750, TS7, and stiffness of the sample measured by the TSA and calculated using an algorithm which also requires the caliper and basis weight of the sample. Different algorithms can be selected for different facial, toilet, and towel paper products. Before testing, a calibration check should be performed using "TSA Leaflet Collection No. 9" available from EMTECH dated 2016 May 10. If the calibration check demonstrates a calibration is necessary, follow "TSA Leaflet Collection No. 10" for the calibration procedure available from EMTECH dated 2015 Sep. 9.

A punch was used to cut out five 100 $cm^2$ round samples from the web. One of the samples was loaded into the TSA, clamped into place (outward facing or embossed ply facing upward), and the TPII algorithm was selected from the list of available softness testing algorithms displayed by the TSA. After inputting parameters for the sample (including caliper and basis weight), the TSA measurement program was run. The test process was repeated for the remaining samples and the results for all the samples were averaged and the average HF number recorded.

Stretch & MD, CD, and Wet CD Tensile Strength Testing

An Instron 3343 tensile tester, manufactured by Instron of Norwood, MA, with a 100N load cell and 25.4 mm rubber coated jaw faces, was used for tensile strength measurement. Prior to measurement, the Instron 3343 tensile tester was calibrated using Operator's Guide M10-16279-EM Revision D. After calibration, 8 strips of 2-ply product, each 2.54 cm by 10.16 cm (one inch by four inches), were provided as samples for each test. When testing MD (Material Direction) tensile strength, the strips were cut in the MD direction. When testing CD (Cross Direction) tensile strength, the strips were cut in the CD direction. One of the sample strips was placed in between the upper jaw faces and clamp, and then between the lower jaw faces and clamped with a gap of 5.08 cm (2 inches) between the clamps. A test was run on the sample strip to obtain tensile strength and stretch. The test procedure was repeated until all the samples were tested. The values obtained for the eight sample strips were averaged to determine the tensile strength of the tissue. When testing CD wet tensile, the strips were placed in an oven at 105 degrees Celsius for 5 minutes and saturated with 75 microliters of deionized water at the center of the strip across the entire cross direction immediately prior to pulling the sample.

Basis Weight

Using a dye and press, six 76.2 mm by 76.2 mm square samples were cut from a 2-ply product being careful to avoid any web perforations. The samples were placed in an oven at 105 deg C. for 5 minutes before being weighed on an analytical balance to the fourth decimal point. The weight of the sample in grams was divided by $(0.0762 \text{ m})^2$ to determine the basis weight in grams/m$^2$.

Caliper Testing

A Thwing-AlbertProGage 100 Thickness Tester, manufactured by Thwing Albert of West Berlin, N.J., with a 2" diameter pressure foot with a preset loading of 93.0 grams/square inch, was used for the caliper test. Eight 100 mm×100 mm square samples were cut from a 2-ply product. The samples were then tested individually and the results were averaged to obtain a caliper result for the base sheet.

Lint Testing

The amount of lint generated from a tissue product was determined with a Sutherland Rub Tester. This tester uses a motor to rub a weighted felt 5 times over the stationary tissue. The Hunter Color L value is measured before and after the rub test. The difference between these two Hunter Color L values is calculated as lint.

Lint Testing—Sample Preparation:

Prior to the lint rub testing, the paper samples to be tested should be conditioned according to Tappi Method #T402OM-88. Here, samples are preconditioned for 24 hours at a relative humidity level of 10 to 35% and within a temperature range of 22° to 40° C. After this preconditioning step, samples should be conditioned for 24 hours at a relative humidity of 48 to 52% and within a temperature range of 22° to 24° C. This rub testing should also take place within the confines of the constant temperature and humidity room.

The Sutherland Rub Tester may be obtained from Testing Machines, Inc. (Amityville, N.Y. 11701). The tissue is first prepared by removing and discarding any product which might have been abraded in handling, e.g. on the outside of the roll. For multi-ply finished product, three sections with each containing two sheets of multi-ply product are removed and set on the bench-top. For single-ply product, six sections with each containing two sheets of single-ply product are removed and set on the bench-top. Each sample is then folded in half such that the crease is running along the cross direction (CD) of the tissue sample. For the multi-ply product, make sure one of the sides facing out is the same side facing out after the sample is folded. In other words, do not tear the plies apart from one another and rub test the sides facing one another on the inside of the product. For the single-ply product, make up 3 samples with the off-Yankee side out and 3 with the Yankee side out. Keep track of which samples are Yankee side out and which are off-Yankee side out.

Obtain a 30"×40" piece of Crescent #300 cardboard from Cordage Inc. (800 E. Ross Road, Cincinnati, Ohio, 45217). Using a paper cutter, cut out six pieces of cardboard of dimensions of 2.5"×6". Puncture two holes into each of the six cards by forcing the cardboard onto the hold down pins of the Sutherland Rub tester.

If working with single-ply finished product, center and carefully place each of the 2.5"×6" cardboard pieces on top of the six previously folded samples. Make sure the 6" dimension of the cardboard is running parallel to the machine direction (MD) of each of the tissue samples. If working with multi-ply finished product, only three pieces of the 2.5"×6" cardboard will be required. Center and carefully place each of the cardboard pieces on top of the three previously folded samples. Once again, make sure the 6" dimension of the cardboard is running parallel to the machine direction (MD) of each of the tissue samples.

Fold one edge of the exposed portion of tissue sample onto the back of the cardboard. Secure this edge to the cardboard with adhesive tape obtained from 3M Inc. (¾" wide Scotch Brand, St. Paul, Minn.). Carefully grasp the other over-hanging tissue edge and snugly fold it over onto the back of the cardboard. While maintaining a snug fit of the paper onto the board, tape this second edge to the back of the cardboard. Repeat this procedure for each sample.

Turn over each sample and tape the cross direction edge of the tissue paper to the cardboard. One half of the adhesive tape should contact the tissue paper while the other half is adhering to the cardboard. Repeat this procedure for each of the samples. If the tissue sample breaks, tears, or becomes frayed at any time during the course of this sample preparation procedure, discard and make up a new sample with a new tissue sample strip.

If working with multi-ply converted product, there will now be 3 samples on the cardboard. For single-ply finished product, there will now be 3 off-Yankee side out samples on cardboard and 3 Yankee side out samples on cardboard.

Lint Testing—Felt Preparation

Obtain a 30"×40" piece of Crescent #300 cardboard from Cordage Inc. (800 E. Ross Road, Cincinnati, Ohio, 45217). Using a paper cutter, cut out six pieces of cardboard of dimensions of 2.25"×7.25". Draw two lines parallel to the short dimension and down 1.125" from the top and bottom most edges on the white side of the cardboard. Carefully score the length of the line with a razor blade using a straight edge as a guide. Score it to a depth about half way through the thickness of the sheet. This scoring allows the cardboard/felt combination to fit tightly around the weight of the Sutherland Rub tester. Draw an arrow running parallel to the long dimension of the cardboard on this scored side of the cardboard.

Cut the six pieces of black felt (F-55 or equivalent from New England Gasket, 550 Broad Street, Bristol, Conn. 06010) to the dimensions of 2.25"×8.5"×0.0625. Place the felt on top of the unscored, green side of the cardboard such that the long edges of both the felt and cardboard are parallel and in alignment. Make sure the fluffy side of the felt is facing up. Also allow about 0.5" to overhang the top and bottom most edges of the cardboard. Snuggly fold over both overhanging felt edges onto the backside of the cardboard with Scotch brand tape. Prepare a total of six of these felt/cardboard combinations.

For best reproducibility, all samples should be run with the same lot of felt. Obviously, there are occasions where a single lot of felt becomes completely depleted. In those cases where a new lot of felt must be obtained, a correction factor should be determined for the new lot of felt. To determine the correction factor, obtain a representative single tissue sample of interest, and enough felt to make up 24 cardboard/felt samples for the new and old lots.

As described below and before any rubbing has taken place, obtain Hunter L readings for each of the 24 cardboard/felt samples of the new and old lots of felt. Calculate the averages for both the 24 cardboard/felt samples of the old lot and the 24 cardboard/felt samples of the new lot.

Next, rub test the 24 cardboard/felt boards of the new lot and the 24 cardboard/felt boards of the old lot as described below. Make sure the same tissue lot number is used for each of the 24 samples for the old and new lots. In addition, sampling of the paper in the preparation of the cardboard/tissue samples must be done so the new lot of felt and the old lot of felt are exposed to as representative as possible of a tissue sample. For the case of 1-ply tissue product, discard any product which might have been damaged or abraded. Next, obtain 48 strips of tissue each two usable units (also termed sheets) long. Place the first two usable unit strip on the far left of the lab bench and the last of the 48 samples on the far right of the bench. Mark the sample to the far left with the number "1" in a 1 cm by 1 cm area of the corner of the sample. Continue to mark the samples consecutively up to 48 such that the last sample to the far right is numbered 48.

Use the 24 odd numbered samples for the new felt and the 24 even numbered samples for the old felt. Order the odd number samples from lowest to highest. Order the even numbered samples from lowest to highest. Now, mark the lowest number for each set with a letter "Y." Mark the next highest number with the letter "O." Continue marking the samples in this alternating "Y"/"O" pattern. Use the "Y" samples for Yankee side out lint analyses and the "O" samples for off-Yankee side lint analyses. For 1-ply product, there are now a total of 24 samples for the new lot of felt and the old lot of felt. Of this 24, twelve are for Yankee side out lint analysis and 12 are for off-Yankee side lint analysis.

Rub and measure the Hunter Color L values for all 24 samples of the old felt as described below. Record the 12 Yankee side Hunter Color L values for the old felt. Average the 12 values. Record the 12 off-Yankee side Hunter Color L values for the old felt. Average the 12 values. Subtract the average initial un-rubbed Hunter Color L felt reading from the average Hunter Color L reading for the Yankee side rubbed samples. This is the delta average difference for the Yankee side samples. Subtract the average initial un-rubbed Hunter Color L felt reading from the average Hunter Color L reading for the off-Yankee side rubbed samples. This is the delta average difference for the off-Yankee side samples. Calculate the sum of the delta average difference for the Yankee-side and the delta average difference for the off-Yankee side and divide this sum by 2. This is the uncorrected lint value for the old felt. If there is a current felt correction factor for the old felt, add it to the uncorrected lint value for the old felt. This value is the corrected Lint Value for the old felt.

Rub and measure the Hunter Color L values for all 24 samples of the new felt as described below. Record the 12 Yankee side Hunter Color L values for the new felt. Average the 12 values. Record the 12 off-Yankee side Hunter Color L values for the new felt. Average the 12 values. Subtract the average initial un-rubbed Hunter Color L felt reading from the average Hunter Color L reading for the Yankee side rubbed samples. This is the delta average difference for the Yankee side samples. Subtract the average initial un-rubbed Hunter Color L felt reading from the average Hunter Color L reading for the off-Yankee side rubbed samples. This is the delta average difference for the off-Yankee side samples. Calculate the sum of the delta average difference for the Yankee-side and the delta average difference for the off-Yankee side and divide this sum by 2. This is the uncorrected lint value for the new felt.

Take the difference between the corrected Lint Value from the old felt and the uncorrected lint value for the new felt. This difference is the felt correction factor for the new lot of felt.

Adding this felt correction factor to the uncorrected lint value for the new felt should be identical to the corrected Lint Value for the old felt.

The same type procedure is applied to two-ply tissue product with 24 samples run for the old felt and 24 run for the new felt. But, only the consumer used outside layers of the plies are rub tested. As noted above, make sure the samples are prepared such that a representative sample is obtained for the old and new felts.

Lint Testing—Care of 4 Pound Weight

The four pound weight has four square inches of effective contact area providing a contact pressure of one pound per square inch. Since the contact pressure can be changed by alteration of the rubber pads mounted on the face of the weight, it is important to use only the rubber pads supplied by the manufacturer (Brown Inc., Mechanical Services Department, Kalamazoo, Mich.). These pads must be replaced if they become hard, abraded or chipped off.

When not in use, the weight must be positioned such that the pads are not supporting the full weight of the weight. It is best to store the weight on its side.

Lint Testing—Rub Tester Instrument Calibration

The Sutherland Rub Tester must first be calibrated prior to use. First, turn on the Sutherland Rub Tester by moving the tester switch to the "cont" position. When the tester arm is in its position closest to the user, turn the tester's switch to the "auto" position. Set the tester to run 5 strokes by moving the pointer arm on the large dial to the "five" position setting. One stroke is a single and complete forward and reverse motion of the weight. The end of the rubbing block should be in the position closest to the operator at the beginning and at the end of each test.

Prepare a tissue paper on cardboard sample as described above. In addition, prepare a felt on cardboard sample as described above. Both of these samples will be used for calibration of the instrument and will not be used in the acquisition of data for the actual samples.

Place this calibration tissue sample on the base plate of the tester by slipping the holes in the board over the hold-down pins. The hold-down pins prevent the sample from moving during the test. Clip the calibration felt/cardboard sample onto the four pound weight with the cardboard side contacting the pads of the weight. Make sure the cardboard/felt combination is resting flat against the weight. Hook this weight onto the tester arm and gently place the tissue sample underneath the weight/felt combination. The end of the weight closest to the operator must be over the cardboard of the tissue sample and not the tissue sample itself. The felt must rest flat on the tissue sample and must be in 100% contact with the tissue surface. Activate the tester by depressing the "push" button.

Keep a count of the number of strokes and observe and make a mental note of the starting and stopping position of the felt covered weight in relationship to the sample. If the total number of strokes is five and if the end of the felt covered weight closest to the operator is over the cardboard of the tissue sample at the beginning and end of this test, the tester is calibrated and ready to use. If the total number of strokes is not five or if the end of the felt covered weight closest to the operator is over the actual paper tissue sample either at the beginning or end of the test, repeat this calibration procedure until 5 strokes are counted the end of the felt covered weight closest to the operator is situated over the cardboard at the both the start and end of the test.

During the actual testing of samples, monitor and observe the stroke count and the starting and stopping point of the felt covered weight. Recalibrate when necessary.

Lint Testing—Hunter Color Meter Calibration

Adjust the Hunter Color Difference Meter for the black and white standard plates according to the procedures outlined in the operation manual of the instrument. Also run the stability check for standardization as well as the daily color stability check if this has not been done during the past eight hours. In addition, the zero reflectance must be checked and readjusted if necessary.

Place the white standard plate on the sample stage under the instrument port. Release the sample stage and allow the sample plate to be raised beneath the sample port.

Using the "L-Y", "a-X", and "b-Z" standardizing knobs, adjust the instrument to read the Standard White Plate Values of "L", "a", and "b" when the "L", "a", and "b" push buttons are depressed in turn.

Lint Testing—Measurement of Samples

The first step in the measurement of lint is to measure the Hunter color values of the black felt/cardboard samples prior to being rubbed on the tissue. The first step in this measurement is to lower the standard white plate from under the instrument port of the Hunter color instrument. Center a felt covered cardboard, with the arrow pointing to the back of the color meter, on top of the standard plate. Release the sample stage, allowing the felt covered cardboard to be raised under the sample port.

Since the felt width is only slightly larger than the viewing area diameter, make sure the felt completely covers the viewing area. After confirming complete coverage, depress the L push button and wait for the reading to stabilize. Read and record this L value to the nearest 0.1 unit.

If a D25D2A head is in use, lower the felt covered cardboard and plate, rotate the felt covered cardboard 90 degrees so the arrow points to the right side of the meter. Next, release the sample stage and check once more to make sure the viewing area is completely covered with felt. Depress the L push button. Read and record this value to the nearest 0.1 unit. For the D25D2M unit, the recorded value is the Hunter Color L value. For the D25D2A head where a rotated sample reading is also recorded, the Hunter Color L value is the average of the two recorded values.

Measure the Hunter Color L values for all of the felt covered cardboards using this technique. If the Hunter Color L values are all within 0.3 units of one another, take the average to obtain the initial L reading. If the Hunter Color L values are not within the 0.3 units, discard those felt/cardboard combinations outside the limit. Prepare new samples and repeat the Hunter Color L measurement until all samples are within 0.3 units of one another.

For the measurement of the actual tissue paper/cardboard combinations, place the tissue sample/cardboard combination on the base plate of the tester by slipping the holes in the board over the hold-down pins. The hold-down pins prevent the sample from moving during the test. Clip the calibration felt/cardboard sample onto the four pound weight with the cardboard side contacting the pads of the weight. Make sure the cardboard/felt combination is resting flat against the weight. Hook this weight onto the tester arm and gently place the tissue sample underneath the weight/felt combination. The end of the weight closest to the operator must be over the cardboard of the tissue sample and not the tissue sample itself. The felt must rest flat on the tissue sample and must be in 100% contact with the tissue surface.

Next, activate the tester by depressing the "push" button. At the end of the five strokes the tester will automatically stop. Note the stopping position of the felt covered weight in relation to the sample. If the end of the felt covered weight toward the operator is over cardboard, the tester is operating properly. If the end of the felt covered weight toward the operator is over sample, disregard this measurement and recalibrate as directed above in the Sutherland Rub Tester Calibration section.

Remove the weight with the felt covered cardboard. Inspect the tissue sample. If torn, discard the felt and tissue and start over. If the tissue sample is intact, remove the felt covered cardboard from the weight. Determine the Hunter Color L value on the felt covered cardboard as described above for the blank felts. Record the Hunter Color L readings for the felt after rubbing. Rub, measure, and record the Hunter Color L values for all remaining samples.

After all tissues have been measured, remove and discard all felt. Felts strips are not used again. Cardboards are used until they are bent, torn, limp, or no longer have a smooth surface.

Lint Testing—Calculations

Determine the delta L values by subtracting the average initial L reading found for the unused felts from each of the measured values for the off-Yankee and Yankee sides of the sample. Recall, multi-ply-ply product will only rub one side of the paper. Thus, three delta L values will be obtained for the multi-ply product. Average the three delta L values and subtract the felt factor from this final average. This final result is termed the lint for the fabric side of the 2-ply product.

For the single-ply product where both Yankee side and off-Yankee side measurements are obtained, subtract the average initial L reading found for the unused felts from each of the three Yankee side L readings and each of the three off-Yankee side L readings. Calculate the average delta for the three Yankee side values. Calculate the average delta for the three fabric side values. Subtract the felt factor from each of these averages. The final results are termed a lint for the fabric side and a lint for the Yankee side of the single-ply product. By taking the average of these two values, an ultimate lint value is obtained for the entire single-ply product.

Peel Force Test

An Instron Tensile Tester with two clamps was used to perform the peel force test. Narrow strips were cut from the belt in the machine direction (MD) or cross-machine direction (CD), each 4 in. long (100 mm). Initially, a small portion of the belt was peeled apart by hand, and then a strip from the papermaking top fabric and the woven bottom fabric was each placed in opposite clamps. The setting was set from 10 mm-90 mm of movement from the original length (10% to 90%) and a speed setting of 300 mm/min, and the Instron was started to peel the two strips from each other, while measuring the peel force result in N. The result was then converted to gf by multiplying by 102 unit conversion.

Figure 16:
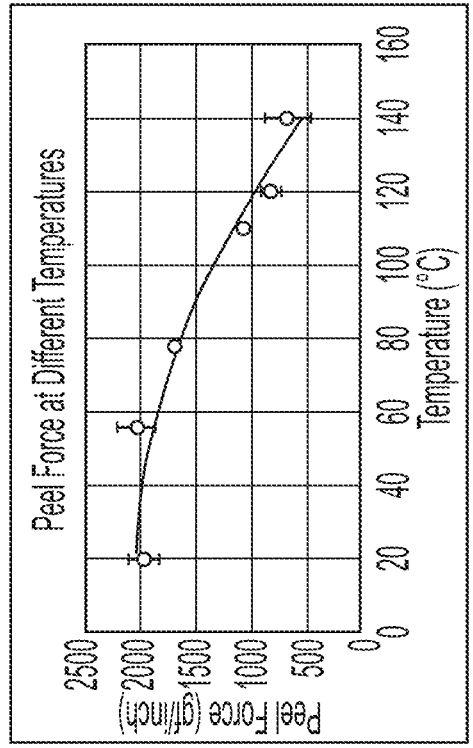
FIG. 16 provides peel test result of a structured tissue belt assembly according to an exemplary embodiment of the present invention.

FIG. 16 shows peel force at various temperature results for a 30×9 thermoplastic polyurethane (TPU) belt. The peel force of a laminated belt according to an exemplary embodiment of the present invention comprised of a woven support layer and extruded polymer netting web contacting layer was measured at 78 deg C. to be 1500 gf/in to 1900 gf/in, more preferably between 1600 gf/in to 1800 gf/inch.

Embedment Distance

To calculate embedment distance, perform a series of measurements using an AMES model AQD-2110 (1644 Concord Street in Framingham Massachusetts 01701, Tel #781 893-0095) caliper measurement device. Manually peel away and detach the web contacting layer from the woven supporting layer, until a large, flat area is produced, suitably sized for taking multiple measurements at different points.

Using the AMES device, take at least 5 caliper readings at different points on the exposed woven supporting layer. Average these measurements together and record them. Do not allow the plunger to strike the material being measured, this will artificially reduce the caliper. Allow the plunger to gently contact the material. Next, perform the same series of 5 caliper readings on the web contacting layer which has been peeled away from the woven supporting layer. Average these measurements together and record them. Finally, measure the total thickness of the composite/laminated belt. Take 5 caliper readings, widely spaced, from a piece of composite/laminated belt which still has the web contacting layer embedded into the woven supporting layer and has not been peeled or disturbed. Average these measurements together and record them.

Theoretically, a fabric which has achieved no embedment of the web contacting layer into the woven supporting layer will have a total thickness equal to the web contacting layer thickness plus the woven supporting layer thickness. Using the data collected previously in this procedure, calculate the zero-embedment value by adding the average web contacting layer thickness to the average woven supporting layer thickness, and record this number.

To calculate the total embedment, subtract the total measured thickness value from the zero-embedment thickness value. The difference between these two numbers is the distance to which the web contacting layer has become embedded in the woven supporting layer.

Example Measurements for Original Pet Netting:
  Measured web contacting layer thickness: 0.76 mm
  Measured base woven supporting layer thickness: 0.90 mm
  Calculated theoretical thickness: 0.76+0.90=1.66 mm
  Measured embedded thickness: 1.30 mm
  Calculated total embedment: 1.66−1.30=0.36 mm
  Calculated embedment percentage: ((1.66−1.30)/1.66)× 100%=21.69%

Shear Resistance

To calculate shear resistance, prepare samples by the following method. First, cut two samples from the composite belt or fabric, one at a 45 degree angle to the weft line, the second at a 135 degree angle to the weft line. These samples are to be 2.0±0.1 inches wide by a minimum of 9 inches long.

Next, mount the sample in the clamps of a Constant Rate Extension (CRE) testing machine such as an Instron 3343 tensile tester, manufactured by Instron of Norwood, MA The CRE machine is to be set at a 6.0 inch gauge length, a crosshead speed of 1 inch/minute, and a load range of 3.0 lbs, with a 100 lb load cell recommended. Cycle the CRE machine from 0 to 2 lbs/inch, then back to 0. Shear number is determined by measuring the fabric elongation between 0.5 to 2 lbs/inch of loading. The average shear number will be determined as the average of the 45 degree and 135 degree sample values.

Formula is given as follows:

Shear Number=(Load Range×Gauge Length)/(Fabric Elongation×Sample Width).

Shear Number=(6×3)/(Fabric Elongation×2)

This simplifies to 9 (lbs)×Fabric Elongation (inches)

46=9×(Fabric Elongation), therefore Fabric elongation=5.1 inches.

Figure 15:
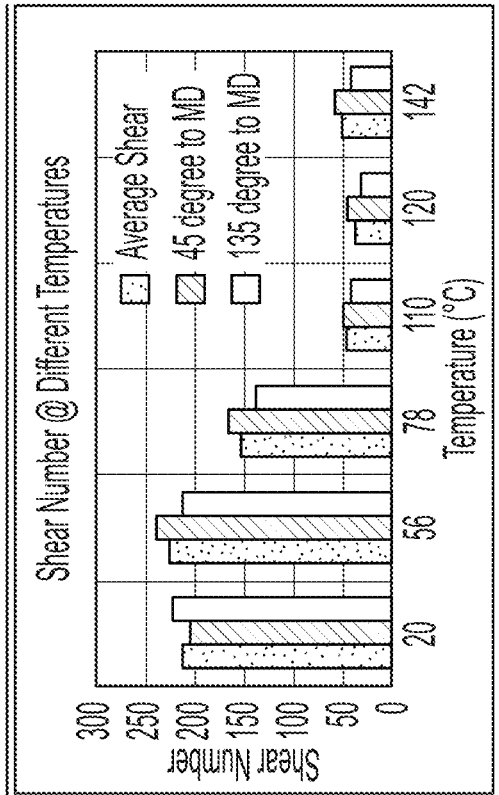
FIG. 15 provides shear test results of a structured tissue belt assembly according to an exemplary embodiment of the present invention.

FIG. 15 shows the shear number test of a 30×9 thermoplastic polyurethane (TPU) belt according to an exemplary embodiment of the present invention at various temperatures. Air impinged upon the paper web from the through dryers loses temperature as it evaporates water from the paper web. The air cools to about 70 to 80 deg C. by the time it passes through the paper web and reaches the structuring fabric. The shear resistance of a laminated belt according to an exemplary embodiment of the present invention comprised of a woven support layer and extruded polymer netting web contacting layer was measured at 78 deg C., with the resulting shear number being 130 to 180, more preferably 140 to 160 (a higher shear number represents a more rigid material with higher resistance to shear).

Permeability

Test by following the manual instructions of the Portable Air Permeability Tester FX 3360 PORTAIR available from TEXTEST AG, CH-8603 Schwerzenbach, Switzerland.

Crumple Testing

Crumple of a 2-ply tissue web was determined using a Tissue Softness Analyzer (TSA), available from EMTECH Electronic GmbH of Leipzig, Germany, using the crumple fixture (33 mm) and base. A punch was used to cut out five 100 cm² round samples from the web. One of the samples was loaded into the crumple base, clamped into place, and the crumple algorithm was selected from the list of available testing algorithms displayed by the TSA. After inputting parameters for the sample, the crumple measurement program was run. The test process was repeated for the remaining samples and the results for all the samples were averaged. Crumple force is a good measure of the flexibility or drape of the product.

The following Examples and Comparative Examples illustrate advantages of the various exemplary embodiments of the present invention.

Example 1

A laminated composite fabric, thermoplastic polyurethane (TPU) 30×5 (30 machine direction elements per inch by 9 cross-direction elements per inch in the top web contacting layer) was provided having a web contacting layer made up of an extruded netting. The extruded netting had the following characteristics and geometries: machine direction (MD) strands having a width of 0.26 mm and cross direction (CD) strands having a width of 0.60 mm, with a mesh of 30 MD strands per inch and a count of 5 CD strands per inch, contact area of 26% with solely MD strands in plane in static measurement and 42% contact area under load as the structure compressed and the CD strands moved up into the same plane as the MD strands, due to use of the thermoplastic polyurethane (TPU) elastomeric material. The TPU material is a softer material and measured in the range of 65 to 75 Shore A Hardness while the woven supporting layer comprised of harder PET measured 95 to 105 Shore A Hardness using a portable Shore A Durometer test device calibrated per ASTM D 2240, the Mitutoyo Hardmatic HH-300 series, ASTD. The distance between MD elements in the web contacting layer was 0.60 mm, and the distance between the CD elements was 5.50 mm. The overall pocket depth was equal to the thickness of the TPU netting, which was equal to 0.50 mm. The pocket depth from the top surface of the netting to the CD mid-rib element was 0.25 mm. The TPU netting had a natural color, the permeability of the TPU laminated belt was 460 CFM with a caliper of 0.90 mm. The peel force required to remove the web contacting layer from the woven supporting layer was 2600 gf/in, and the shear number was 225. The embedment distance was 0.23 mm. The supporting layer had a 0.27×0.22 mm cross-section rectangular MD yarn (or filament) at 56 yarns/inch, and a 0.35 mm thickness CD yarn at 41 yarns/inch. The weave pattern of the base layer was a 5-shed, 1 MD yarn over 4 CD yarns, then under 1 CD yarn, then repeated. The material of the base fabric yarns was 100% PET. The fabric was unsanded, with an air permeability of 675 CFM. The weft yarns received 0.40% carbon black content by weight in the CD, and 0.14% carbon black content by weight in the MD. A 20 percent by weight carbon black masterbatch was let down into neat polyethylene terephthalate to generate the desired concentration (from 0.4 to 0.14 weight percent) of carbon black in the yarn. The carbon black was evenly mixed by addition of the carbon black to the polymer pellets in a hopper prior to molten extrusion. The TPU netting was placed under 0.50 PLI (pounds per linear inch) of tension as it was being laminated to the supporting layer. The welding laser was purchased from Leister Technologies (1275 Hamilton Parkway Itasca, IL 60143). It was a NOVOLAS Basic AT with fiber-coupled (line-coupled) roll optics with nominal 300 W, 940 nm laser set to 40% power level (161 watts), at a welding head speed of 50 mm/sec and an optical line width of 34 mm with a 1 mm overlap between laser passes (line energy output 3200 J/m). The composite belt was used on a TAD machine using a specific furnish recipe and paper machine running conditions, as follows:

Two webs of through air dried tissue were laminated to produce a roll of 2-ply sanitary (bath) tissue. Each tissue web was multilayered with the fiber and chemistry of each layer selected and prepared individually to maximize product quality attributes of softness and strength. The first exterior layer, which was the layer that contacted the Yankee dryer, was prepared using 100% eucalyptus with 1.375 kg/ton of the amphoteric starch, Redibond 2038 (Corn Products, 10 Finderne Avenue, Bridgewater, New Jersey 08807) (for lint control). The interior layer was composed of 50% northern bleached softwood kraft fibers, 50% eucalyptus fibers, and 1.0 kg/ton of T526, a softener/debonder (EKA Chemicals Inc., 1775 West Oak Commons Court, Marietta, GA, 30062). The second exterior layer was composed of 50% northern bleached softwood kraft fibers, 50% eucalyptus fibers and 4.125 kg/ton of Redibond 2038 (to limit refining and impart Z-direction strength). Also added was 1.5 kg/ton of the glyoxylated polyacrylamide Hercobond 1194 (Ashland, 500 Hercules Road, Wilmington DE, 19808) (for strength when wet and for lint control) to both the interior and second exterior layer.

All the softwood fibers were refined at 37 kwh/ton to impart the necessary tensile strength.

The fiber and chemicals mixtures were diluted to solids of 0.5% consistency and fed to separate fan pumps, which delivered the slurry to a triple layered headbox. The headbox pH was controlled to 7.0 by addition of a caustic to the thick stock that was fed to the fan pumps. The headbox deposited the slurry to a nip formed by a forming roll, an outer forming wire, and inner forming wire. The slurry was drained through the outer wire, of a KT194-P design by Asten Johnson (4399 Corporate Rd, Charleston, SC USA), to aid with drainage, fiber support, and web formation. When the fabrics separated, the web followed the inner forming wire and dried to approximately 21.5% solids using a series of vacuum boxes and a steam box.

The web was then transferred to the laminated composite fabric with the aid of a vacuum box to facilitate fiber penetration into the fabric to enhance bulk softness and web imprinting. The web was dried with the aid of two TAD hot air impingement drums to approximately 73% solids before being transferred to the Yankee dryer.

The web was held in intimate contact with the Yankee drum surface running at 1350 m/min using an adhesive coating chemistry. The Yankee dryer was provided with steam at 4.0 bar while the installed hot air impingement hood over the Yankee dryer was blowing heated air at up to 250 degrees C. In accordance with an exemplary embodiment of the present invention, the web was creped from the Yankee dryer at 12% crepe (speed differential between the Yankee dryer and reel drum) at approximately 97.5% solids using a blade with a wear resistant chromia titania material with a set up angle of 20 degrees, a 0.50 mm creping shelf distance, and an 80 degree blade bevel. In alternative embodiments, the web may be creped from the Yankee at 12% crepe using a ceramic blade at a pocket angle of 90 degrees. The web was sent through a set of steel calenders gapped at 8 thousands of an inch. The web was cut into two of equal width using a high pressure water stream at 10,000 psi and was reeled into two equally sized parent rolls and transported to the converting process.

In the converting process, the two webs were plied together using mechanical ply bonding, or light embossing of the DEKO configuration (only the top sheet is embossed with glue applied to the inside of the top sheet at the high points derived from the embossments using an adhesive supplied by a cliché roll) with the second exterior layer of each web facing each other. The embossment coverage on the top sheet was 4%. The product was wound into a 2 ply bath tissue roll with 235 sheet count roll having a 127 mm roll diameter. The product did not have any surface additive and was not folded.

The following were the measured quality attributes of the 2-ply tissue web: Basis weight 40.0 grams/square meter, caliper 541 microns, MD Tensile 148.7 N/m, MD stretch 16.6%, CD Tensile 73.3 N/m, CD wet tensile of 15.1 N/m, a CD stretch of 12.1%, Handfeel of 89.6 with a TS7 of 10.2 dB V2 rms, a TS750 of 19.7 dB V2 rms, a D value of 2.6 mm/N, a ball burst of 304 gf, and a lint value of 4.1.

Other composite fabrics were prepared utilizing various tensions and tested for peel force. The results are shown in Table 1 below.

TABLE 1

| Sample | Tension (PLI) | Peel Force (gf/in) |
|---|---|---|
| 1 | 1.43 | 1816 |
| 2 | 2.86 | 2179 |

The fabric described in Example 1 can be used on a papermaking machine in excess of 2,000,000 cycles or revolutions before losing performance and needing to be removed. A conventional structuring or imprinting fabric, made using only woven monofilaments, will last approximately 800,000 to 1,400,000 revolutions prior to removal from the paper machine due to poor performance. Poor performance of a fabric typically results from monofilament fibrillation that plugs the open areas of the fabric preventing air flow and thus drying of the paper web. Fibrillation is caused by the weakening of the fabric monofilaments due to sanding the knuckles of the imprinting fabric to create greater surface area on the web contacting side of the fabric to aid in transfer of the web to the Yankee dryer and improve creping. Sanding of the monofilaments, however, weakens the monofilaments and allows the forces imparted by the fabric cleaning showers and machine nip points to fibrillate the monofilaments at the weaker areas derived by the sanding operation. Compression of the fabric monofilaments is a second cause of poor performance. The compression of the fabric through machine nip points causes the gradual collapse of the open areas of the fabric into which the web molds or imprints. With the collapse of these open areas, bulk generation gradually erodes until target web bulk can not be achieved and the fabric is removed.

When using a fabric with an overlaid polymer netting of the type described in Example 1, no sanding of the web contacting layer is required. Also, the pocket in the extruded netting is completely open with no obstructions, while the conventional woven structured TAD fabrics have a pocket that is partially obstructed by lower plane crossing yarns within the weave pattern. Thus, the extruded polymer netting is able to generate higher bulk and retain that bulk for longer periods of run time. The netting is compressible and thus flattens such that the MD ridges come into the same plane as the CD mid-ribs in the nip between the pressure roll and Yankee dryer, providing more than the necessary contact area for web transfer to the Yankee dryer and improved creping. The surface area of the MD ridges on the fabric described in Example 1 is 28% but increases to 53% when compressed in the pressure roll nip as the MD ridges are compressed down to the same plane as the CD mid-ribs.

Comparative Example 1

The same papermaking process as that of the Example 1 was carried out, except the composite fabric was replaced with a woven fabric called 41M, supplied by Voith (Heidenheim, Germany) and having a 5 shed design with a weave pattern of 1 MD yarn over 4 CD yarns then under 1 CD yarn which then repeats, a 17.8 yarn/cm mesh by 11.1 yarn/cm count, a 0.35 mm warp monofilament, a 0.50 mm weft monofilament, a 1.02 mm caliper, with a 640 cfm and a knuckle surface that was sanded to impart 27% contact area with the Yankee dryer.

Two webs of through air dried tissue were laminated to produce a roll of 2-ply sanitary (bath) tissue. Each tissue web was multilayered with the fiber and chemistry of each layer selected and prepared individually to maximize product quality attributes of softness and strength. The first exterior layer, which was the layer that contacted the Yankee dryer, was prepared using 100% eucalyptus with 1.375 kg/ton of the amphoteric starch, Redibond 2038 (Corn Products, 10 Finderne Avenue, Bridgewater, New Jersey 08807) (for lint control). The interior layer was composed of 50% northern bleached softwood kraft fibers, 50% eucalyptus fibers, and 1.0 kg/ton of T526, a softener/debonder (EKA Chemicals Inc., 1775 West Oak Commons Court, Marietta, GA, 30062). The second exterior layer was composed of 50% northern bleached softwood kraft fibers, 50% eucalyptus fibers and 5.625 kg/ton of Redibond 2038 (to limit refining and impart Z-direction strength). Also added was 1.5 kg/ton of the glyoxylated polyacrylamide Hercobond 1194 (Ashland, 500 Hercules Road, Wilmington DE, 19808) (for strength when wet and for lint control) to both the interior and second exterior layer.

All the softwood fibers were refined at 37 kwh/ton to impart the necessary tensile strength.

The fiber and chemicals mixtures were diluted to solids of 0.5% consistency and fed to separate fan pumps, which delivered the slurry to a triple layered headbox. The headbox pH was controlled to 7.0 by addition of a caustic to the thick stock that was fed to the fan pumps. The headbox deposited the slurry to a nip formed by a forming roll, an outer forming wire, and inner forming wire. The slurry was drained through the outer wire, of a KT194-P design by Asten Johnson (4399 Corporate Rd, Charleston, SC USA), to aid with drainage, fiber support, and web formation. When the fabrics separated, the web followed the inner forming wire and dried to approximately 21.5% solids using a series of vacuum boxes and a steam box.

The web was then transferred to the woven fabric with the aid of a vacuum box to facilitate fiber penetration into the fabric to enhance bulk softness and web imprinting. The web was dried with the aid of two TAD hot air impingement drums to approximately 75% solids before being transferred to the Yankee dryer.

The web was held in intimate contact with the Yankee drum surface running at 1050 m/min using an adhesive coating chemistry. The Yankee dryer was provided with steam at 4.0 bar while the installed hot air impingement hood over the Yankee dryer was blowing heated air at up to 200 degrees C. The web was creped from the yankee dryer at 13% crepe (speed differential between the Yankee dryer and reel drum) at approximately 97.5% solids using a blade with a wear resistant chromia titania material with a set up angle of 20 degrees, a 0.50 mm creping shelf distance, and an 80 degree blade bevel. The web was sent through a set of steel calendars gapped at 8 thousands of an inch. The web was cut into two of equal width using a high pressure water stream at 10,000 psi and was reeled into two equally sized parent rolls and transported to the converting process.

In the converting process, the two webs were plied together using mechanical ply bonding, or light embossing of the DEKO configuration (only the top sheet is embossed with glue applied to the inside of the top sheet at the high points derived from the embossments using an adhesive supplied by a cliché roll) with the second exterior layer of each web facing each other. The embossment coverage on the top sheet was 4%. The product was wound into a 235 sheet count roll at 127 mm roll diameter.

The following were the measured quality attributes of the 2-ply tissue web: Basis weight 41.1 grams/square meter, caliper 500 microns, MD Tensile 121.5 N/m, MD stretch 21.2%, CD Tensile 67.9 N/m, a CD wet tensile of 15.8 N/m, a CD stretch of 8.6%, Handfeel of 93.0 with a TS7 of 8.9 dB V2 rms, a TS750 of 25.3 dB V2 rms, a D value of 2.9 mm/N, a ball burst of 183 gf, and a lint value of 7.0.

Example 2

A laminated composite fabric, P10SM TPU 30×9, was provided having a web contacting layer with the following characteristics and geometries: extruded netting with MD strands of 0.26 mm width×CD strands of 0.46 mm width, with a mesh of 30 MD strands per inch and a count of 9 CD strands per inch, % contact area of 26% with solely MD strands in plane in static measurement and then with 48% contact area under load as the structure compressed and the CD ribs moved into the same plane as the MD strands, due to use of the thermoplastic polyurethane ("TPU") elastomeric material. The TPU material is a softer material and measured in the range of 65 to 75 Shore A Hardness while the woven supporting layer comprised of harder PET measured 95 to 105 Shore A Hardness using a portable Shore A Durometer test device calibrated per ASTM D 2240, the Mitutoyo Hardmatic HH-300 series, ASTD. The distance between MD elements in the web contacting layer was 0.60 mm, and the distance between the CD elements was 2.25 mm. The overall pocket depth was equal to the thickness of the TPU netting, which was equal to 0.50 mm. The pocket depth from the top surface of the netting to the CD mid-rib element was 0.25 mm. The TPU netting was a natural color, the permeability of the TPU laminated belt was 410 CFM and the laminated belt had a caliper of 0.99 mm. The peel force required to remove the web contacting layer from the woven supporting layer was 1400 gf and the shear number was 225. The embedment distance was 0.14 mm. The supporting layer had a 0.27×0.22 mm cross-section rectangular MD yarn at 56 yarns/inch, and a 0.35 mm CD yarn at 41 yarns/inch. The weave pattern of the base layer was a 5-shed, 1 MD yarn over 4 CD yarns, then under 1 CD yarn, then repeated. The material of the base fabric yarns was 100% PET, and the yarns were transparent. The fabric was sanded at 25% contact area, with an air permeability of 675 CFM. The weft yarns received 0.40% carbon black content by weight in the CD, and the warp yarns received 0.14% carbon black content by weight in the MD. The base fabric and a Mylar protective cover fabric were not placed under any tension during the production process. Mylar, also known as BoPET (Biaxially-oriented polyethylene terephthalate) is a polyester film made from stretched polyethylene terephthalate (PET) and is used for its high tensile strength, and chemical and dimensional stability. Other films can be used if they are non-stick and they are able to maintain dimensional stability. Suitable other non-stick films include polytetrafluoroethylene (TEFLON), silicone treated films and the like. By non-stick is meant having a surface energy between about 10 mj/m$^2$ to about 200 mj/m$^2$. The TPU netting was placed under 0.50 PLI of tension during production. The welding laser was set to 40% power level (161 watts), at a welding head speed of 50 mm/sec and an optical line width of 34 mm with a 1 mm overlap between laser passes (line energy was set to 3200 J/m).

Figure 26:
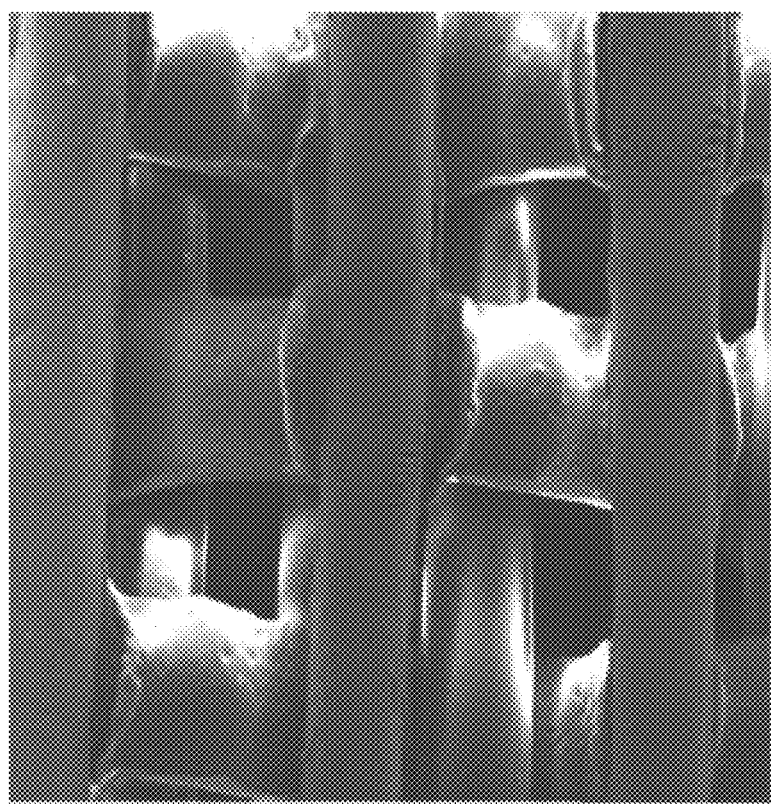
FIG. 26 is a micrograph showing atop view of a structured tissue belt assembly according to an exemplary embodiment of the present invention.

FIG. 26 is a micrograph of the composite fabric used in this example, showing the embedment of the web contacting layer into the supporting layer.

The composite belt was used on a TAD machine using a specific furnish recipe and paper machine running conditions, as follows:

Two webs of through air dried tissue were laminated to produce a roll of 2-ply sanitary (bath) tissue. Each tissue web was multilayered with the fiber and chemistry of each layer selected and prepared individually to maximize product quality attributes of softness and strength. The first exterior layer, which was the layer that contacted the Yankee dryer, was prepared using 100% eucalyptus with 1.0 kg/ton of the amphoteric starch, Redibond 2038 (Corn Products, 10 Finderne Avenue, Bridgewater, New Jersey 08807) (for lint control) and 0.25 kg/ton of Hercobond 6350 polylvinyl amine as a retention aid (Ashland, 500 Hercules Road, Wilmington DE, 19808). The interior layer was composed of 60% northern bleached softwood kraft fibers, 40% eucalyptus fibers, and 1.7 kg/ton of T526, a softener/debonder (EKA Chemicals Inc., 1775 West Oak Commons Court, Marietta, GA, 30062). The second exterior layer was composed of 60% northern bleached softwood kraft fibers, 40% eucalyptus fibers and 5.5 kg/ton of Redibond 2038 (to limit refining and impart Z-direction strength) and 0.25 kg/ton of Hercobond 6350 polylvinyl amine as a retention aid. Also added was 1.25 kg/ton of the glyoxylated polyacrylamide Hercobond 1194 (Ashland, 500 Hercules Road, Wilmington DE, 19808) (for strength when wet and for lint control) to both the interior and second exterior layer.

All the softwood fibers were refined at 20 kwh/ton to impart the necessary tensile strength.

The fiber and chemicals mixtures were diluted to solids of 0.5% consistency and fed to separate fan pumps, which delivered the slurry to a triple layered headbox. The headbox pH was controlled to 7.0 by addition of a caustic to the thick stock that was fed to the fan pumps. The headbox deposited the slurry to a nip formed by a forming roll, an outer forming wire, and inner forming wire. The slurry was drained through the outer wire, of a KT194-P design by Asten Johnson (4399 Corporate Rd, Charleston, SC USA), to aid with drainage, fiber support, and web formation. When the fabrics separated, the web followed the inner forming wire and dried to approximately 25% solids using a series of vacuum boxes and a steam box.

The web was then transferred to the laminated composite fabric with the aid of a vacuum box to facilitate fiber penetration into the fabric to enhance bulk softness and web imprinting. The web was dried with the aid of two TAD hot air impingement drums to approximately 82% solids before being transferred to the Yankee dryer.

The web was held in intimate contact with the Yankee drum surface running at 920 m/min using an adhesive coating chemistry. The Yankee dryer was provided with steam at 3.5 bar while the installed hot air impingement hood over the Yankee dryer was not utilized. In accordance with an exemplary embodiment of the present invention, the web was creped from the yankee dryer at 13% crepe (speed differential between the Yankee dryer and reel drum) at approximately 96.0% solids using a blade with a wear resistant chromia titania material with a set up angle of 20 degrees, a 0.50 mm creping shelf distance, and an 80 degree blade bevel. In alternative embodiments, the web may be creped from the Yankee at 13% crepe using a ceramic blade at a pocket angle of 90 degrees. The web was cut into two of equal width using a high pressure water stream at 10,000 psi and was reeled into two equally sized parent rolls and transported to the converting process.

In the converting process, the two webs were plied together using mechanical ply bonding, or light embossing of the DEKO configuration (only the top sheet is embossed with glue applied to the inside of the top sheet at the high points derived from the embossments using an adhesive supplied by a cliché roll) with the second exterior layer of each web facing each other. The embossment coverage on the top sheet was 4%. The product was wound into a 2 ply bath tissue roll with 208 sheet count roll at 127 mm roll diameter. No surface additives were used and the tissue was not folded.

Figure 17:
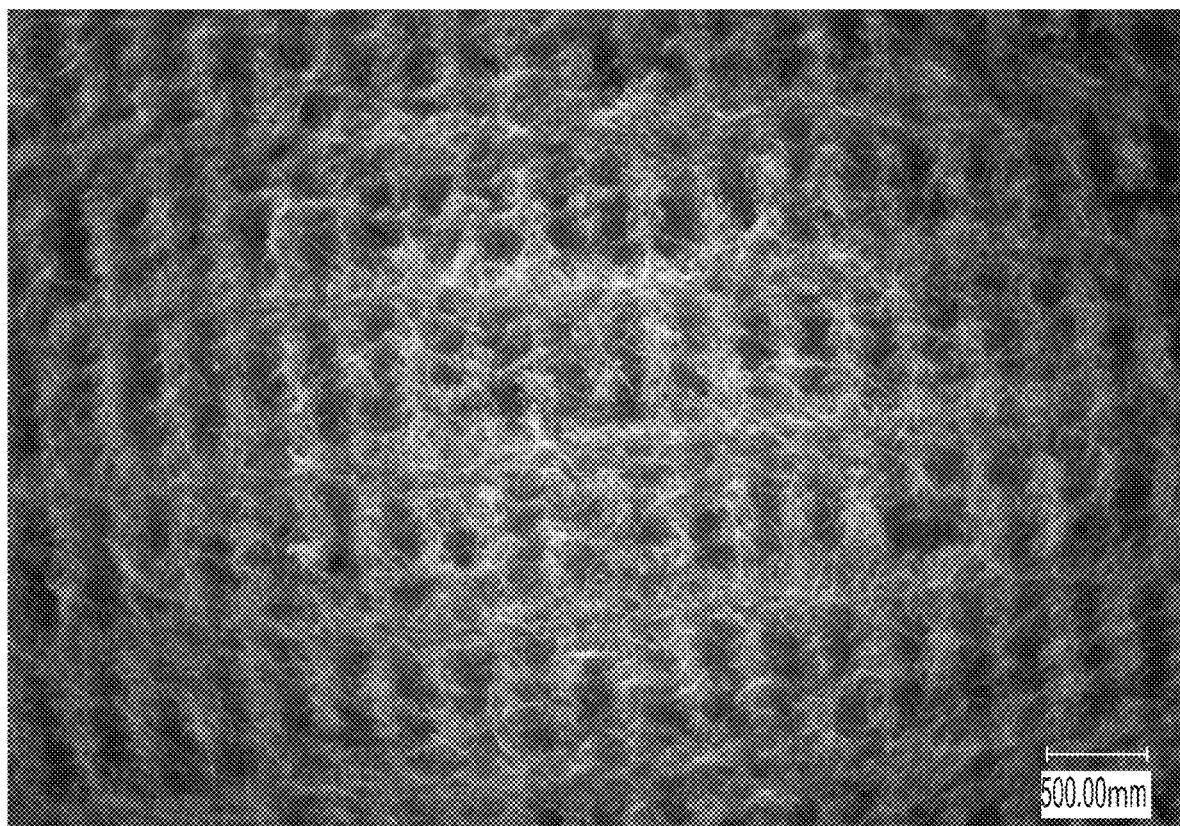
FIG. 17 is a micrograph showing a top view of a bath tissue product according to an exemplary embodiment of the present invention.
Figure 18:
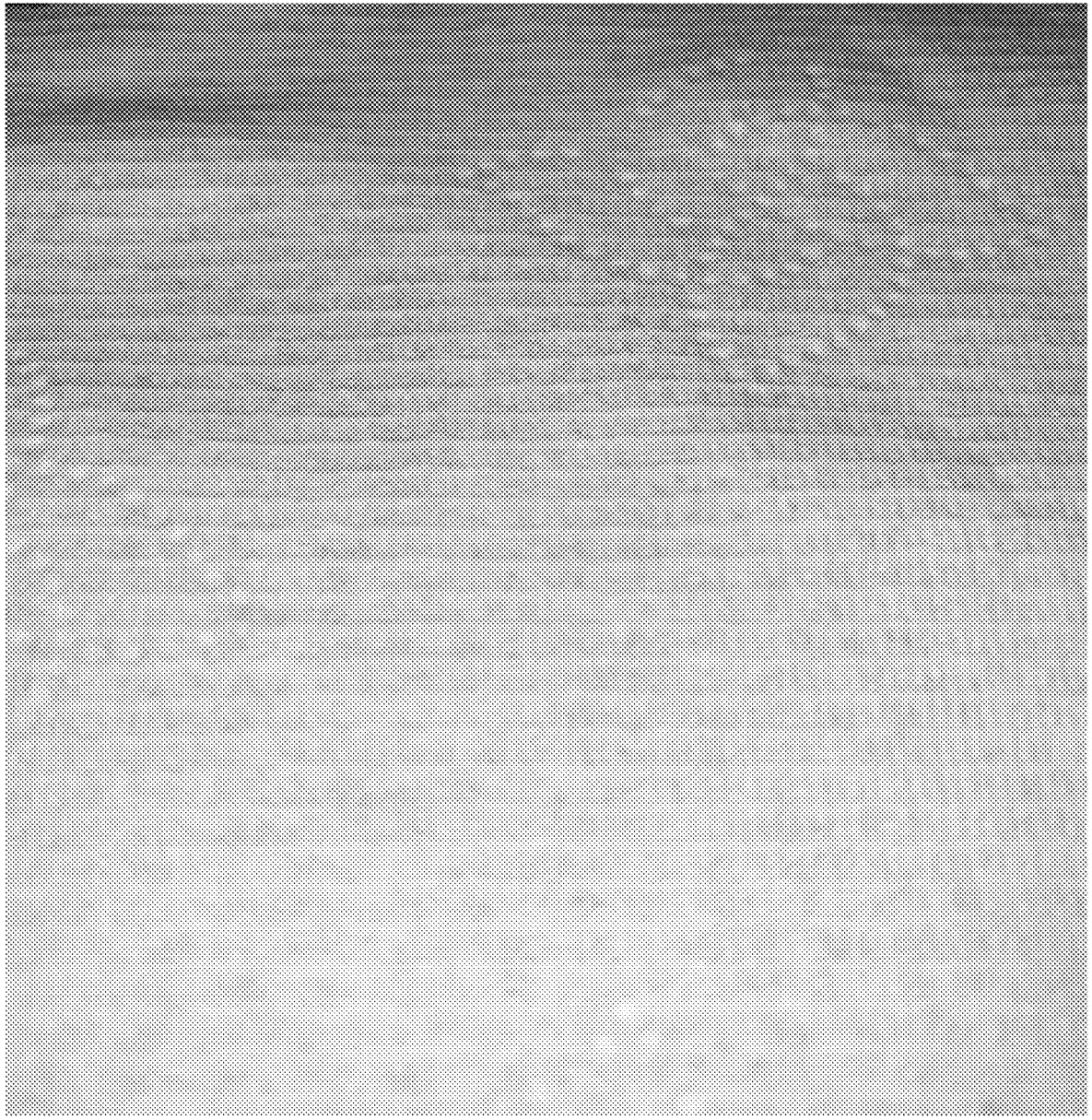
FIG. 18 is a photograph showing a bath tissue product according to an exemplary embodiment of the present invention.
Figure 19:
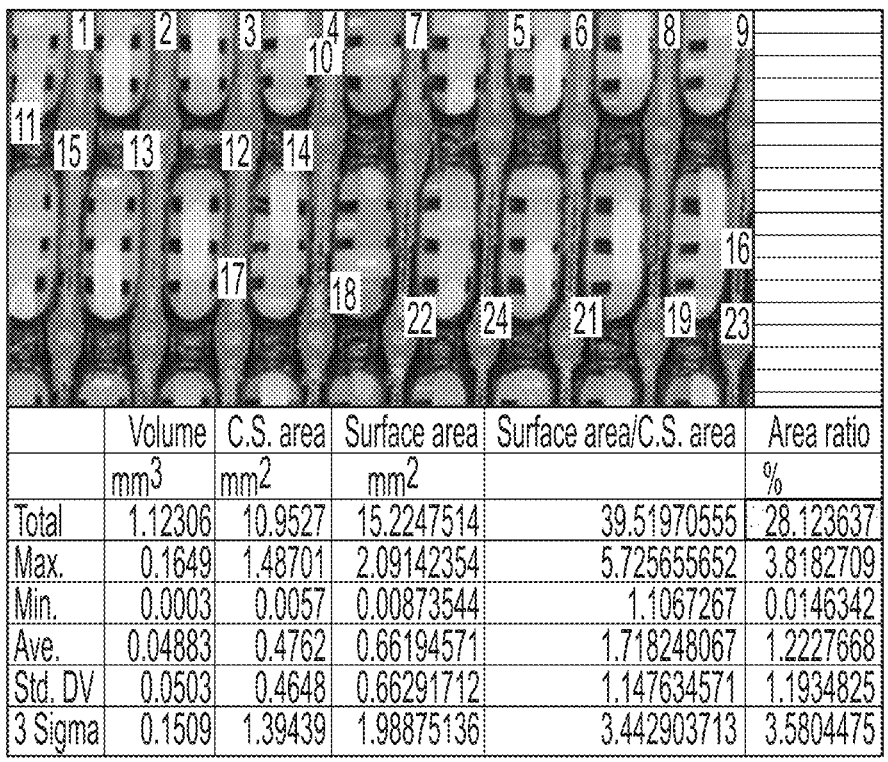
FIG. 19 illustrates contact area of a structured tissue belt assembly according to an exemplary embodiment of the present invention as the belt approaches a nip between a press roll and a Yankee dryer.
Figure 20:
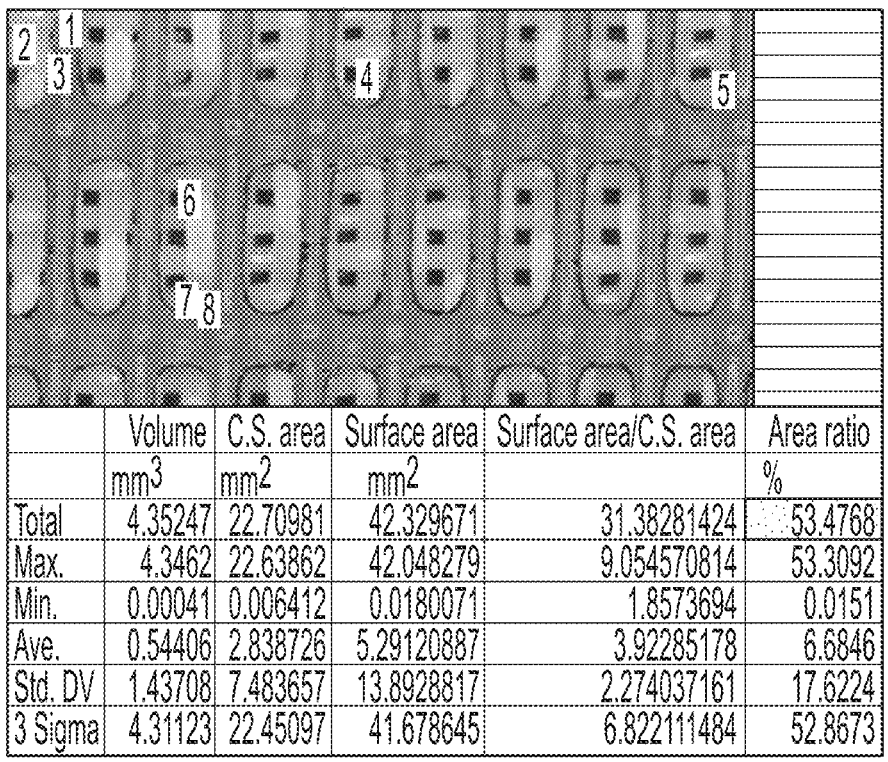
FIG. 20 illustrates contact area of the structured tissue belt assembly of FIG. 19 within the nip.

The following were the measured quality attributes of the 2-ply tissue web: Basis weight 39.6 grams/square meter, caliper 592 microns, MD Tensile 103.8 N/m, MD stretch 18.0%, CD Tensile 62.4 N/m, CD wet tensile of 11.4 N/m, a CD stretch of 10.8%, Handfeel of 93.1 with a TS7 of 8.6 dB V2 rms, a TS750 of 27.2 dB V2 rms, a D value of 3.3 mm/N, a ball burst of 243 gf, and a lint value of 5.0. The tissue had a fiber concentration in MD regions and CD regions as a function of soft nip transfer with the composite belt top surface compressing under load of the pressure roll and Yankee nip. This resulted in the greater concentration of fiber build up on the CD mid-ribs of the composite fabric coming to the surface under load as seen in FIGS. 17 and 18. The fiber orientation contributed to the tensile development and high ball burst as well as the CD stretch. The composite fabric had a 28% contact area (FIG. 19) leading into the nip and a surface contact area of 54% (FIG. 20) in the nip as the compressible TPU material in the top cloth compressed fully in mid-nip, before decompressing outside the nip and returning to the 28% contact area.

Example 3

The same papermaking and converting process as that of the Example 2 was carried out except the web was sent through a set of steel calenders gapped at 8 thousands of an inch prior to being reeled into two equally sized parent rolls and transported to the converting process.

2 ply bath tissue rolls were produced at 235 sheet count and 127 mm roll diameter. No surface additives were used and the tissue was not folded. The following were the measured quality attributes of the 2-ply tissue web: Basis weight 39.9 grams/square meter, caliper 508 microns, MD Tensile 101.5 N/m, MD stretch 19.4%, CD Tensile 55.6 N/m, CD wet tensile of 9.5 N/m, a CD stretch of 10.9%, Handfeel of 95.0 with a TS7 of 7.9 dB V2 rms, a TS750 of 24.8 dB V2 rms, a D value of 3.3 mm/N, a ball burst of 226 gf, and a lint value of 4.5.

Comparative Example 2

In this example, an attempt was made to produce a laminated belt using a 3D printed top substrate laminated to a woven bottom base fabric. The 3D print substrate was the web contacting layer with the following geometries: printed MD elements widths of 0.26 mm×CD printed element widths of 0.46 mm, with a mesh of 30 MD elements per inch and a count of 9 CD elements per inch, % contact area of 25% with solely MD strands in plane in static measurement. The printed ink material was AC-130, acrylic thermally stable ink from Stratasys and the substrate had very little stretch and elasticity, measuring 10% on an Instron tensile tester. The distance between MD elements in the web contacting layer was 0.60 mm, and the distance between the CD elements was 2.25 mm. The overall pocket depth was equal to the thickness of the 3D print substrate which was equal to 0.52 mm. The pocket depth from the top surface of the netting to the CD mid-rib element was 0.26 mm. The 3D print substrate had a natural transparent color, the permeability of the 3D print substrate was 512 CFM and the substrate had a caliper of 0.52 mm. The supporting layer had a 0.27×0.22 mm cross-section rectangular MD yarn at 56 yarns/inch, and a 0.35 mm CD yarn at 41 yarns/inch. The weave pattern of the base layer was a 5-shed, 1 MD yarn over 4 CD yarns, then under 1 CD yarn, then repeated. The material of the base fabric yarns was 100% PET, and the yarns were black. The fabric was sanded at 25% contact area, with an air permeability of 675 CFM. The weft yarns received 0.40% carbon black content by weight in the CD, and 0.14% carbon black content by weight in the MD. The base fabric and Mylar protective cover fabric were not placed under any tension during the production process. The 3D print substrate was placed under 0.50 PLI of tension during production. The welding laser was set to 40% power level (161 watts), at a welding head speed of 50 mm/sec and an optical line width of 34 mm with a 1 mm overlap between laser passes (the line energy was set to 3200 J/m). In these conditions, the laser was able to pass through the 3D print transparent substrate and soften and melt the black contacting yarns in the bottom base fabric. Without any significant stretch or elasticity in the 3D print substrate it did not embed into the body of the soft molten black yarns and get encapsulated by the displaced black PET material. Instead the 3D printed substrate remained on top of the woven substrate and did not laminate or weld to the woven base and therefore did not create any measureable peel force or weld strength.

Without being bound by theory, the peel force strength between the web contacting layer and supporting layer is enhanced if the web contacting layer is stretched during the lamination process. During the lamination process according to exemplary embodiments of the present invention, a load between 0.5 to 5 PLI, more preferably, 0.5 to 3 PLI, is applied to the web contacting layer using direct pressure from a Mylar belt. The percent stretch that occurs to the web contacting layer as pressure from the Mylar belt is applied cannot be directly measured, but it is theorized that as load is applied, the diameter of the polymer netting segments of the web contacting layer decrease or shrink and attempt to enlarge to the pre-load diameter once the load is removed. This attempt of the diameter to enlarge to the pre-load levels provides additional lamination strength as measured by peel force strength. It is also theorized that the higher the load, the more stretch is undergone by the netting segments of the web contacting layer and the greater the peel force strength as shown in Table 1. The amount of stretch undergone is dependent on the material properties of the web contacting layer itself, particularly stretch properties. For example, laser welding a web contacting layer with 10% stretch to a woven supporting layer using 0.5 PLI force applied using a Mylar belt was unsuccessful and peel force strength between the layers was 0 grams force per inch (gf/in). Web supporting layers with 300 to 800% stretch could be successfully laser laminated to a woven supporting layer when tension of 0.50 PLI was applied using a Mylar belt, with resulting peel force strengths of 1500 to 1900 gf/inch. Stretch of the web contacting layer was measured using an Instron tensile tester where load is applied until the sample pulls apart or fails and the percent change in length is calculated.

The laminated belts according to exemplary embodiments as described herein may be used on papermaking machines to form tissue products. In this regard, the unique properties of the inventive papermaking belt, such as, for example, enhanced flexibility and/or shear resistance and enhanced air flow in both the X and Y directions, result in tissue products with enhancements in quality attributes, such as, for example, softness, strength, ball burst, and lint value, as compared to conventional tissue products. Bath tissue in accordance with exemplary embodiments of the present invention may have the following attributes: TS7 of 4 to 14, preferably 6 to 9; ball burst of 180 to 270 gf, preferably 200 to 250 gf, lint value of 5.0 to 8.0, preferably 5.0 to 6.0; TS750 of 15 to 30 db $V^2$ rms, preferably 20 to 25 db $V^2$ rms.

Some of the properties of bath tissue according to exemplary embodiments of the present invention may be analyzed through images of the tissue and computer analysis of the images. Images used to calculate the Texture Directionality in the Machine Direction (Sstgy) and Surface Roughness (Sq) were acquired using a Keyence Model VR-3200 G2 3D Macroscope equipped with motorized XY stage, VR-3000K controller, VR-H2VE version 2.3.0.101 Viewer software, and VR-H2AE Analyzer software. The test procedure is described below.

Sq and Sstgy Testing

Figure 21:
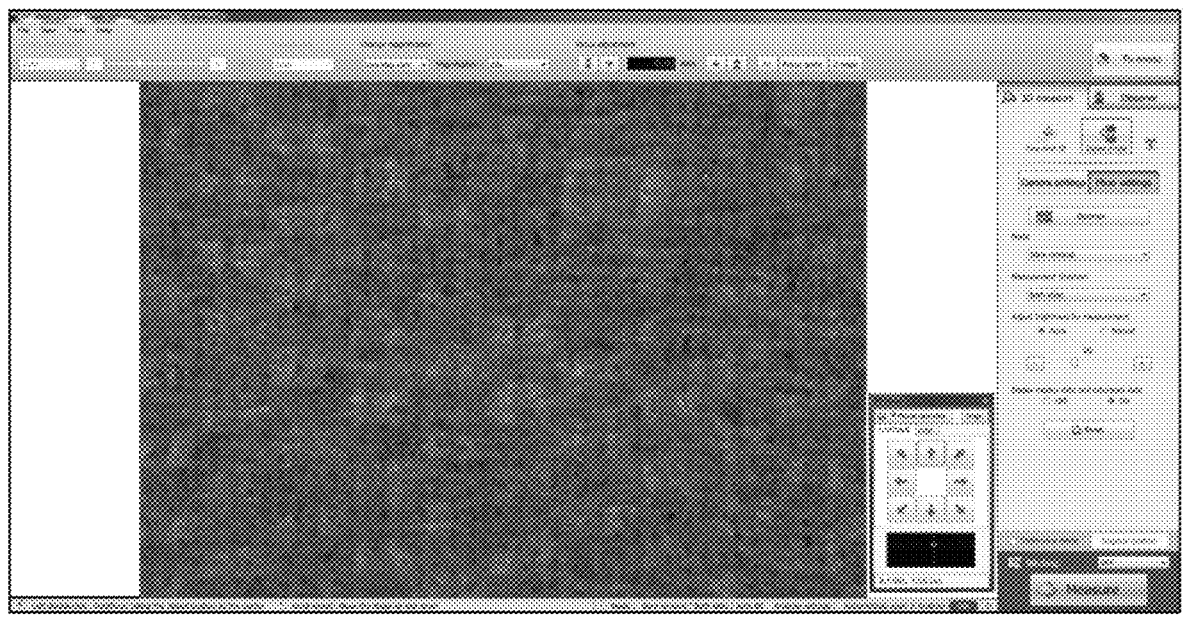
FIGS. 21-24 show input settings used in Sq and Sstgy testing according to an exemplary embodiment of the present invention.

After following calibration procedures, as outlined by the Keyence equipment manual from 2016, the instrument was configured for 25× magnification with low magnification. The following was selected on the viewer software as shown in FIG. 21: "Expert mode" for viewer capture method, and "normal" capture image type for Camera settings. For Measurement settings: "Glare removal" mode was selected with "both sides" measurement direction, Adjust brightness for measurement set to "Auto," and Display missing and saturated data turned "ON." This resulted in a "3D surface data set" which is approximately 12.1 mm (X direction) by 9.1 mm (Y direction) with a pixel size of approximately 7.9 microns.

On bath tissue, the top surface of the top ply is the surface of interest, avoiding any and all emboss points if possible.

Embossments are not representative of the majority of the surface and should be avoided during the "3D surface data set" acquisition. A representative bath tissue sheet was torn from the center of a roll and held in place using weights. When tearing the sheet from the roll, care was taken so as to not alter the topographic features of the sample. The machine direction (MD) of the sample was placed in the Y axis (front to back on the stage as seen from operator perspective in front of the system) while the cross direction (CD) was placed in the X axis (left to right on the stage as seen from operator perspective in front of the system). Care was taken to ensure no creases or folds were present in the sample and the sample was not under any MD or CD directional stress. The image was autofocused prior to capturing the "3D surface data set". Three of these "3D surface data sets" were collected for each sample.

"3D surface data sets" were exported from the analyzer software with image type "Height" and the "No Skip" option selected. These "3D surface data sets" were analyzed with OmniSurf3D (v1.02.047) software, available from Digital Metrology Solutions, Inc. of Columbus, IN, USA for parameter calculations.

Figure 22:
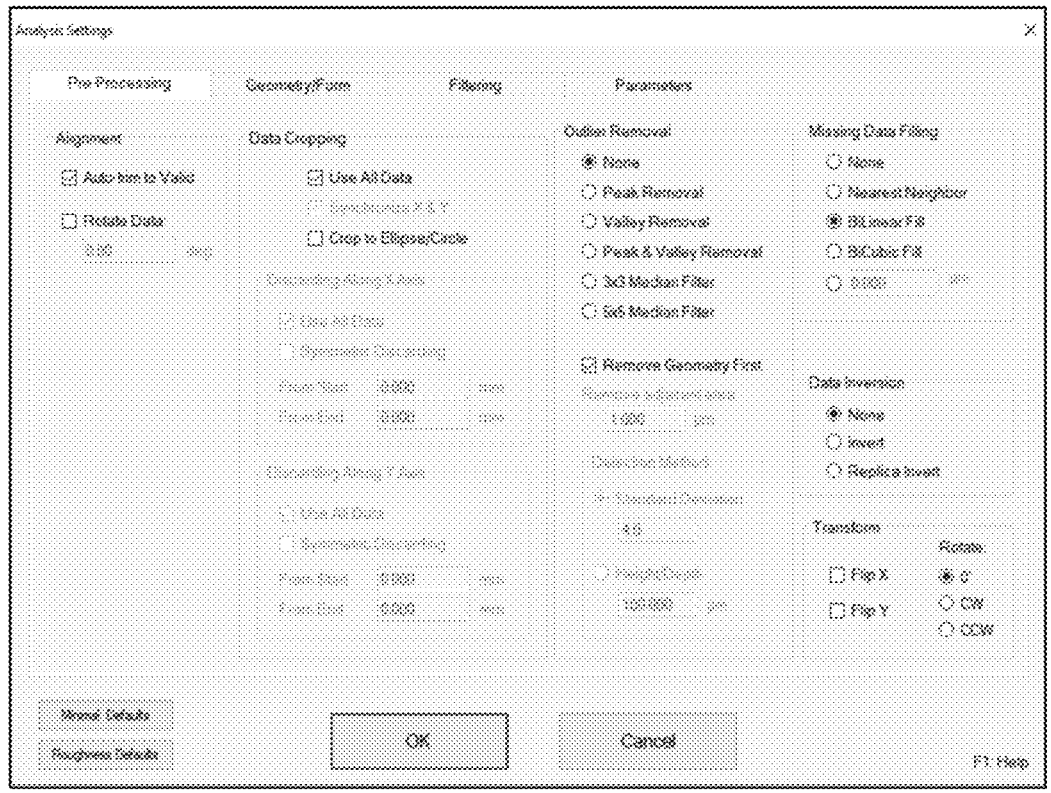
Figure 23:
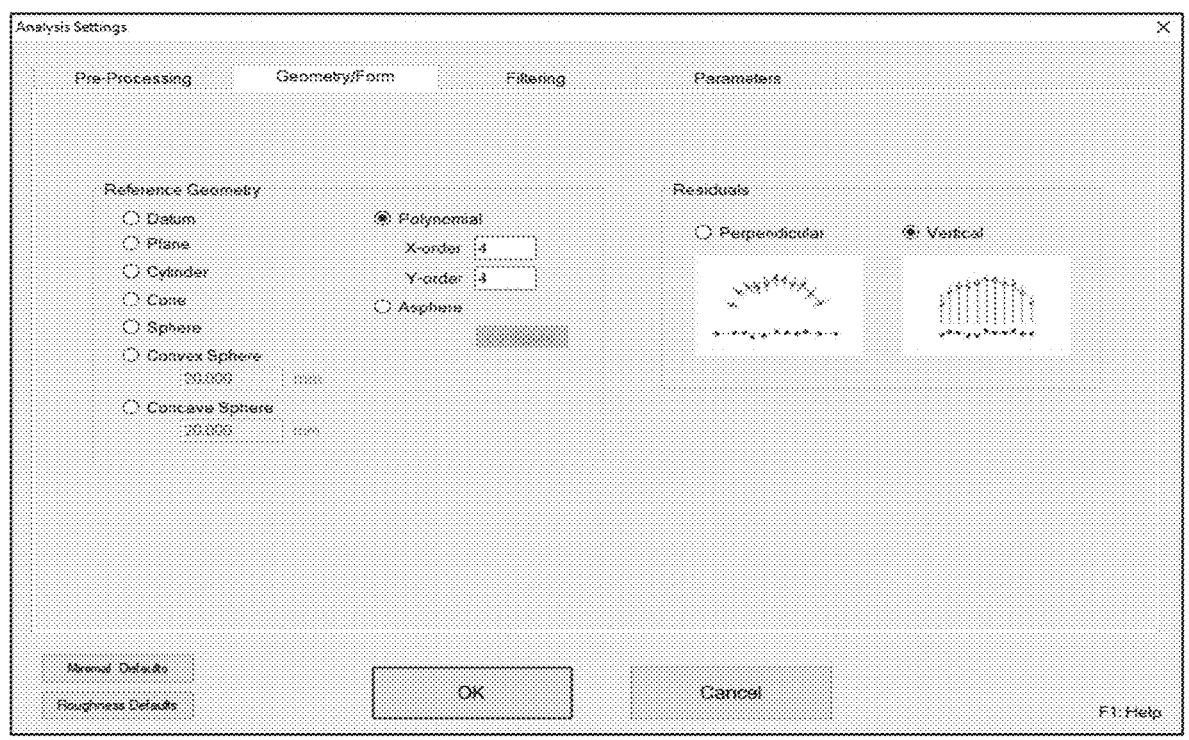
Figure 24:
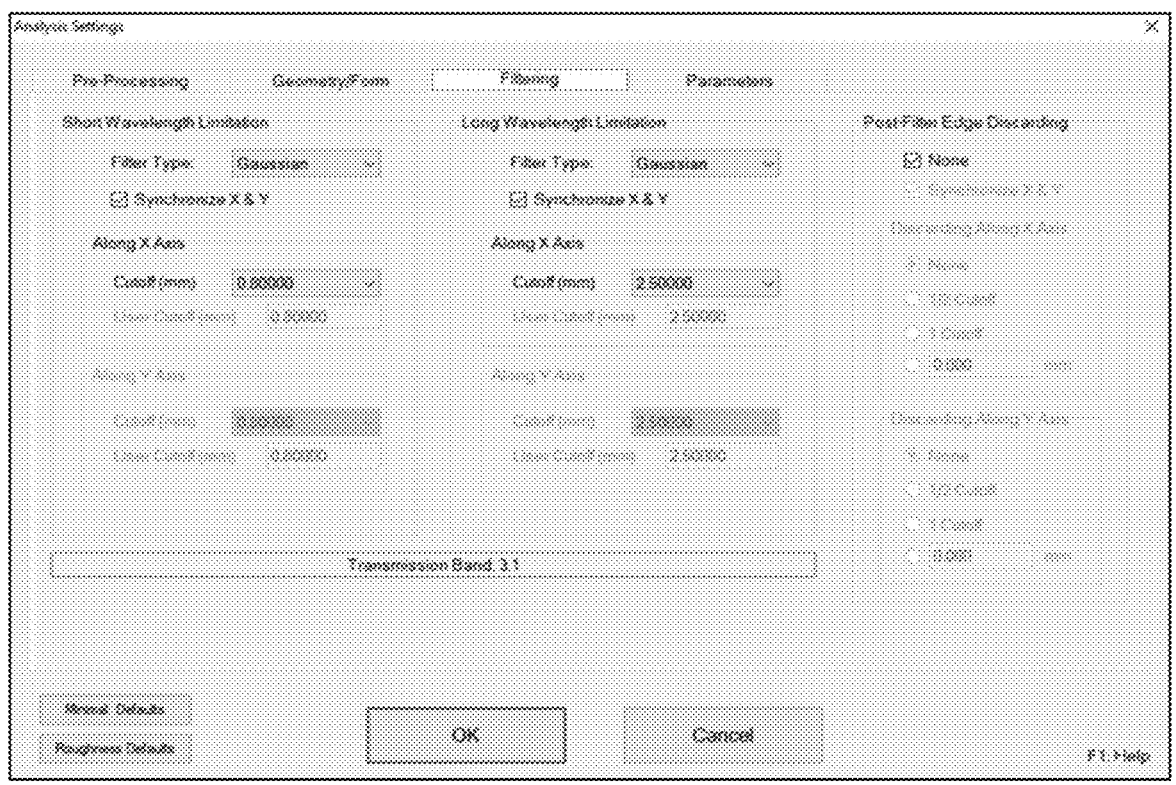

The OmniSurf 3D settings were set as follows:

Preprocessing: Alignment—Auto-trim to Valid, Data Cropping—Use all data, Outlier Removal—None, Missing Data Filling—BiLinear Fill, Data Inversion—None, Transform, Rotate—0, Geometry/Form: Reference Geometry—Polynomial, X-order=4, Y-order=4, Residuals-Vertical Filtering: Short Wavelength Limitation—Gaussian/0.80000 mm/Sync X&Y, Long Wavelength Limitation-Gaussian/2.50000 mm/Sync X&Y, Post-Filter Edge Discarding—None The Pre-processing settings are shown in FIG. 22. The Geometry Settings are shown in FIG. 23. The Filtering settings are shown in FIG. 24.

The settings described above were chosen to remove underlying curvatures in the samples. The desired exported file from the Keyence software was opened in the Omnisurf 3D software. In the "analysis" menu, "parameters" was selected, with Sstgy (Window: 90.0+/−10.0%) and Sq being the two desired parameters. The user clicked "OK" and these two values were recorded.

Example 4

A 2-ply creped bath tissue web was produced on a Through Air Dried paper machine with a triple layer headbox and dual TAD drums. The tissue web had the following product attributes: Basis Weight 40.63 g/m$^2$, Caliper 0.560 mm, MD tensile of 129.1 N/m, CD tensile of 61.8 N/m, MD stretch of 18.2%, CD stretch 9.78%, 95.38 HF, lint value of 6.13, Ball Burst of 236.0 gf, Geometric Mean Tensile of 89.3 N/m, a Sstgy of 4.7 and an Sq of 25.93 microns.

The tissue web was multilayered, with the first exterior layer (the layer intended for contact with the Yankee dryer) prepared using 100% Eucalyptus Bleached Kraft 1.375 kg/ton of Redibond 2038 amphoteric starch from Corn Products (10 Finderne Avenue, Bridgewater, New Jersey 08807). The interior layer was composed of 50% Eucalyptus Bleached Kraft and 50% Northern Softwood Bleached Kraft pulp, with 1.25 kg/ton of Hercobond 1194 temporary wet strength from Solenis (500 Hercules Road, Wilmington DE, 19808) and 1.50 kg/ton T526 debonder from Emerald Performance Materials (2020 Front Street, Suite 100, Cuyahoga Falls, Ohio 44221). The second exterior layer was composed of 50% Eucalyptus Bleached Kraft and 50% Northern Softwood Bleached Kraft pulp, 4.125 kg/ton of Redibond 2038 and 1.25 kg/ton of Hercobond 1194 temporary wet strength. The softwood was refined at 29 kwh/ton.

The fiber and chemical mixtures were diluted to a solids of 0.5% consistency and fed to separate fan pumps which delivered the slurry to a triple layered headbox. The headbox pH was controlled to 7.0 by addition of sodium bicarbonate to the thick stock before the fan pumps. The headbox deposited the slurry to a nip formed by a forming roll, an outer forming wire, and inner forming wire where the wires were running at a speed of 1060 m/min. The slurry was drained through the outer wire, which was a KT194-P design. When the fabrics separated, the web followed the inner forming wire and was dried to approximately 27% solids using a series of vacuum boxes and a steam box.

The web was then transferred to a structured fabric running at 1060 m/min with the aid of a vacuum box to facilitate fiber penetration into the structured fabric to enhance bulk softness and web imprinting. A laminated composite fabric, P10SM TPU 30×9, was provided having a web contacting layer with the following geometries: extruded MD strands of 0.26 mm×CD strands of 0.46 mm, with a mesh of 30 MD strands per inch and a count of 9 CD strands per inch, % contact area of 26% with solely MD strands in plane in static measurement and then with 48% contact area under load as the structure compressed and the CD ribs moved into the same plane as the MD strands, due to use of a thermoplastic polyurethane ("TPU") elastomeric material. The TPU material is a softer material and measured in the range of 65 to 75 Shore A Hardness while the woven supporting layer comprised of harder PET measured 95 to 105 Shore A Hardness using a portable Shore A Durometer test device calibrated per ASTM D 2240, the Mitutoyo Hardmatic HH-300 series, ASTD. The distance between MD elements in the web contacting layer was 0.60 mm, and the distance between the CD elements was 2.25 mm. The overall pocket depth was equal to the thickness of the TPU netting, which was equal to 0.50 mm. The pocket depth from the top surface of the netting to the CD mid-rib element was 0.25 mm. The TPU netting had a natural color, the permeability of the TPU laminated belt was 410 CFM and the caliper was 0.99 mm. The peel force required to remove the web contacting layer from the woven supporting layer was 1400 gf and the shear number was 225. The embedment distance was 0.14 mm. The supporting layer had a 0.27 mm round MD yarn at 56 yarns/inch, and a 0.35 mm CD yarn at 41 yarns/inch. The weave pattern of the base layer was a 5-shed, 1 MD yarn over 4 CD yarns, then under 1 CD yarn, then repeated. The material of the base fabric yarns was 100% PET, and the yarns were white. The fabric was sanded at 25% contact area, with an air permeability of 675 CFM. The weft yarns received 0.40% carbon black content by weight in the CD, and 0.14% carbon black content by weight in the MD. The base fabric and Mylar protective cover fabric were not placed under any tension during the production process. The TPU netting was placed under 0.50 PLI of tension during production. The welding laser was set to 40% power level (161 watts), at a welding head speed of 50 mm/sec and an optical line width of 34 mm with a 1 mm overlap between laser passes.

The web was dried with the aid of two TAD hot air impingement drums to 65% solids before transfer to the Yankee dryer. The web was held in intimate contact with the Yankee surface using an adhesive coating chemistry. The Yankee was provided steam at 400 kpa while the installed hot air impingement hood over the Yankee was blowing heated air at 250 deg C. The web was creped from the Yankee at 15.0% crepe at 97.0% solids using a steel blade at a pocket angle of 90 degrees prior to gap calendaring between two steel rolls at a gap of 4.0 thousands of an inch.

In the converting process, the two webs were plied together using light embossing of the DEKO configuration (only the top sheet was embossed with glue applied to the inside of the top sheet at the high points derived from the embossments using an adhesive supplied by a cliché roll) with the second exterior layer of each web facing each other. The % coverage of the embossment on the top sheet was 4%. The product was wound into a 2-ply bath tissue roll (non-folded) 235 count product at 127 mm roll diameter with a sheet length of 101.5 mm (perforation to perforation) and a sheet width of 108.5 mm (top of roll to bottom of roll). No surface additives were applied.

Example 5

A 2-ply creped bath tissue web was produced on a Through Air Dried paper machine with a triple layer headbox and dual TAD drums. The tissue web had the following product attributes: Basis Weight 38.97 g/m$^2$, Caliper 0.454 mm, MD tensile of 105.5 N/m, CD tensile of 60.1 N/m, MD stretch of 11.38%, CD stretch 8.54%, 96.14 HF, lint value of 7.87, Ball Burst of 197.2 gf, Geometric Mean Tensile of 79.6 N/m, Sstgy of 3.90, and a Sq value of 17.51 microns.

The tissue web was multilayered, with the first exterior layer (the layer intended for contact with the Yankee dryer) prepared using 100% Eucalyptus Bleached Kraft, 1.0 kg/ton of Redibond 2038 amphoteric starch from Corn Products (10 Finderne Avenue, Bridgewater, New Jersey 08807), and 0.25 kg/ton of Hercobond 6950 polyvinylamine from Solenis (500 Hercules Road, Wilmington DE, 19808). The interior layer was composed of 40% Eucalyptus Bleached Kraft and 60% Northern Softwood Bleached Kraft pulp, with 1.25 kg/ton of Hercobond 1194 temporary wet strength from Solenis and 1.50 kg/ton T526 debonder from Emerald Performance Materials (2020 Front Street, Suite 100, Cuyahoga Falls, Ohio 44221). The second exterior layer was composed of 40% Eucalyptus Bleached Kraft and 60% Northern Softwood Bleached Kraft pulp, 5.5 kg/ton of Redibond 2038, 1.25 kg/ton of Hercobond 1194 temporary wet strength, and 0.25 kg/ton of Hercobond 6950 polyvinylamine. The softwood was refined at 20 kwh/ton.

The fiber and chemical mixtures were diluted to a solids of 0.5% consistency and fed to separate fan pumps which delivered the slurry to a triple layered headbox. The headbox pH was controlled to 7.0 by addition of sodium bicarbonate to the thick stock before the fan pumps. The headbox deposited the slurry to a nip formed by a forming roll, an outer forming wire, and inner forming wire where the wires were running at a speed of 920 m/min. The slurry was drained through the outer wire, which was a KT194-P design. When the fabrics separated, the web followed the inner forming wire and was dried to approximately 27% solids using a series of vacuum boxes and a steam box.

The web was then transferred to a structured fabric running at 920 m/min with the aid of a vacuum box to facilitate fiber penetration into the structured fabric to enhance bulk softness and web imprinting. A laminated composite fabric, P10SM TPU 30×9, was provided having a web contacting layer with the following geometries: extruded MD strands of 0.26 mm×CD strands of 0.46 mm, with a mesh of 30 MD strands per inch and a count of 9 CD strands per inch, % contact area of 26% with solely MD strands in plane in static measurement and then with 48% contact area under load as the structure compressed and the CD ribs moved into the same plane as the MD strands, due to use of a thermoplastic polyurethane ("TPU") elastomeric material. The TPU material is a softer material and measured in the range of 65 to 75 Shore A Hardness while the woven supporting layer comprised of harder PET measured 95 to 105 Shore A Hardness using a portable Shore A Durometer test device calibrated per ASTM D 2240, the Mitutoyo Hardmatic HH-300 series, ASTD. The distance between MD elements in the web contacting layer was 0.60 mm, and the distance between the CD elements was 2.25 mm. The overall pocket depth was equal to the thickness of the TPU netting, which was equal to 0.50 mm. The pocket depth from the top surface of the netting to the CD mid-rib element was 0.25 mm. The TPU netting had a natural color, the permeability of the TPU laminated belt was 410 CFM and the caliper was 0.99 mm. The peel force required to remove the web contacting layer from the woven supporting layer was 1400 gf and the shear number was 225. The embedment distance was 0.14 mm. The supporting layer had a 0.27 mm round MD yarn at 56 yarns/inch, and a 0.35 mm CD yarn at 41 yarns/inch. The weave pattern of the base layer was a 5-shed, 1 MD yarn over 4 CD yarns, then under 1 CD yarn, then repeated. The material of the base fabric yarns was 100% PET, and the yarns were white. The fabric was sanded at 25% contact area, with an air permeability of 675 CFM. The weft yarns received 0.40% carbon black content by weight in the CD, and 0.14% carbon black content by weight in the MD. The base fabric and Mylar protective cover fabric were not placed under any tension during the production process. The TPU netting was placed under 0.50 PLI of tension during production. The welding laser was set to 40% power level (161 watts), at a welding head speed of 50 mm/sec and an optical line width of 34 mm with a 1 mm overlap between laser passes.

The web was dried with the aid of two TAD hot air impingement drums to 80% solids before transfer to the Yankee dryer. The web was held in intimate contact with the Yankee surface using an adhesive coating chemistry. The Yankee was provided steam at 350 kpa while the installed hot air impingement hood over the Yankee was blowing heated air at 40 deg C. The web was creped from the Yankee at 13.0% crepe at 97.0% solids using a steel blade at a pocket angle of 90 degrees prior to gap calendaring between two steel rolls at a gap of 3.5 thousands of an inch.

In the Converting process, the two webs were plied together using light embossing of the DEKO configuration (only the top sheet was embossed with glue applied to the inside of the top sheet at the high points derived from the embossments using an adhesive supplied by a cliché roll) with the second exterior layer of each web facing each other. The % coverage of the embossment on the top sheet was 4%. The product was wound into a 2-ply bath tissue roll (non-folded) 235 count product at 127 mm roll diameter with a sheet length of 101.5 mm (perforation to perforation) and a sheet width of 108.5 mm (top of roll to bottom of roll).

Comparative Example 3

A 2-ply creped bath tissue web was produced on a Through Air Dried paper machine with a triple layer headbox and dual TAD drums. The tissue product had the following product attributes: Basis Weight 40.79 g/m$^2$, Caliper 0.631 mm, MD tensile of 163.1 N/m, CD tensile of 79.02 N/m, MD stretch of 20.97%, CD stretch of 10.31%, 93.06HF, lint value of 4.69, Ball Burst of 222.6 gf, Geometric Mean Tensile of 113.4 N/m, an Sstgy of 1.3, and a Sq value of 37.8 microns.

The tissue web was multilayered, with the first exterior layer (the layer intended for contact with the Yankee dryer) prepared using 100% Eucalyptus Bleached Kraft. The interior layer was composed of 85% Eucalyptus Bleached Kraft and 15% Northern Softwood Bleached Kraft pulp and 1.0 kg/ton T526 debonder from Emerald Performance Materials (2020 Front Street, Suite 100, Cuyahoga Falls, Ohio 44221). The second exterior layer was composed of 5% Eucalyptus Bleached Kraft and 95% Northern Softwood Bleached Kraft pulp, 8.7 kg/ton of Redibond 2038 from Corn Products (10 Finderne Avenue, Bridgewater, New Jersey 08807), and 0.45 kg/ton of Hercobond 1194 temporary wet strength (500 Hercules Road, Wilmington DE, 19808) The softwood was refined at 70 kwh/ton, the HW was refined at 12.5 kwh/ton. In addition, the mixed furnish of the second exterior layer was refined at 33 kwh/ton.

The fiber and chemical mixtures were diluted to a solids of 0.5% consistency and fed to separate fan pumps which delivered the slurry to a triple layered headbox. The headbox pH was controlled to 7.0 by addition of sodium bicarbonate to the thick stock before the fan pumps. The headbox deposited the slurry to a nip formed by a forming roll, an outer forming wire, and inner forming wire where the wires were running at a speed of 1330 m/min. The slurry was drained through the outer wire, which was a KT194-P design. When the fabrics separated, the web followed the inner forming wire and was dried to approximately 27% solids using a series of vacuum boxes and a steam box.

The web was then transferred to a structured fabric running at 1330 m/min with the aid of a vacuum box to facilitate fiber penetration into the structured fabric to enhance bulk softness and web imprinting. The structured fabric was a Prolux 005, 5 shed 1, 3, 5, 2, 4 warp pick sequence woven polymer fabric sanded to 27% contact area supplied by Albany (216 Airport Drive Rochester, NH 03867 USA Tel: +1.603.330.5850) with a caliper of 1.02 mm The web was dried with the aid of two TAD hot air impingement drums to 78% moisture before transfer to the Yankee dryer. The web was held in intimate contact with the Yankee surface using an adhesive coating chemistry. The Yankee was provided steam at 280 kpa while the wet end installed hot air impingement hood over the Yankee was blowing heated air at 350 deg C. The web was creped from the Yankee at 12.75% crepe at 97.2% dryness using a steel blade at a pocket angle of 84.3 degrees.

In the converting process, the two webs were plied together using light embossing of the DEKO configuration (only the top sheet was embossed with glue applied to the inside of the top sheet at the high points derived from the embossments using an adhesive supplied by a cliché roll) with the second exterior layer of each web facing each other. The % coverage of the embossment on the top sheet was 4%. The product was wound into a 2-ply bath tissue roll (non-folded) at 235 count product at 127 mm roll diameter with a sheet length of 101.5 mm (perforation to perforation) and a sheet width of 108.5 mm (top of roll to bottom of roll).

Tables 2 and 3 in FIGS. 25A and 25B, respectively, provides relevant data from Examples 4 and 5 and Comparative Example 3, as well as for certain commercially available products.

In an exemplary embodiment of the present invention, the structuring fabric is of the same design as previously described except the web contacting layer includes only approximately machine direction oriented extruded monofilaments (i.e., the web contacting layer does not include any cross direction oriented monofilaments). The size, shape, and spacing of the monofilaments of the supporting and web contacting layers as well the weave pattern of the supporting layer are varied to obtain optimal paper web properties, primarily paper thickness, as well as influencing the drying characteristics of the paper web in the predrying stages of a papermaking process where hot air is drawn through the web. The air flow path is greatly influenced by the aforementioned monofilament characteristics and weave pattern where longer dwell times of the air through the web can increase water removal and reduce overall energy required to dry the paper web.

Figure 28:
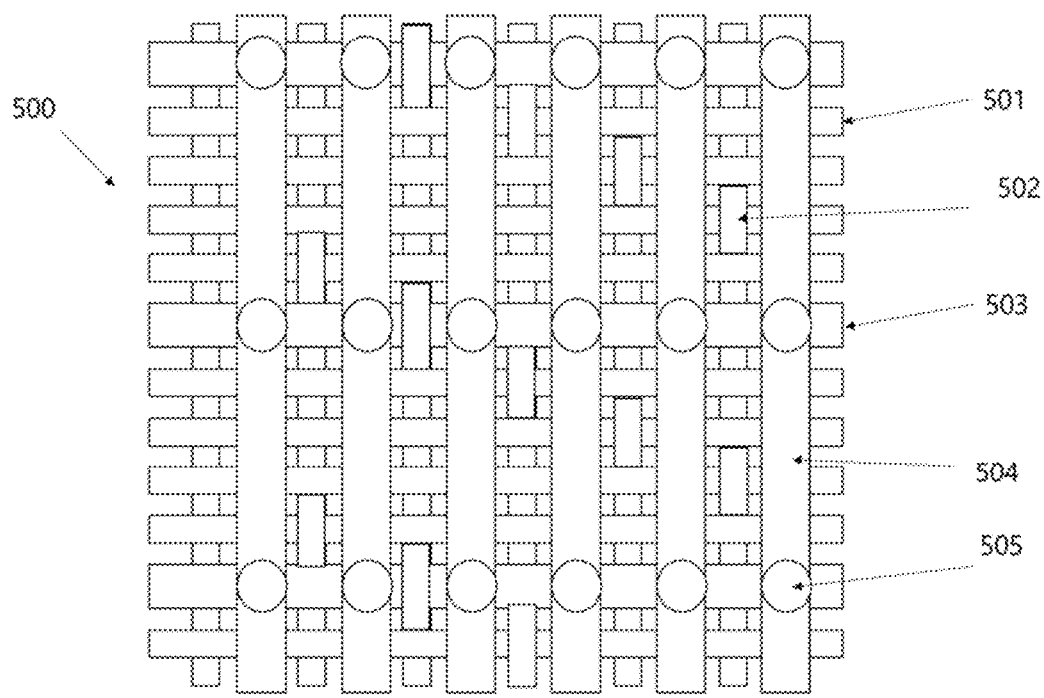
FIG. 28 is atop plan view of a structuring fabric according to an exemplary embodiment of the present invention.

FIG. 28 is a top plan view of a structuring fabric, generally designated by reference number 500, according to an exemplary embodiment of the present invention. The structuring fabric 500 includes a support layer having weft monofilaments 501, warp monofilaments 502 and a second set of larger diameter support layer weft monofilaments 503. A web contacting layer is laser laminated onto the support layer at bond sites 505. The web contacting layer includes web contacting layer warp monofilaments 504 which also form ribs.

Figure 29A:
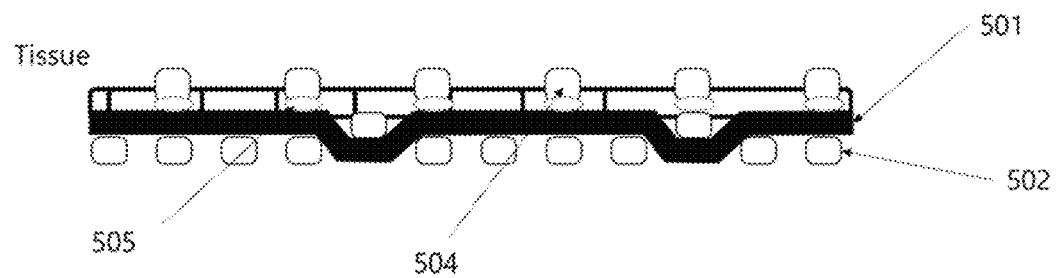
FIGS. 29A and 29B are cross-sectional views of a structuring fabric according to an exemplary embodiment of the present invention.
Figure 29B:
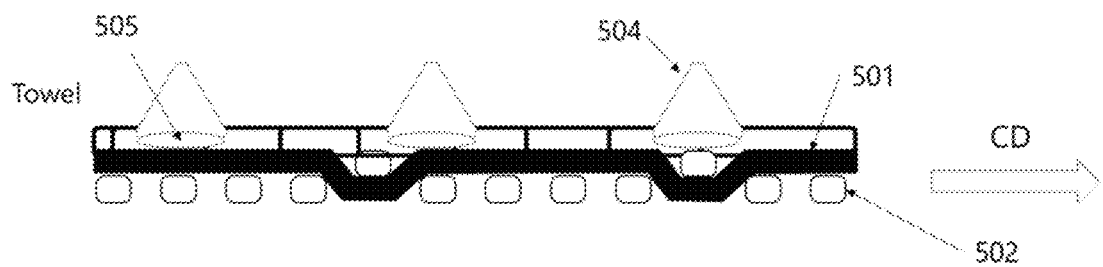
Figure 30A:
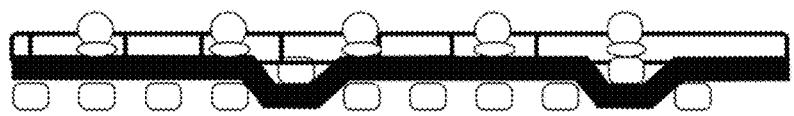
FIGS. 30A, 30B and 30C are cross-sectional views of a structuring fabric according to an exemplary embodiment of the present invention.
Figure 30B:
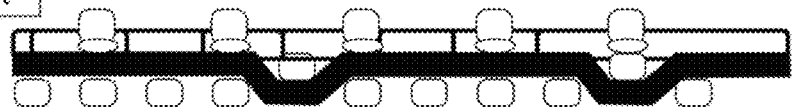
Figure 30C:
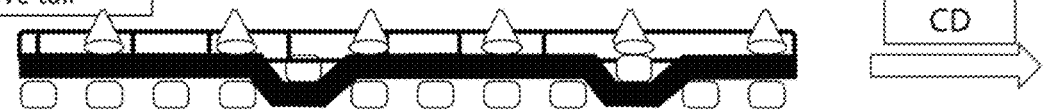

As shown in FIGS. 29A and 29B, the web contacting layer warp monofilaments may have a variety of cross-sectional shapes. FIG. 29A shows the web contacting layer warp monofilaments with flat-shaped monofilaments. FIG. 29B shows the web contacting layer warp monofilaments with dovetail-shaped monofilaments. FIGS. 30A, 30B and 30C show fabrics according to exemplary embodiments of the present invention having round, flat and dove tail shaped filaments, respectively.

Figure 31:
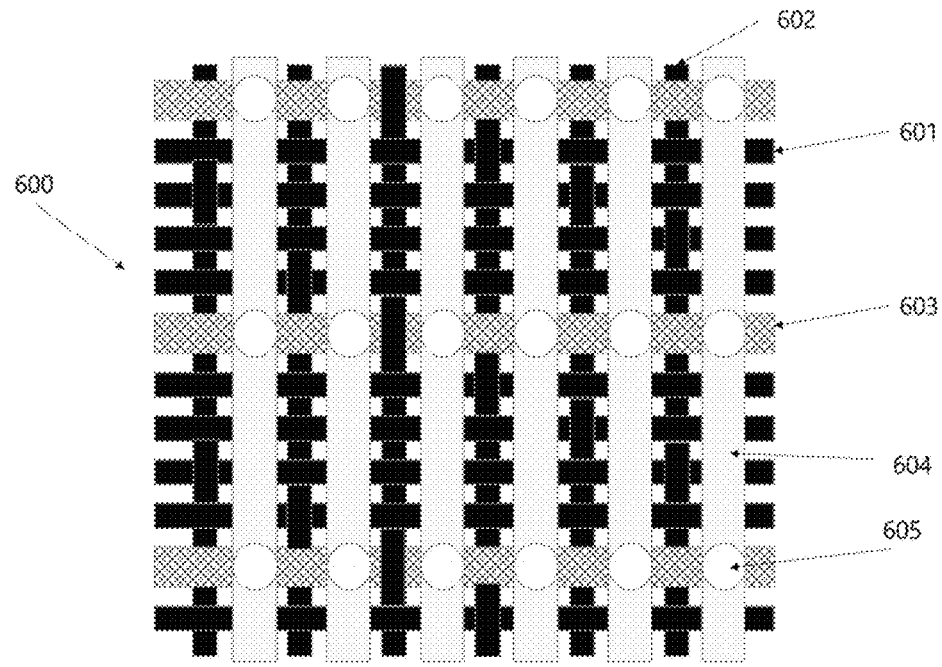
FIG. 31 is atop plan view of a structuring fabric according to an exemplary embodiment of the present invention.

FIG. 31 is a top plan view of a structuring fabric, generally designated by reference number 600, according to an exemplary embodiment of the present invention. The structuring fabric 600 includes a support layer having weft monofilaments 601, warp monofilaments 602 and a second set of larger diameter support layer weft monofilaments 603. A web contacting layer is laser laminated onto the support layer at bond sites 605. The web contacting layer includes web contacting layer warp monofilaments 604 which also form ribs. In this exemplary embodiment, the monofilaments 604 of the web contacting layer are larger than the monofilaments of the supporting layer. For example, the warp and weft monofilaments of the supporting layer may have diameters from about 0.20 mm to about 0.40 mm and the monofilaments of the web contacting layer may have diameters from about 0.45 mm to about 0.60 mm. The supporting layer may include polyethylene terephthalate monofilaments where the weft monofilaments are of 0.35 mm diameter, and the warp monofilaments are of 0.27 mm×0.22 mm. The web contacting layer may include warp filaments of about 0.50 mm in diameter.

In exemplary embodiments, the shape of the web contacting layer filaments may be a pyramid. The larger weft filaments of the support layer may form mid ribs (cross direction ribs). The weft filaments of the support layer may be woven into the supporting layer fabric. Warp filaments of the web contacting layer may form machine direction ribs. The web contacting layer may include bond sites where the warp filament is bonded only to the larger diameter weft filaments of the support layer. The web contacting layer may also be bonded to the supporting layer at bond sites where the filaments of the web contacting layer cross the warp or weft filaments on the supporting layer and are laser welded. The order of bonding is not critical. In other words, the supporting layer and web contacting layer may be formed separately, then laser bonded. Alternately, a layer may be added and laser welded, then the next layer may be added and laser welded, etc.

Figure 32A:
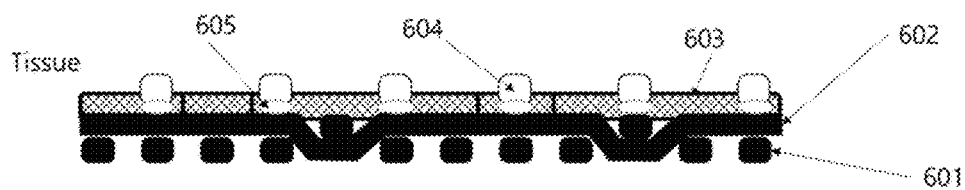
FIGS. 32A and 32B are cross-sectional views of a structuring fabric according to an exemplary embodiment of the present invention.
Figure 32B:
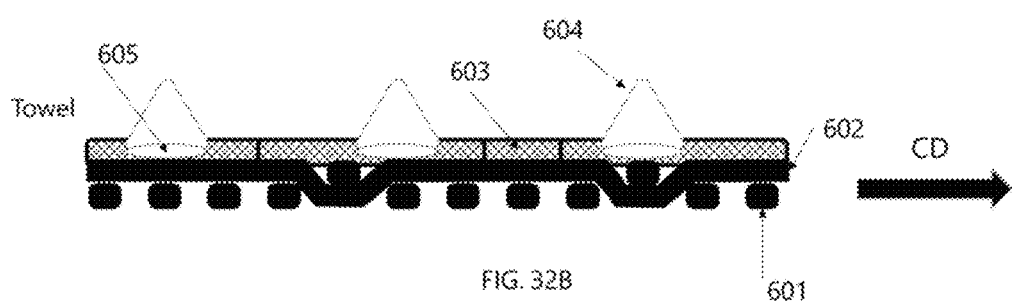
Figure 33A:
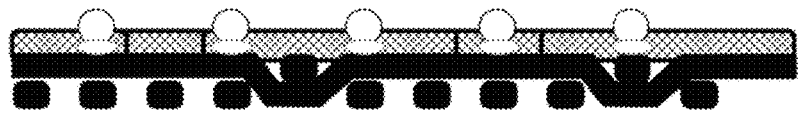
FIGS. 33A, 33B and 33C are cross-sectional views of a structuring fabric according to an exemplary embodiment of the present invention.
Figure 33B:
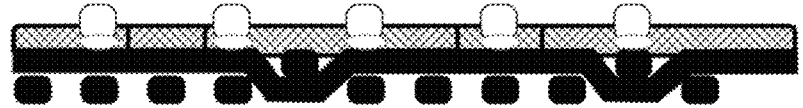
Figure 33C:
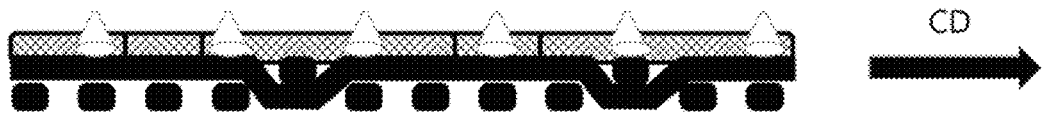

As shown in FIGS. 32A and 32B, the web contacting layer warp monofilaments may have a variety of cross-sectional shapes. FIG. 32A shows the web contacting layer warp monofilaments with flat-shaped monofilaments. FIG. 32B shows the web contacting layer warp monofilaments with dovetail-shaped monofilaments. FIGS. 33A, 33B and 33C show fabrics according to exemplary embodiments of the present invention having round, flat and dove tail shaped filaments, respectively.

Figure 34:
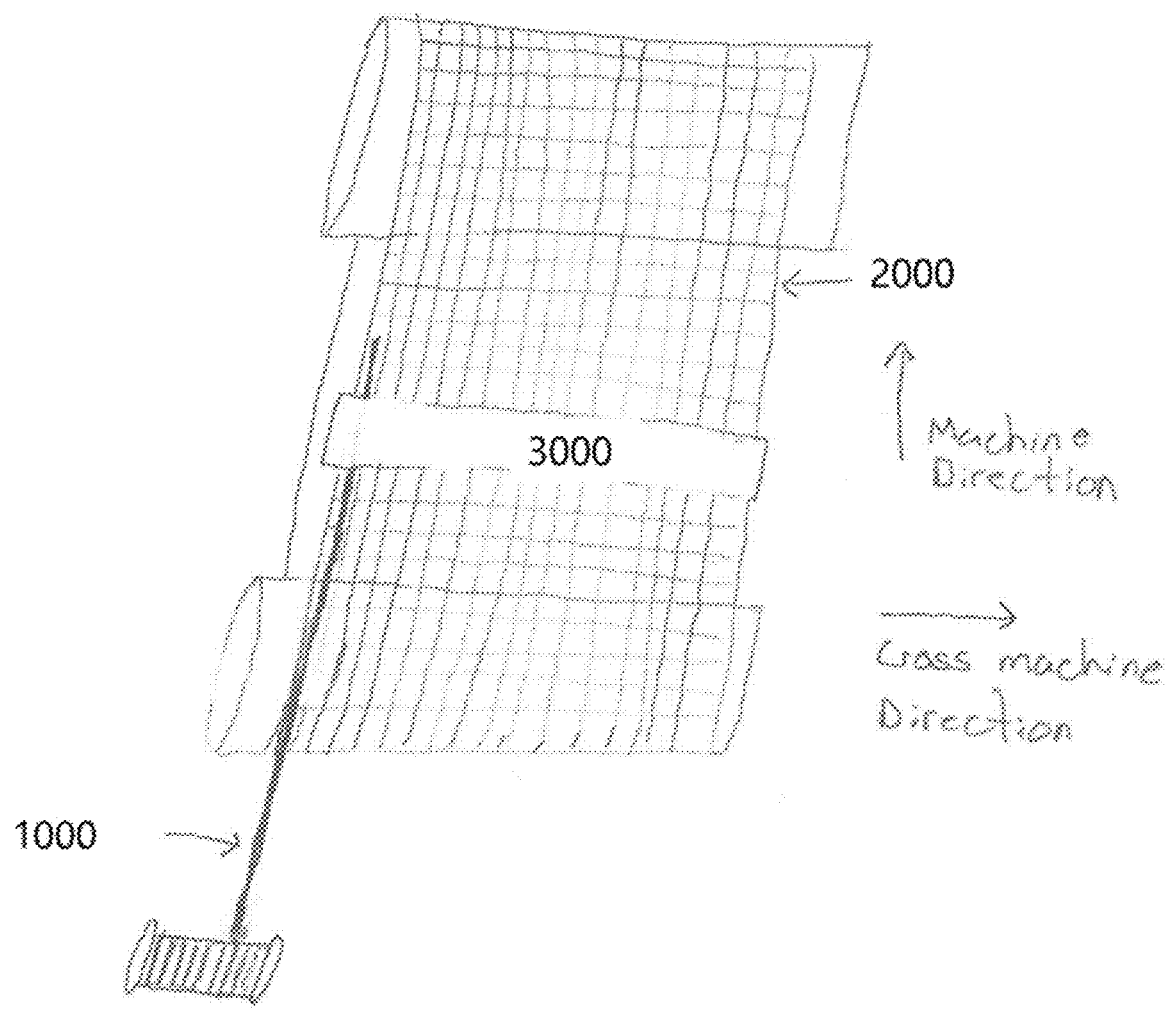
FIG. 34 is a perspective view showing a process of spirally winding an approximately machine direction oriented monofilament and laminating the monofilament to a woven supporting layer according to an exemplary embodiment of the present invention.

FIG. 34 shows a process of spirally winding an approximately machine direction oriented monofilament and laminating the monofilament to a woven supporting layer according to an exemplary embodiment of the present invention. As shown, an approximately machine direction oriented monofilament 1000 is unwound and laid upon the woven supporting layer 2000, and then the monofilament 1000 is bonded with the woven supporting layer 2000 by an apparatus 3000 which uses, for example, adhesives, laser, infrared, solvent, ultraviolet, or ultrasonic bonding for lamination. In a preferred exemplary embodiment, the apparatus 3000 generates laser energy so that the monofilament 1000 is laser laminated to the woven supporting layer 2000. The monofilament 1000 is one continuous filament moved in the cross direction as the endless woven layer 2000 is continually indexed in the machine direction until the entire woven layer 2000 is covered by and laminated with the monofilament 1000.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

We claim:

1. A structured tissue belt assembly, comprising:
   a woven supporting layer comprising a top surface and a bottom surface, the supporting layer being formed of one or more layers of warp yarns interwoven with weft yarns in a repeating pattern with crossover points between the warp yarns and the weft yarns;
   a non-woven web-contacting layer comprising extruded monofilaments spaced apart in approximately a machine direction, the web-contacting layer comprising a bottom surface; and
   one or more laser-formed embedments that attach the bottom surface of the web-contacting layer to the top surface of the supporting layer without fusion between the web-contacting layer and the supporting layer, with all cross over points between the warp yarns and the weft yarns being devoid of laser-formed embedments;
   the supporting layer comprising laser energy absorbent material.

2. The structured tissue belt assembly according to claim 1, wherein the supporting layer is a single layer fabric comprised of a 5-shed design with a 1, 2, 3, 4, 5 warp pick sequence.

3. The structured tissue belt assembly according to claim 1, wherein the woven supporting layer is comprised of a double layer fabric having first and second cross-direction monofilament layers comprised of a first layer 5-shed design with a 1, 2, 3, 4, 5 warp pick sequence, and monofilaments of the second cross-direction monofilament layer have a larger circumference than monofilaments of the first cross-direction monofilament layer.

4. A structured tissue belt assembly comprising:
   a supporting layer comprising a top surface and a bottom surface, the supporting layer being formed of one or more layers of warp monofilaments interwoven with one or more layers of weft monofilaments in a repeating pattern with crossover points between the warp monofilaments and the weft monofilaments, at least one of: a) at least some of the warp monofilaments; or b) at least some of the weft monofilaments, comprising laser energy absorbent material; and
   a non-woven web contacting layer of approximately machine direction oriented monofilaments, the web contacting layer comprising a bottom surface;
   one or more first laser-formed embedments that attach the bottom surface of the web contacting layer to the top surface of the supporting layer, without fusion between the web-contacting layer and the supporting layer, at points where the web contacting layer contacts at least one of: a) the at least some of the warp monofilaments; or b) the at least some of the weft monofilaments that comprise laser energy absorbent material, with all cross over points between the warp monofilaments and the weft monofilaments being devoid of laser welds.

5. The structured tissue belt assembly of claim 4, wherein the monofilaments of the web contacting layer are larger than at least one of the warp or weft filaments of the supporting layer.

* * * * *